US007369395B2

(12) United States Patent
Togashi

(10) Patent No.: US 7,369,395 B2
(45) Date of Patent: May 6, 2008

(54) MULTILAYER CAPACITOR

(75) Inventor: Masaaki Togashi, Nikaho (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/384,431

(22) Filed: Mar. 21, 2006

(65) Prior Publication Data
US 2006/0221546 A1    Oct. 5, 2006

(30) Foreign Application Priority Data
Mar. 31, 2005    (JP)    ............................ P2005-104804

(51) Int. Cl.
*H01G 4/005*    (2006.01)
*H01G 4/06*    (2006.01)
(52) U.S. Cl. ..................................... 361/303; 361/311
(58) Field of Classification Search ........ 361/303–305, 361/306.1, 306.3, 308.1, 309, 311
See application file for complete search history.

(56) References Cited

U.S. PATENT DOCUMENTS 5,880,925 A * 3/1999 DuPre et al. ............... 361/303
6,594,136 B2 * 7/2003 Kuroda et al. ............ 361/306.1
7,149,071 B2 * 12/2006 Mosley .................... 361/306.3
2006/0152886 A1 * 7/2006 Togashi et al. .......... 361/306.3

FOREIGN PATENT DOCUMENTS

| JP | A 9-148174 | 6/1997 |
| JP | A-2006-203168 | 8/2006 |

* cited by examiner

*Primary Examiner*—Eric Thomas
(74) *Attorney, Agent, or Firm*—Oliff & Berridge, PLC

(57) ABSTRACT

The multilayer body 1 is constructed by alternately laminating a plurality of dielectric layers 11 to 22 and a plurality of first and second inner electrodes 31 to 34, 31 to 34. The first inner electrodes 31 to 34 are electrically connected to each other through the first connecting conductor 7. The first inner electrode 31 is electrically connected to the first terminal electrode 3 through the lead conductor 37. The second inner electrodes 41 to 44 are electrically connected to each other through the second connecting conductor 9. The second inner electrode 44 is electrically connected to the second terminal electrode 5 through the lead conductor 47. The first inner electrode 31 and the second inner electrode 44 are arranged at respective positions symmetrical to each other about the center position M in the laminating direction of the multilayer body 1.

22 Claims, 25 Drawing Sheets

MULTILAYER CAPACITOR

BACKGROUND OF THE INVENTION

1. Field of the Invention

The present invention relates to a multilayer capacitor.

2. Related Background Art

Known as this kind of multilayer capacitor is one comprising a multilayer body in which a plurality of dielectric layers and a plurality of inner electrodes are alternately laminated, and a plurality of terminal electrodes formed on the multilayer body (see, for example, Patent Document 1).

Power supplies for central processing units (CPUs) mounted in digital electronic devices have been lowering their voltage but increasing their load current. This has made it very difficult to suppress fluctuations of power voltage within a tolerable range in response to drastic changes in load current. Therefore, a multilayer capacitor known as decoupling capacitor has come into connection with power supplies. This multilayer capacitor supplies a current to a CPU at the time when the load current transiently fluctuates, so as to restrain the power voltage from fluctuating.

As the CPUs have recently been raising their frequencies, the load current has been becoming faster and greater, thus demanding the multilayer capacitor used for the decoupling capacitor to increase their equivalent series resistance (ESR) as well as capacity.

[Patent Document 1] Japanese Patent Application Laid-Open No. HEI 9-148174

SUMMARY OF THE INVENTION

However, the multilayer capacitor disclosed in Patent Document 1 is silent on how to increase the equivalent series resistance. Further, all the inner electrodes in the multilayer capacitor disclosed in Patent Document 1 are directly connected to terminal electrodes. Therefore, the equivalent series resistance becomes smaller if this multilayer capacitor enhances its capacitance by increasing the number of laminated layers in order to respond to a greater capacity.

For overcoming the problem mentioned above, it is an object of the present invention to provide a multilayer capacitor which can increase the equivalent series resistance.

For achieving such an object, the inventor conducted diligent studies concerning a multilayer capacitor which can increase the equivalent series resistance. As a result, the inventor has found a new fact that connecting inner electrodes to each other with a connecting conductor while connecting only a part of the inner electrodes to a terminal electrode with a lead conductor can increase the equivalent series resistance even if the number of laminated dielectric layers and inner electrodes is held constant.

In a multilayer capacitor in which only a part of the inner electrodes is thus connected to a terminal electrode, however, it matters which of two side faces opposing each other in the laminating direction of the multilayer body should face a substrate or the like at the time of mounting. The multilayer capacitor is mounted such that a terminal electrode is connected to a land pattern formed in the substrate. In the multilayer capacitor mounted to the substrate, a current path is formed between one land pattern and the other land pattern through an inner electrode connected to a terminal electrode. When a current flows through the current path, an inductance occurs in the multilayer capacitor. The magnitude of the inductance varies depending on the length of the current path formed between the land patterns. The length of the current path is determined by the distance between the inner electrode connected to the terminal electrode and its corresponding land pattern. Therefore, the current path length varies depending on the mounting direction in general in the multilayer capacitor in which only a part of the inner electrodes is connected to a terminal electrode, since the distance between the inner electrode connected to the terminal electrode and the land pattern varies depending on which side face of the multilayer body opposes the substrate at the time of mounting. As a result, equivalent series inductance varies depending on the mounting direction of the multilayer capacitor, thus yielding fluctuations.

Therefore, the inventor conducted diligent studies concerning a multilayer capacitor which can satisfy both of demands for increasing the equivalent series resistance and restraining the equivalent series inductance from fluctuating. As a result, the inventor has found a new fact that connecting inner electrodes to each other with a connecting conductor while connecting only a part of the inner electrodes to a terminal electrode with a lead conductor and positioning the inner electrodes connected to the terminal electrode through the lead conductor symmetrical to each other within the multilayer body can increase the equivalent series resistance while restraining the equivalent series inductance from fluctuating. In particular, the equivalent series resistance can be adjusted to a desirable value if the number of inner electrodes electrically connected to terminal electrodes through lead conductors or the position of inner electrodes electrically connected to terminal electrodes through lead conductors in the laminating direction of the multilayer body can be changed.

In view of such results of studies, in one aspect, the present invention provides a multilayer capacitor comprising a multilayer body in which a plurality of dielectric layers and a plurality of inner electrodes are alternately laminated, and a plurality of terminal electrodes formed on the multilayer body; wherein the plurality of terminal electrodes include first and second terminal electrodes electrically insulated from each other; wherein the plurality of inner electrodes include a plurality of first and second inner electrodes alternately arranged; wherein the plurality of first inner electrodes are electrically connected to each other through a connecting conductor; wherein the plurality of second inner electrodes are electrically connected to each other through a connecting conductor; wherein at least one first inner electrode whose number is smaller by at least 1 than the total number of the first inner electrodes in the plurality of first inner electrodes is electrically connected to the first terminal electrode through a lead conductor; wherein at least one second inner electrode whose number is smaller by at least 1 than the total number of the second inner electrodes in the plurality of second inner electrodes is electrically connected to the second terminal electrode through a lead conductor; wherein the second inner electrode electrically connected to the second terminal electrode through the lead conductor is arranged at a position symmetrical to the respective first inner electrode electrically connected to the first terminal electrode through the lead conductor about a center position in a laminating direction of the multilayer body; and wherein the first inner electrode electrically connected to the first terminal electrode through the lead conductor is arranged at a position symmetrical to the respective second inner electrode electrically connected to the second terminal electrode through the lead conductor about the center position in the laminating direction of the multilayer body.

In another aspect, the present invention provides a multilayer capacitor comprising a multilayer body in which a plurality of dielectric layers and a plurality of inner electrodes are alternately laminated, and a plurality of terminal electrodes formed on the multilayer body; wherein the plurality of terminal electrodes include first and second terminal electrodes electrically insulated from each other; wherein the plurality of inner electrodes include a plurality of first and second inner electrodes alternately arranged; wherein the plurality of first inner electrodes are electrically connected to each other through a connecting conductor; wherein the plurality of second inner electrodes are electrically connected to each other through a connecting conductor; wherein at least one first inner electrode whose number is smaller by at least 1 than the total number of the first inner electrodes in the plurality of first inner electrodes is electrically connected to the first terminal electrode through a lead conductor; wherein at least one second inner electrode whose number is smaller by at least 1 than the total number of the second inner electrodes in the plurality of second inner electrodes is electrically connected to the second terminal electrode through a lead conductor; wherein the first inner electrode electrically connected to the first terminal electrode through the lead conductor is arranged at a position symmetrical to the respective first inner electrode electrically connected to the first terminal electrode through the lead conductor about a center position in a laminating direction of the multilayer body; and wherein the second inner electrode electrically connected to the second terminal electrode through the lead conductor is arranged at a position symmetrical to the respective second inner electrode electrically connected to the second terminal electrode through the lead conductor about the center position in the laminating direction of the multilayer body.

Each of these multilayer capacitors has first and second inner electrodes which are not directly connected to the first and second terminal electrodes. Such inner electrodes and connecting conductors electrically connecting them together enable the multilayer capacitors to increase their equivalent series resistance. Also, in these multilayer capacitors, inner electrodes electrically connected to terminal electrodes through lead conductors are arranged at respective positions symmetrical to the inner electrodes electrically connected to the terminal electrodes through lead conductors about the center position in the laminating direction of the multilayer body. Therefore, when any of two side faces opposing each other in the laminating direction of the multilayer body opposes a substrate or the like at the time of mounting, the length of a current path formed between land patterns on the substrate through an inner electrode is hard to change. Consequently, these multilayer capacitors restrain the equivalent series inductance from fluctuating depending on the mounting direction.

Preferably, the plurality of first inner electrodes are electrically connected to the connecting conductor through a lead conductor, the plurality of second inner electrodes are electrically connected to the connecting conductor through a lead conductor, and the connecting conductor is formed on a surface of the multilayer body. It will also be preferred if the connecting conductor is a through hole conductor provided within the multilayer body in the laminating direction of the multilayer body. In these cases, the first and second inner electrodes are electrically connected to each other.

Preferably, at least a part of the plurality of first and second inner electrodes is formed with a slit, whereas the slit is formed such that a current flows in respective directions opposite from each other in areas opposing each other with the slit interposed therebetween in each of the first and second inner electrodes formed with the slit. In this case, magnetic fields caused by current flows cancel each other out, whereby the equivalent series inductance can be lowered.

Preferably, the multilayer body has a substantially rectangular parallelepiped form, the first terminal electrode is formed on a side face extending longitudinally in side faces parallel to the laminating direction of the multilayer body, and the second terminal electrode is formed on a side face extending longitudinally and opposing the side face formed with the first terminal electrode in side faces parallel to the laminating direction of the multilayer body. This shortens the length by which the first and second inner electrodes overlap along the direction from the first terminal electrode to the second terminal electrode. As a result, magnetic fields caused by currents flowing through the first and second inner electrodes can be made smaller, whereby equivalent series inductance can be lowered.

Preferably, equivalent series resistance is set to a desirable value by adjusting the number of first inner electrode electrically connected to the first terminal electrode through the lead conductor and the number of second inner electrode electrically connected to the second terminal electrode through the lead conductor.

In this case, by adjusting at least one of the number of first inner electrode electrically connected to the first terminal electrode through the lead conductor and the number of second inner electrode electrically connected to the second terminal electrode through the lead conductor, the multilayer capacitor sets the equivalent series resistance to a desirable value, and thus can regulate the equivalent series resistance easily with a high precision.

Preferably, equivalent series resistance is set to a desirable value by adjusting the position of the first inner electrode electrically connected to the first terminal electrode through the lead conductor in the laminating direction of the multilayer body and the position of the second inner electrode electrically connected to the second terminal electrode through the lead conductor in the laminating direction of the multilayer body.

In this case, by adjusting at least one of the position of the first inner electrode electrically connected to the first terminal electrode through the lead conductor in the laminating direction of the multilayer body and the position of the second inner electrode electrically connected to the second terminal electrode through the lead conductor in the laminating direction of the multilayer body, the multilayer capacitor sets the equivalent series resistance to a desirable value, and thus can regulate the equivalent series resistance easily with a high precision.

Preferably, equivalent series resistance is set to a desirable value by further adjusting the number of connecting conductor electrically connecting the plurality of first inner electrodes to each other and the number of connecting conductor electrically connecting the plurality of second inner electrodes to each other. In this case, the equivalent series resistance can be controlled at a higher precision.

Preferably, the plurality of first inner electrodes are connected in parallel, and the plurality of second inner electrodes are connected in parallel. In this case, even when the resistance value fluctuates among the first or second inner electrodes, the equivalent series resistance of the whole multilayer capacitor is less likely to be influenced thereby, so that the equivalent series resistance control can be restrained from lowering its precision.

The present invention can provide a multilayer capacitor which can increase the equivalent series resistance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

In the following, preferred embodiments of the present invention will be explained in detail with reference to the accompanying drawings. In the explanation, constituents identical to each other or those having functions identical to each other will be referred to with numerals' identical to each other without repeating their overlapping descriptions. Words "upper" and "lower" used in the explanation conform to the vertical direction in each drawing.

First Embodiment

Figure 1:
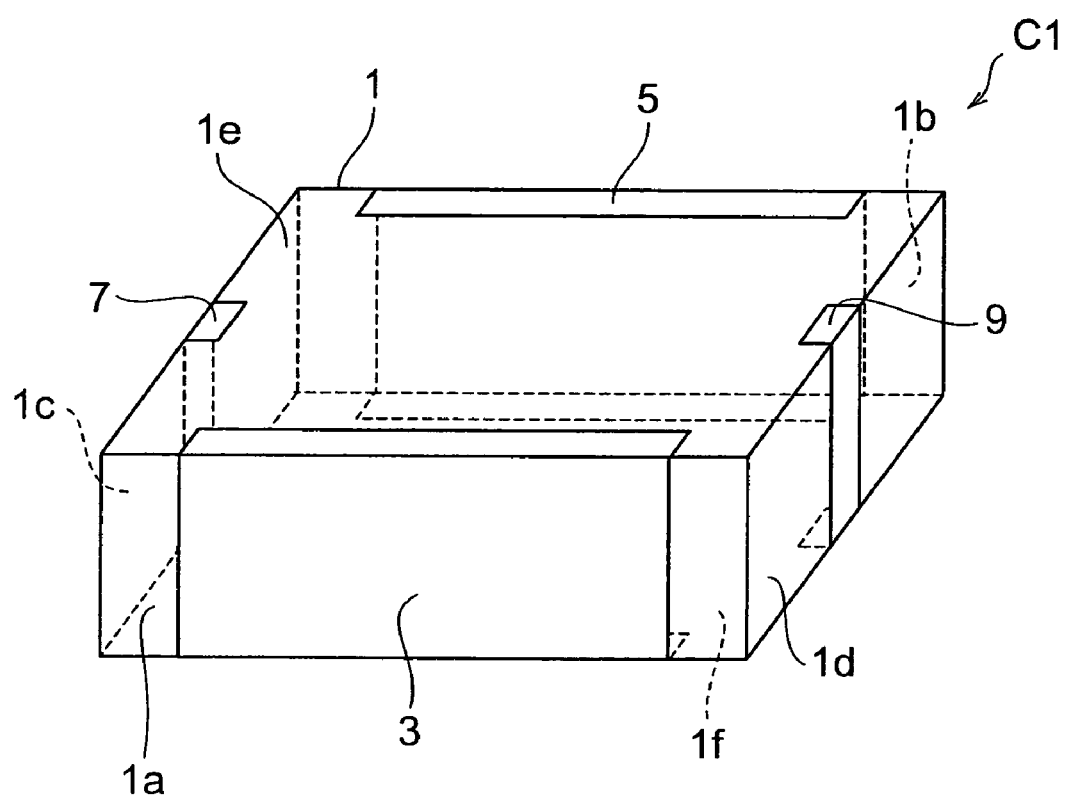
FIG. 1 is a perspective view of the multilayer capacitor in accordance with a first embodiment.
Figure 2:
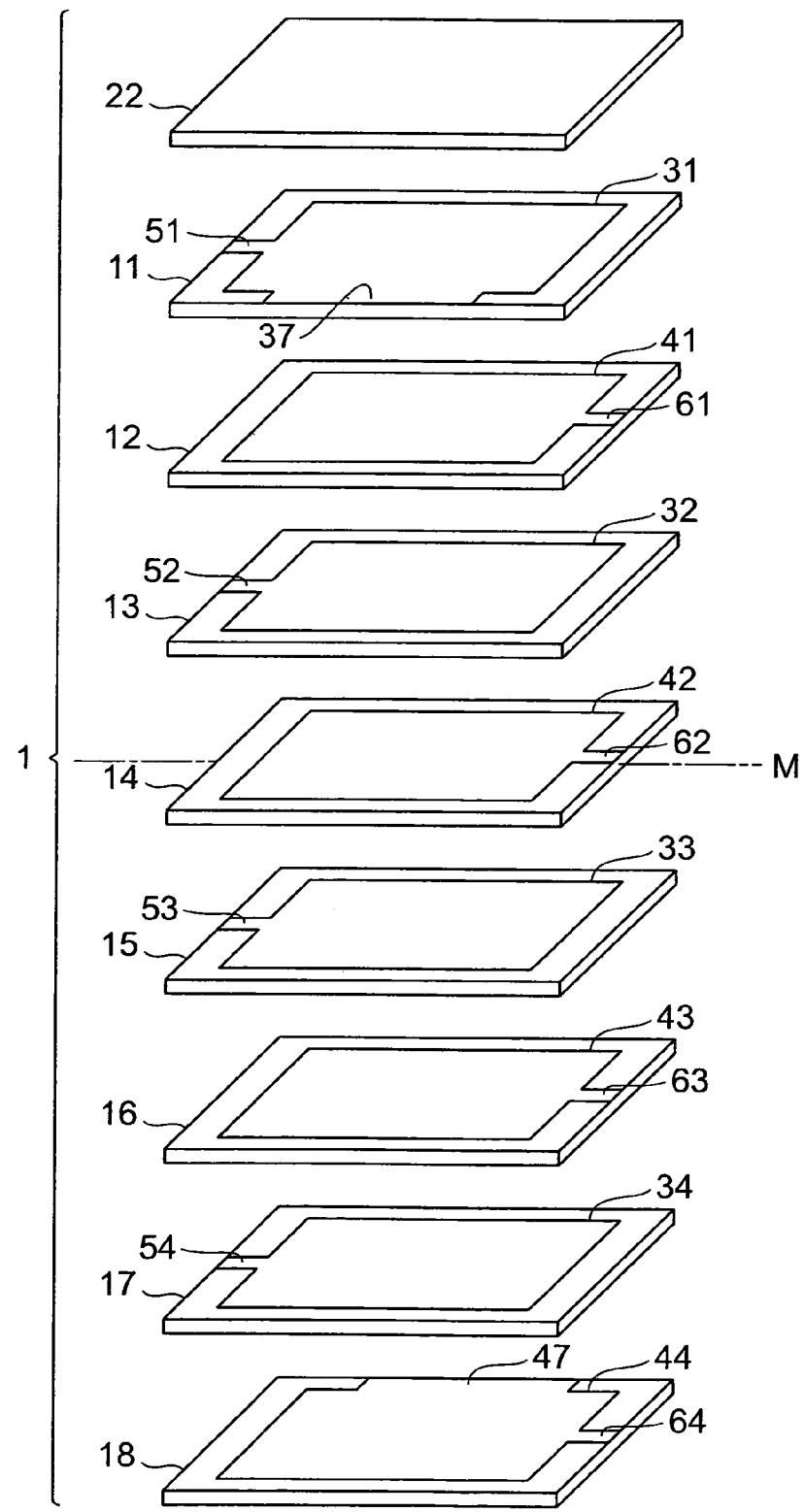
FIG. 2 is an exploded perspective view of the multilayer body included in the multilayer capacitor in accordance with the first embodiment.

With reference to FIGS. 1 and 2, the structure of the multilayer capacitor C1 in accordance with a first embodiment will be explained. FIG. 1 is a perspective view of the multilayer capacitor in accordance with the first embodiment. FIG. 2 is an exploded perspective view of the multilayer body included in the multilayer capacitor in accordance with the first embodiment.

As shown in FIG. 1, the multilayer capacitor C1 comprises a multilayer body 1, first and second terminal electrodes 3, 5 formed on the multilayer body 1, and first and second connecting conductors 7, 9.

The first terminal electrode 3 is formed on a side face 1a extending longitudinally in side faces parallel to a laminating direction which will be explained later in the multilayer body 1. The second terminal electrode 5 is formed on a side face 1b extending longitudinally and opposing the side face 1a formed with the first terminal electrode 3 in the side faces parallel to the laminating direction to be explained later in the multilayer body 1. The first terminal electrode 3 and second terminal electrode 5 are electrically insulated from each other.

The first connecting conductor 7 is formed on the surface of the multilayer body 1 so as to be positioned on a side face $1c$ of the multilayer body 1. The second connecting conductor 9 is formed on the surface of the multilayer body 1 so as to be positioned on a side face $1d$ of the multilayer body 1. The first connecting conductor 7 and second connecting conductor 9 are electrically insulated from each other.

As is also shown in FIG. 2, the multilayer body 1 is constructed by alternately laminating a plurality of (9 in this embodiment) dielectric layers 11 to 18, 22 and a plurality of (4 each in this embodiment) first and second inner electrodes 31 to 34, 41 to 44. The multilayer body 1 also has side faces $1e$, $1f$ opposing each other in the laminating direction to be explained later. In the actual multilayer capacitor C1, the dielectric layers 11 to 18, 22 are integrated to such an extent that no boundaries are discernible therebetween.

Each of the first inner electrodes 31 to 34 has a substantially rectangular form. The first inner electrodes 31 to 34 are formed at respective positions separated by a predetermined distance from a side face parallel to the laminating direction of the dielectric layers 11 to 18, 22 in the multilayer body 1 (hereinafter simply referred to as "laminating direction"). The first inner electrodes 31 to 34 are formed with respective lead conductors 51 to 54 extending so as to reach the side face $1c$ of the multilayer body 1.

The lead conductor 51 is integrally formed with the first inner electrode 31, and extends therefrom so as to reach the side face $1c$ of the multilayer body 1. The lead conductor 52 is integrally formed with the first inner electrode 32, and extends therefrom so as to reach the side face $1c$ of the multilayer body 1. The lead conductor 53 is integrally formed with the first inner electrode 33, and extends therefrom so as to reach the side face $1c$ of the multilayer body 1. The lead conductor 54 is integrally formed with the first inner electrode 34, and extends therefrom so as to reach the side face $1c$ of the multilayer body 1.

The first inner electrodes 31 to 34 are electrically connected to the first connecting conductor 7 through the lead conductors 51 to 54, respectively. Consequently, the first inner electrodes 31 to 34 are electrically connected to each other through the first connecting conductor 7.

A lead conductor 37 is integrally formed with the first inner electrode 31, and extends therefrom so as to reach the side face $1a$ of the multilayer body 1. The first inner electrode 31 is electrically connected to the first terminal electrode 3 through the lead conductor 37. Since the first inner electrodes 31 to 34 are electrically connected to each other through the first connecting conductor 7, the first inner electrodes 32 to 34 are also electrically connected to the first terminal electrode 3 through the first connecting conductor 7, whereby the first inner electrodes 31 to 34 are connected in parallel. The first inner electrode 31 is adjacent to the side face $1e$ of the multilayer body 1 with the dielectric layer 22 interposed therebetween in the laminating direction.

Each of the second inner electrodes 41 to 44 has a substantially rectangular form. The second inner electrodes 41 to 44 are formed at respective positions separated by a predetermined distance from a side face parallel to the laminating direction in the multilayer body 1. The second inner electrodes 41 to 44 are formed with respective lead conductors 61 to 64 extending so as to reach the side face $1d$ of the multilayer body 1.

The lead conductor 61 is integrally formed with the second inner electrode 41, and extends therefrom so as to reach the side face $1d$ of the multilayer body 1. The lead conductor 62 is integrally formed with the second inner electrode 42, and extends therefrom so as to reach the side face $1d$ of the multilayer body 1. The lead conductor 63 is integrally formed with the second inner electrode 43, and extends therefrom so as to reach the side face $1d$ of the multilayer body 1. The lead conductor 64 is integrally formed with the second inner electrode 44, and extends therefrom so as to reach the side face $1d$ of the multilayer body 1.

The second inner electrodes 41 to 44 are electrically connected to the second connecting conductor 9 through the lead conductors 61 to 64, respectively. Consequently, the second inner electrodes 41 to 44 are electrically connected to each other through the second connecting conductor 9.

A lead conductor 47 is integrally formed with the second inner electrode 44, and extends therefrom so as to reach the side face $1b$ of the multilayer body 1. The second inner electrode 44 is electrically connected to the second terminal electrode 5 through the lead conductor 47. Since the second inner electrodes 41 to 44 are electrically connected to each other through the second connecting conductor 9, the second inner electrodes 42 to 44 are also electrically connected to the second terminal electrode 5 through the second connecting conductor 9, whereby the second inner electrodes 41 to 44 are connected in parallel. The second inner electrode 44 is adjacent to the side face $1f$ of the multilayer body 1 with the dielectric layer 18 interposed therebetween in the laminating direction.

Thus, in the multilayer body 1, the second inner electrode 44 electrically connected to the second terminal electrode 5 through the lead conductor 47 is arranged at a position symmetrical to the first inner electrode 31 electrically connected to the first terminal electrode 3 through the lead conductor 37 about the center position M in the laminating direction. On the other hand, in the multilayer body 1, the first inner electrode 31 electrically connected to the first terminal electrode 3 through the lead conductor 37 is arranged at a position symmetrical to the second inner electrode 44 electrically connected to the second terminal electrode 5 through the lead conductor 47 about the center position M in the laminating direction.

In the multilayer capacitor C1, the number of first inner electrode 31 connected to the first terminal electrode 3 through the lead conductor 37 is 1, which is smaller than the total number (4 in this embodiment) of the first inner electrodes 31 to 34. Also, the number of second inner electrode 44 connected to the second terminal electrode 5 through the lead conductor 47 is 1, which is smaller than the total number (4 in this embodiment) of the second inner electrodes 41 to 44. When the first terminal electrode 3 is concerned, the resistance component of the first connecting conductor 7 is connected in series to the first terminal electrode 3. When the second terminal electrode 5 is concerned, the resistance component of the second connecting conductor 9 is connected in series to the second terminal electrode 5. These make the multilayer capacitor C1 attain an equivalent series resistance greater than that in a conventional multilayer capacitor in which all the inner electrodes are connected to their corresponding terminal electrodes through lead conductors. A greater equivalent series resistance prevents impedance from dropping drastically at a resonance frequency, and thus enables a wider frequency band.

By adjusting the number of first inner electrode 31 electrically connected to the first terminal electrode 3 through the lead conductor 37 and the number of second inner electrode 44 electrically connected to the second terminal electrode 5 through the lead conductor 47 in such a fashion, this embodiment sets the equivalent series resistance of the multilayer capacitor C1 to a desirable value, and thus can regulate equivalent series resistance easily with a high precision.

In this embodiment, the first inner electrodes 31 to 34 are connected in parallel, and the second inner electrodes 41 to 44 are connected in parallel. As a consequence, even when the resistance value fluctuates among the first inner electrodes 31 to 34 and second inner electrodes 41 to 44, the equivalent series resistance of the multilayer capacitor C1 as a whole is less likely to be influenced thereby, so that the equivalent series resistance control can be restrained from lowering its precision.

Figure 3:
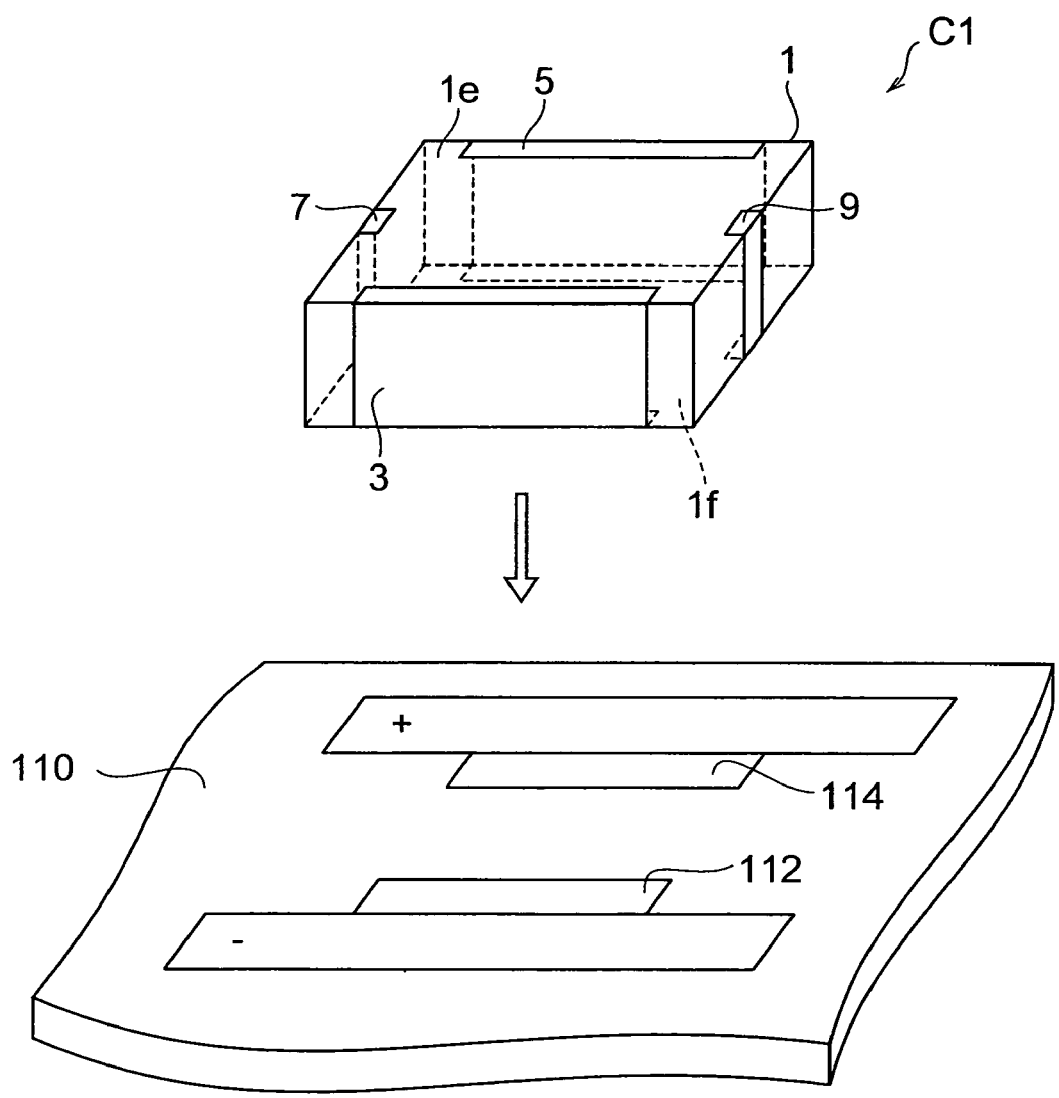
FIG. 3 is a view for explaining a state where the multilayer capacitor in accordance with the first embodiment is mounted onto a substrate.

FIG. 3 is a view for explaining a state where the multilayer capacitor C1 is mounted onto a substrate 110. FIG. 3 shows a state where the first terminal electrode 3 and second terminal electrode 5 are respectively connected to a cathode land pattern 112 and an anode land pattern 114 which are formed on the substrate 110.

Figure 4:
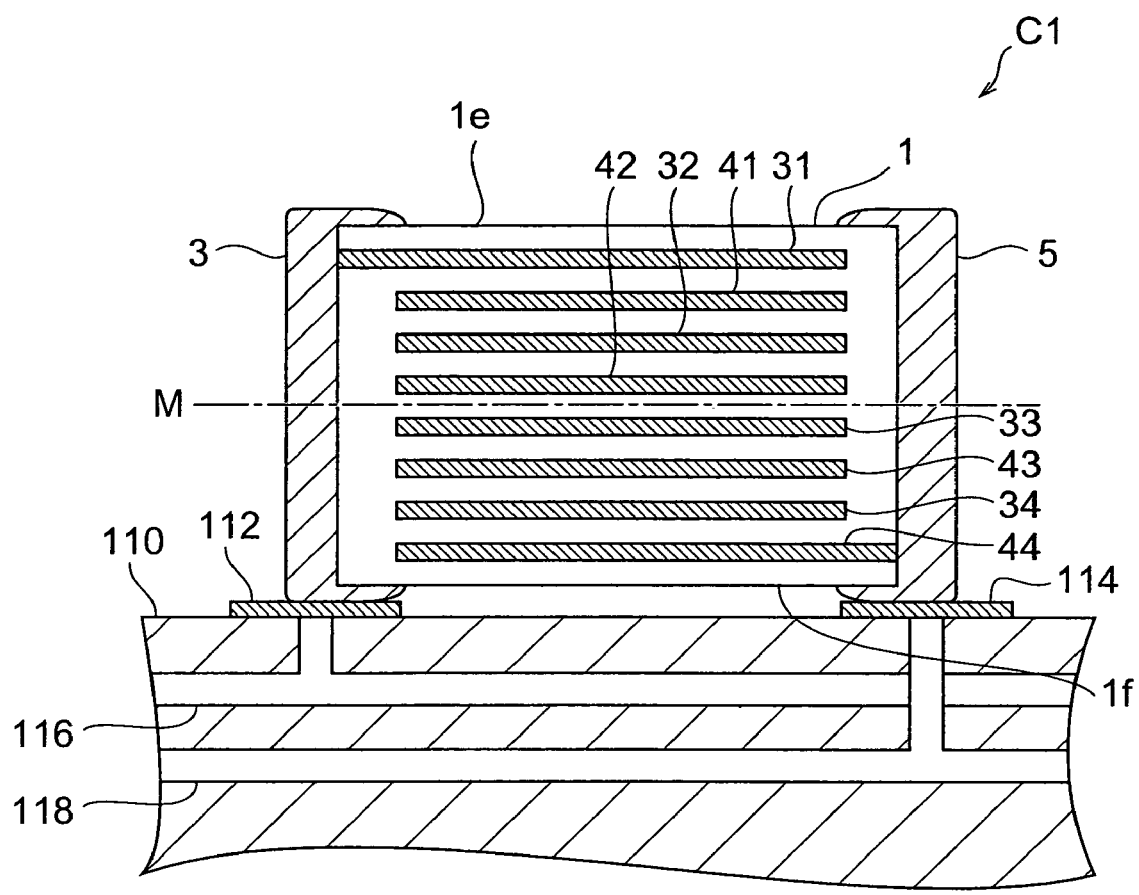
FIG. 4 is a view schematically showing a cross-sectional structure of the multilayer capacitor in accordance with the first embodiment mounted on the substrate.

FIG. 4 is a view schematically showing a cross-sectional structure of the multilayer capacitor C1 mounted on the substrate 110. FIG. 4 shows a state where the multilayer capacitor C1 is mounted such that the side face 1f of the multilayer body 1 opposes the substrate 110. FIG. 4 also shows a state where the cathode land pattern 112 and anode land pattern 114 are respectively connected to leads 116, 118 within the substrate 110. As can be seen from FIG. 4, a current path extending from the cathode land pattern 112 to the anode land pattern 114 through the first terminal electrode 3, the first inner electrode 31 connected to the first terminal electrode 3, the second inner electrode 44 connected to the second terminal electrode 5, and the second terminal electrode 5 is formed in the multilayer capacitor C1 mounted on the substrate 110. In FIG. 4, areas corresponding to the dielectric layers 11 to 18, 22 and leads 116, 118 are not hatched.

When a current flows through the current path thus formed between the land patterns 112, 114, an inductance occurs. The magnitude of this inductance varies depending on the length of the current path. In the multilayer capacitor C1, the inner electrodes 31, 44 connected to the terminal electrodes 3, 5 are arranged at respective positions symmetrical to each other about the center position M in the laminating direction of the multilayer body 1. Consequently, even when the multilayer capacitor C1 is mounted such that not the side face if but the side face 1e of the multilayer body 1 opposes the substrate 110, the distances from the inner electrodes 31, 44 connected to the terminal electrodes 3, 5 to their corresponding land patterns 112, 114 in the laminating direction are hard to vary. Namely, the multilayer capacitor C1 restrains the current path formed between the land patterns from varying its length depending on the mounting direction. As a result, in the multilayer capacitor C1, the value of equivalent series inductance is independent of the mounting direction, and the equivalent series inductance is restrained from fluctuating depending on the mounting direction.

The first terminal electrode 3 is formed on the side face 1a extending longitudinally in the side faces parallel to the laminating direction of the substantially rectangular parallelepiped multilayer body 1, whereas the second terminal electrode 5 is formed on the side face 1b extending longitudinally in the side faces parallel to the laminating direction of the multilayer body 1 and opposing the side face 1a formed with the first terminal electrode in the side faces parallel to the laminating direction of the multilayer body. Consequently, the length by which the first and second inner electrodes 31 to 34, 41 to 44 overlap along the direction from the first terminal electrode 3 to the second terminal electrode 5 becomes shorter. As a result, magnetic fields caused by currents flowing through the first and second inner electrodes 31 to 34, 41 to 44 can be made smaller, whereby the multilayer capacitor C1 can lower the equivalent series inductance.

Second Embodiment

Figure 5:
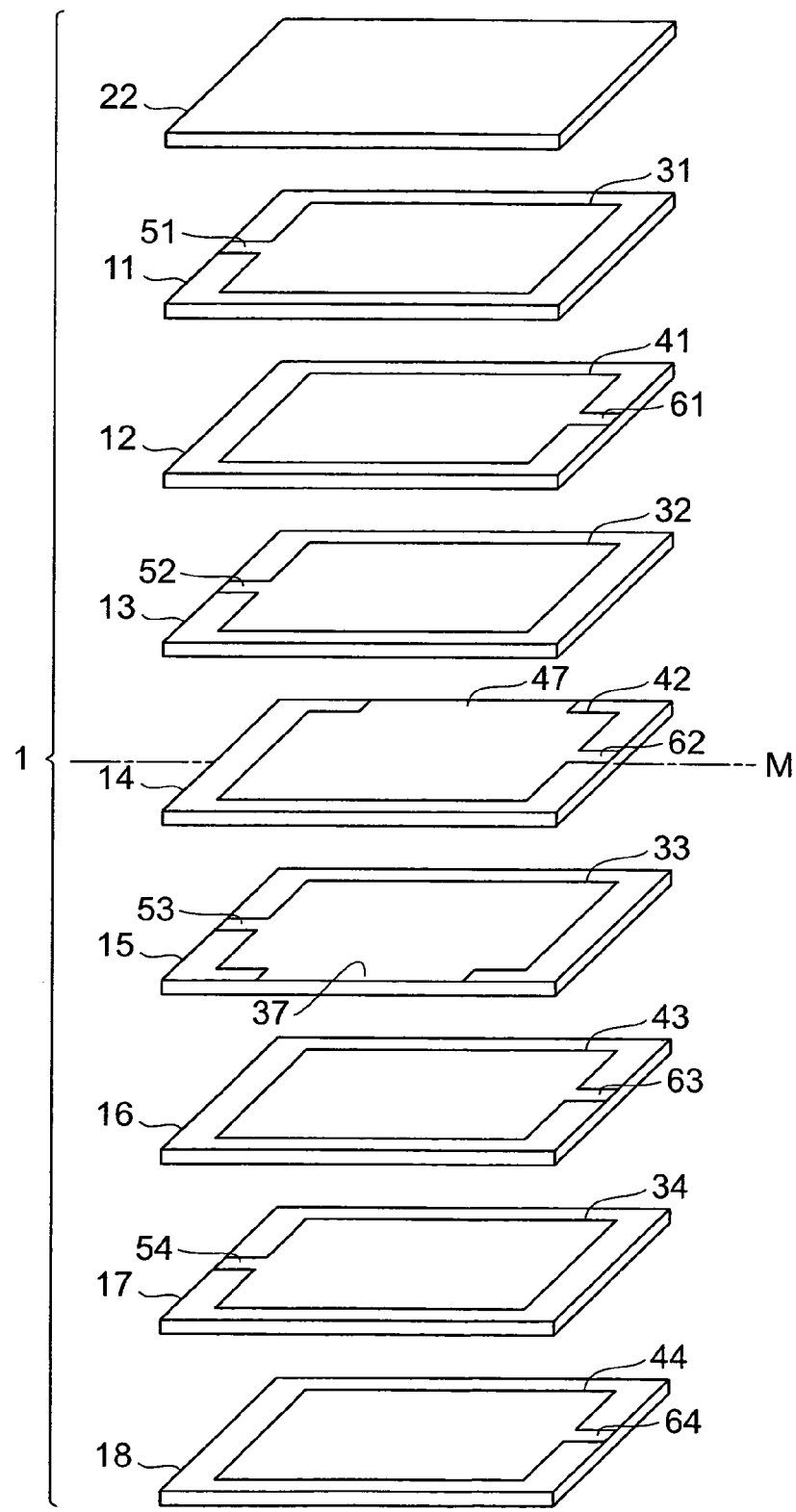
FIG. 5 is an exploded perspective view of the multilayer body included in the multilayer capacitor in accordance with a second embodiment.

With reference to FIG. 5, the structure of the multilayer capacitor in accordance with a second embodiment will be explained. The multilayer capacitor in accordance with the second embodiment differs from the multilayer capacitor C1 in accordance with the first embodiment in terms of positions of a first inner electrode 33 connected to a first terminal electrode 3 through a lead conductor 37 and a second inner electrode 42 connected to 1a second terminal electrode 5 through a lead conductor 47 in the laminating direction. FIG. 5 is an exploded perspective view of the multilayer body included in the multilayer capacitor in accordance with the second embodiment.

As with the multilayer capacitor C1 in accordance with the first embodiment, the multilayer capacitor in accordance with the second embodiment comprises a multilayer body 1, the first terminal electrode 3 formed on the multilayer body 1, the second terminal electrode 5 similarly formed on the multilayer body 1, and first and second connecting conductors 7, 9, which are not depicted.

In the multilayer capacitor in accordance with the second embodiment, as shown in FIG. 5, the third-highest first inner electrode 33 in four first inner electrodes 31 to 34 is electrically connected to the first terminal electrode 3 through the lead conductor 37. Consequently, the first inner electrodes 31, 32, 34 are electrically connected to the first terminal electrode 3, whereby the first inner electrodes 31 to 34 are connected in parallel. The lead conductor 37 is integrally formed with the first inner electrode 33, and extends therefrom so as to reach a side face 1a extending longitudinally in side faces parallel to the laminating direction of the multilayer body 1.

In the multilayer capacitor in accordance with the second embodiment, as shown in FIG. 5, the second-highest second inner electrode 42 in four second inner electrodes 41 to 44 is electrically connected to the second terminal electrode 5 through the lead conductor 47. Consequently, the second inner electrodes 41, 43, 44 are electrically connected to the second terminal electrode 5, whereby the second inner electrodes 41 to 44 are connected in parallel. The lead conductor 47 is integrally formed with the second inner electrode 42, and extends therefrom so as to reach a side face 1b extending longitudinally and opposing the side face 1a in the side faces parallel to the laminating direction of the multilayer body 1.

In the multilayer capacitor in accordance with the second embodiment, the number of first inner electrode 33 connected to the first terminal electrode 3 through the lead conductor 37 is 1, which is smaller than the total number (4 in this embodiment) of the first inner electrodes 31 to 34. Also, the number of second inner electrode 42 connected to the second terminal electrode 5 through the lead conductor 47 is 1, which is smaller than the total number (4 in this embodiment) of the second inner electrodes 41 to 44. These make the multilayer capacitor in accordance with the second embodiment attain an equivalent series resistance greater than that in a conventional multilayer capacitor in which all the inner electrodes are connected to their corresponding terminal electrodes through lead conductors.

When the first terminal electrode 3 is concerned, at the first inner electrode 33 as a boundary, the resistance component of the first connecting conductor 7 is divided into the resistance component of the first connecting conductor 7 positioned on one side of the first inner electrode 33 in the laminating direction and the resistance component of the first connecting conductor 7 positioned on the other side of the first inner electrode 33 in the laminating direction. These resistance components are connected in parallel to the first terminal electrode 3. When the second terminal electrode 5 is concerned, at the second inner electrode 42 as a boundary, the resistance component of the second connecting conductor 9 is divided into the resistance component of the second connecting conductor 9 positioned on one side of the second inner electrode 42 in the laminating direction and the resistance component of the second connecting conductor 9 positioned on the other side of the second inner electrode 42 in the laminating direction. These resistance components are connected in parallel to the second terminal electrode 5.

Therefore, because of the difference in resistance components of the first and second connecting conductors 7, 9, the multilayer capacitor in accordance with the second embodiment yields an equivalent series resistance smaller than that of the multilayer capacitor C1 in accordance with the first embodiment.

By adjusting the position of the first inner electrode 33 electrically connected to the first terminal electrode 3 through the lead conductor 37 in the laminating and the position of the second inner electrode 42 electrically connected to the second terminal electrode 5 through the lead conductor 47 in the laminating direction as in the foregoing, this embodiment sets the equivalent series resistance of the multilayer capacitor to a desirable value and thus can regulate the equivalent series resistance easily with a high precision.

In the multilayer body 1 of the multilayer capacitor in accordance with the second embodiment, the second inner electrode 42 electrically connected to the second terminal electrode 5 through the lead conductor 47 is arranged at a position symmetrical to the first inner electrode 33 electrically connected to the first terminal electrode 3 through the lead conductor 37 about the center position M in the laminating direction. On the other hand, in the multilayer body 1 of the multilayer capacitor in accordance with the second embodiment, the first inner electrode 33 electrically connected to the first terminal electrode 3 through the lead conductor 37 is arranged at a position symmetrical to the second inner electrode 42 electrically connected to the second terminal electrode 5 through the lead conductor 47 about the center position M in the laminating direction. Therefore, when any of two side faces 1e, 1f opposing each other in the laminating direction of the multilayer body 1 opposes a substrate or the like at the time of mounting, the length of a current path formed between land patterns or the like on the substrate through an inner electrode is hard to change. Consequently, the multilayer capacitor in accordance with the second embodiment restrains the equivalent series inductance from fluctuating depending on the mounting direction.

The first terminal electrode 3 is formed on the side face 1a extending longitudinally in the side faces parallel to the laminating direction of the substantially rectangular parallelepiped multilayer body 1, whereas the second terminal electrode 5 is formed on the side face 1b extending longitudinally and opposing the side face 1a formed with the first terminal electrode 3 in the side faces parallel to the laminating direction of the multilayer body 1. Consequently, magnetic fields caused by currents flowing through the first and second inner electrodes 31 to 34, 41 to 44 can be made smaller, whereby the multilayer capacitor in accordance with the second embodiment can lower the equivalent series inductance.

Third Embodiment

Figure 6:
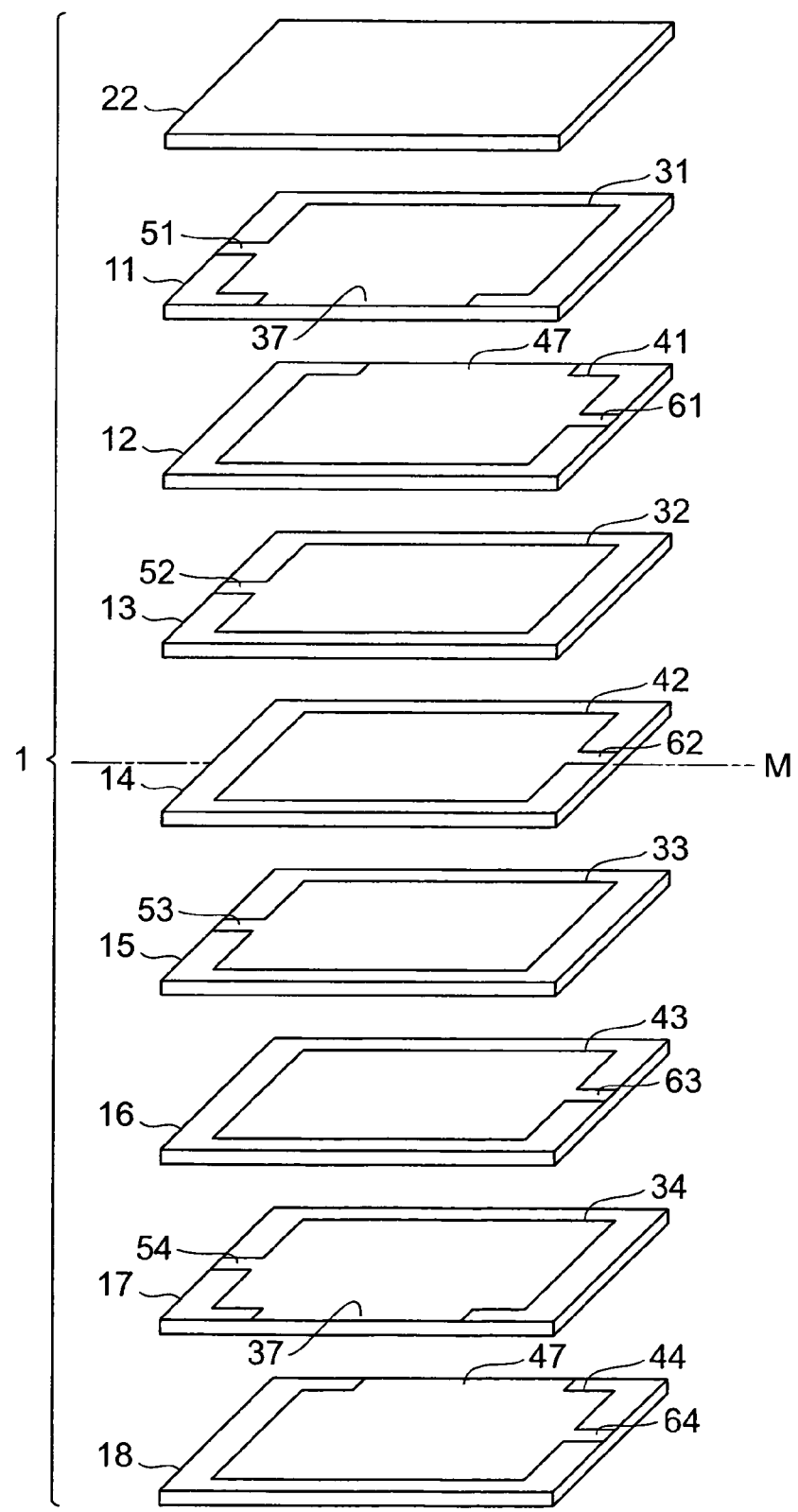
FIG. 6 is an exploded perspective view of the multilayer body included in the multilayer capacitor in accordance with a third embodiment.

With reference to FIG. 6, the structure of the multilayer capacitor in accordance with a third embodiment will be explained. The multilayer capacitor in accordance with the third embodiment differs from the multilayer capacitor C1 in accordance with the first embodiment in terms of the number of first and second inner electrodes 31, 34, 41, 44 connected to terminal electrodes 3, 5 through lead conductors 37, 47. FIG. 6 is an exploded perspective view of the multilayer body included in the multilayer capacitor in accordance with the third embodiment.

As with the multilayer capacitor C1 in accordance with the first embodiment, the multilayer capacitor in accordance with the third embodiment comprises a multilayer body 1, the first terminal electrode 3 formed on the multilayer body 1, the second terminal electrode 5 similarly formed on the multilayer body 1, and first and second connecting conductors 7, 9, which are not depicted.

In the multilayer capacitor in accordance with the third embodiment, as shown in FIG. 6, two first inner electrodes 31, 34 among four first inner electrodes 31 to 34 are electrically connected to the first terminal electrode 3 through the lead conductors 37. Since the first inner electrodes 31 to 34 are electrically connected to each other through the first connecting conductor 7, the first inner electrodes 32, 33 are also electrically connected to the first terminal electrode 3 through the first connecting conductor 7, whereby the first inner electrodes 31 to 34 are connected in parallel. The lead conductors 37 are integrally formed with their corresponding first inner electrodes 31, 34, and extend therefrom so as to reach a side face 1a extending longitudinally in side faces parallel to the laminating direction of the multilayer body 1.

Two second inner electrodes 41, 44 among four second inner electrodes 41 to 44 are electrically connected to the second terminal electrode 5 through the lead conductors 47. Since the second inner electrodes 41 to 44 are electrically connected to each other through the second connecting conductor 9, the second inner electrodes 42, 43 are also electrically connected to the second terminal electrode 5 through the second connecting conductor 9, whereby the second inner electrodes 41 to 44 are connected in parallel. The lead conductors 47 are integrally formed with their corresponding second inner electrodes 41, 44, and extend therefrom so as to reach a side face 1b extending longitudinally and opposing the side face 1a in the side faces parallel to the laminating direction of the multilayer body 1.

In the multilayer capacitor in accordance with the third embodiment, the number of first inner electrodes 31, 34 connected to the first terminal electrode 3 through the lead conductors 37 is 2, which is smaller than the total number of first inner electrodes 31 to 34. Also, the number of second inner electrodes 41, 44 connected to the second terminal electrode 5 through the lead conductors 47 is 2, which is smaller than the total number of second inner electrodes 41 to 44. These make the multilayer capacitor in accordance with the third embodiment yield an equivalent series resistance greater than that of a conventional multilayer capacitor in which all the inner electrodes are connected to their corresponding terminal electrodes through lead conductors.

In the multilayer body in accordance with the third embodiment, the number of first inner electrodes 31, 34 connected to the first terminal electrode 3 through the lead conductors 37 is greater than that in the multilayer capacitor C1, whereas the lead conductors 37 are connected in parallel to the first terminal electrode 3. Also, the number of second inner electrodes 41, 44 connected to the second terminal electrode 5 through the lead conductors 47 is greater, whereas the lead conductors 47 are connected in parallel to the second terminal electrode 5. These make the multilayer capacitor in accordance with the third embodiment yield an equivalent series resistance smaller than that of the multilayer capacitor C1.

By adjusting the number of first inner electrodes 31, 34 electrically connected to the first terminal electrode 3 through the lead conductors 37 and the number of second inner electrodes 41, 44 electrically connected to the second terminal electrode 5 through the lead conductors 47 as in the foregoing, the third embodiment sets the equivalent series resistance of the multilayer capacitor to a desirable value and thus can regulate the equivalent series resistance easily with a high precision.

In the multilayer body 1 of the multilayer capacitor in accordance with the third embodiment, the second inner electrode 44 electrically connected to the second terminal electrode 5 through the lead conductor 47 is arranged at a position symmetrical to the first inner electrode 31 electrically connected to the first terminal electrode 3 through the lead conductor 37 about the center position M in the laminating direction. In the multilayer body 1, the second inner electrode 41 electrically connected to the second terminal electrode 5 through the lead conductor 47 is arranged at a position symmetrical to the first inner electrode 34 electrically connected to the first terminal electrode 3 through the lead conductor 37 about the center position M in the laminating direction. On the other hand, in the multilayer body 1 of the multilayer capacitor in accordance with the third embodiment, the first inner electrode 34 electrically connected to the first terminal electrode 3 through the lead conductor 37 is arranged at a position symmetrical to the second inner electrode 41 electrically connected to the second terminal electrode 5 through the lead conductor 47 about the center position M in the laminating direction. In the multilayer body 1, the first inner electrode 31 electrically connected to the first terminal electrode 3 through the lead conductor 37 is arranged at a position symmetrical to the second inner electrode 44 electrically connected to the second terminal electrode 5 through the lead conductor 47 about the center position M in the laminating direction. Therefore, when any of two side faces 1e, 1f opposing each other in the laminating direction of the multilayer body 1 opposes a substrate or the like at the time of mounting, the length of a current path formed between land patterns or the like on the substrate through an inner electrode is hard to change. Consequently, the multilayer capacitor in accordance with the third embodiment restrains the equivalent series inductance from fluctuating depending on the mounting direction.

The first terminal electrode 3 is formed on the side face 1a extending longitudinally in the side faces parallel to the laminating direction of the rectangular parallelepiped multilayer body 1, whereas the second terminal electrode 5 is formed on the side face 1b extending longitudinally and opposing the side face 1a formed with the first terminal electrode 3 in the side faces parallel to the laminating direction of the multilayer body 1. Consequently, magnetic fields caused by currents flowing through the first and second inner electrodes 31 to 34, 41 to 44 can be made smaller, whereby the multilayer capacitor in accordance with the third embodiment can lower the equivalent series inductance.

Fourth Embodiment

Figure 7:
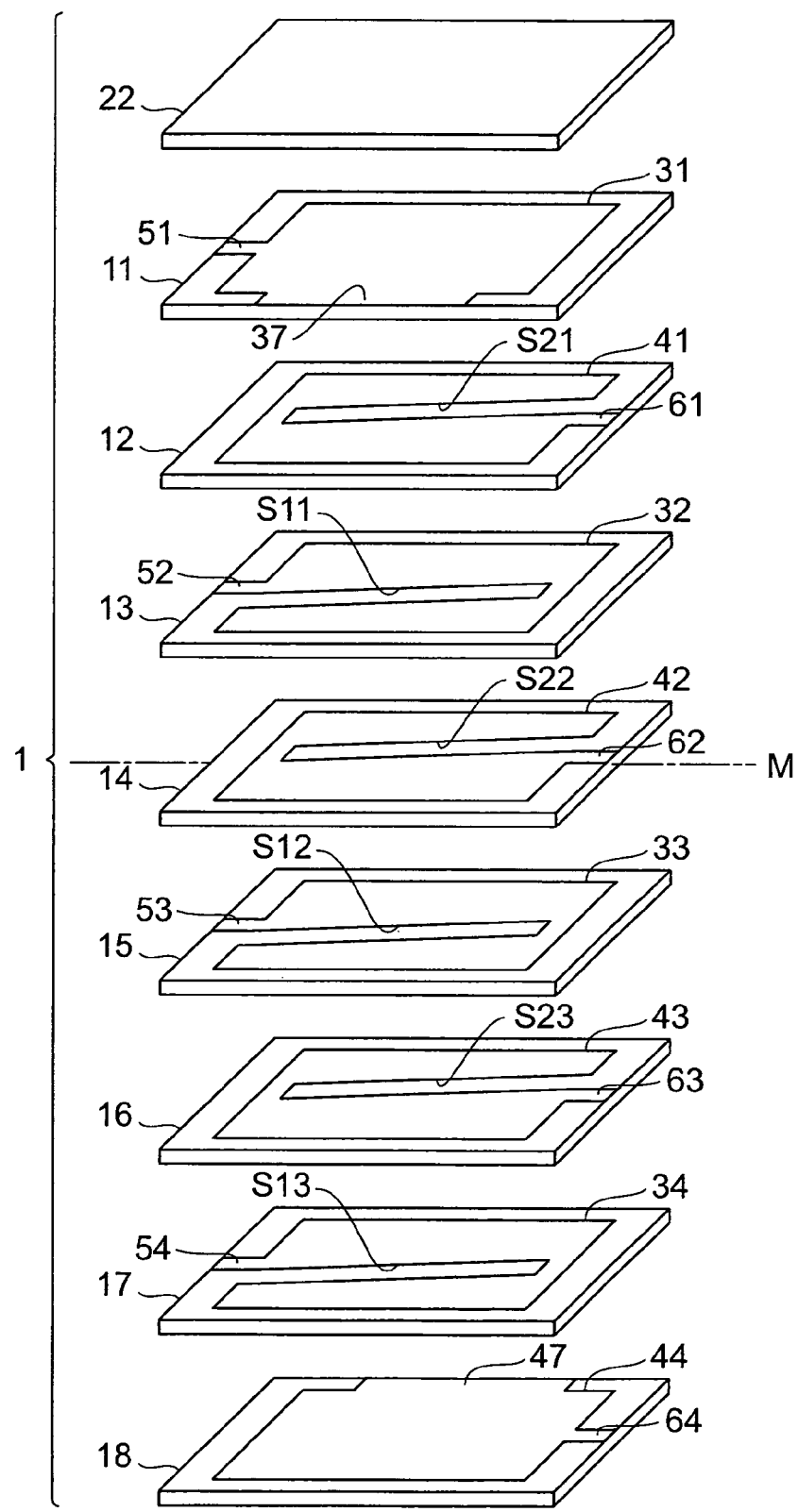
FIG. 7 is an exploded perspective view of the multilayer body included in the multilayer capacitor in accordance with a fourth embodiment.

With reference to FIG. 7, the structure of the multilayer capacitor in accordance with a fourth embodiment will be explained. The multilayer capacitor in accordance with the fourth embodiment differs from the multilayer capacitor C1 in accordance with the first embodiment in that first and second inner electrodes 32 to 34, 41 to 43 are formed with slits. FIG. 7 is an exploded perspective view of the multilayer body included in the multilayer capacitor in accordance with the fourth embodiment.

As with the multilayer capacitor C1 in accordance with the first embodiment, the multilayer capacitor in accordance with the fourth embodiment comprises a multilayer body 1, a first terminal electrode 3 formed on the multilayer body 1, a second terminal electrode 5 similarly formed on the multilayer body 1, and first and second connecting conductors 7, 9, which are not depicted.

The first inner electrodes 32 to 34 are formed with slits S11 to S13 extending in the longitudinal direction of the first inner electrodes 32 to 34 from sides of connecting parts between lead conductors 52 to 54 and the first inner electrodes 32 to 34, respectively. Therefore, the slits S11 to S13 are formed in their corresponding first inner electrodes 32 to 34 such that currents flow in directions opposite from each other in areas opposing each other across the slits S11 to S13.

The second inner electrodes 41 to 43 are formed with slits S21 to S23 extending in the longitudinal direction of the second inner electrodes 41 to 44 from sides of connecting parts between lead conductors 61 to 63 and the second inner electrodes 41 to 43, respectively. Therefore, the slits S21 to S23 are formed in their corresponding second inner electrodes 41 to 43 such that currents flow in directions opposite from each other in areas opposing each other across the slits S21 to S23.

In the first and second inner electrodes 32 to 34, 41 to 43 formed with the slits S11 to S13, S21 to S23, currents flow in directions opposite from each other in areas opposing each other across the slits S11 to S13, S21 to S23, whereby magnetic fields caused by the currents cancel each other out. Also, in the laminating direction, currents flow in respective directions opposite from each other in the first inner electrodes 32 to 34 and second inner electrodes 41 to 43 formed with the slits. Therefore, magnetic fields caused by currents flowing through the first inner electrodes 32 to 34 and magnetic fields caused by currents flowing through the second inner electrodes 41 to 43 cancel each other out. Consequently, the multilayer capacitor in accordance with the fourth embodiment can reduce its equivalent series inductance.

In the multilayer capacitor in accordance with the fourth embodiment, the number of first inner electrode 31 connected to the first terminal electrode 3 through a lead conductor 37 is 1, which is smaller than the total number (4 in this embodiment) of first inner electrodes 31 to 34. The number of second inner electrode 44 connected to the second terminal electrode 5 through a lead conductor 47 is 1, which is smaller than the total number (4 in this embodiment) of second inner electrodes 41 to 44. These make the multilayer capacitor in accordance with the fourth embodiment attain an equivalent series resistance greater than that of a conventional multilayer capacitor in which all the inner electrodes are connected to their corresponding terminal electrodes through lead conductors.

By adjusting the number of first inner electrode 31 electrically connected to the first terminal electrode 3 through the lead conductor 37 and the number of second inner electrode 44 electrically connected to the second terminal electrode 5 through the lead conductor 47 as in the foregoing, the fourth embodiment sets the equivalent series resistance of the multilayer capacitor to a desirable value and thus can regulate the equivalent series resistance easily with a high precision.

In the multilayer body 1 of the multilayer capacitor in accordance with the fourth embodiment, the second inner electrode 44 electrically connected to the second terminal electrode 5 through the lead conductor 47 is arranged at a position symmetrical to the first inner electrode 31 electrically connected to the first terminal electrode 3 through the lead conductor 37 about the center position M in the laminating direction. On the other hand, in the multilayer body 1 of the multilayer capacitor in accordance with the fourth embodiment, the first inner electrode 31 electrically connected to the first terminal electrode 3 through the lead conductor 37 is arranged at a position symmetrical to the second inner electrode 44 electrically connected to the second terminal electrode 5 through the lead conductor 47 about the center position M in the laminating direction. Therefore, when any of two side faces 1e, 1f opposing each other in the laminating direction of the multilayer body 1 opposes a substrate or the like at the time of mounting, the length of a current path formed between land patterns or the like on the substrate through an inner electrode is hard to change. Consequently, the multilayer capacitor in accordance with the fourth embodiment restrains the equivalent series inductance from fluctuating depending on the mounting direction.

The first terminal electrode 3 is formed on a side face 1a extending longitudinally in the side faces parallel to the laminating direction of the rectangular parallelepiped multilayer body 1, whereas the second terminal electrode 5 is formed on a side face 1b extending longitudinally and opposing the side face 1a formed with the first terminal electrode 3 in the side faces parallel to the laminating direction of the multilayer body 1. Consequently, magnetic fields caused by currents flowing through the first and second inner electrodes 31 to 34, 41 to 44 can be made smaller, whereby the multilayer capacitor in accordance with the fourth embodiment can lower the equivalent series inductance.

Figure 8:
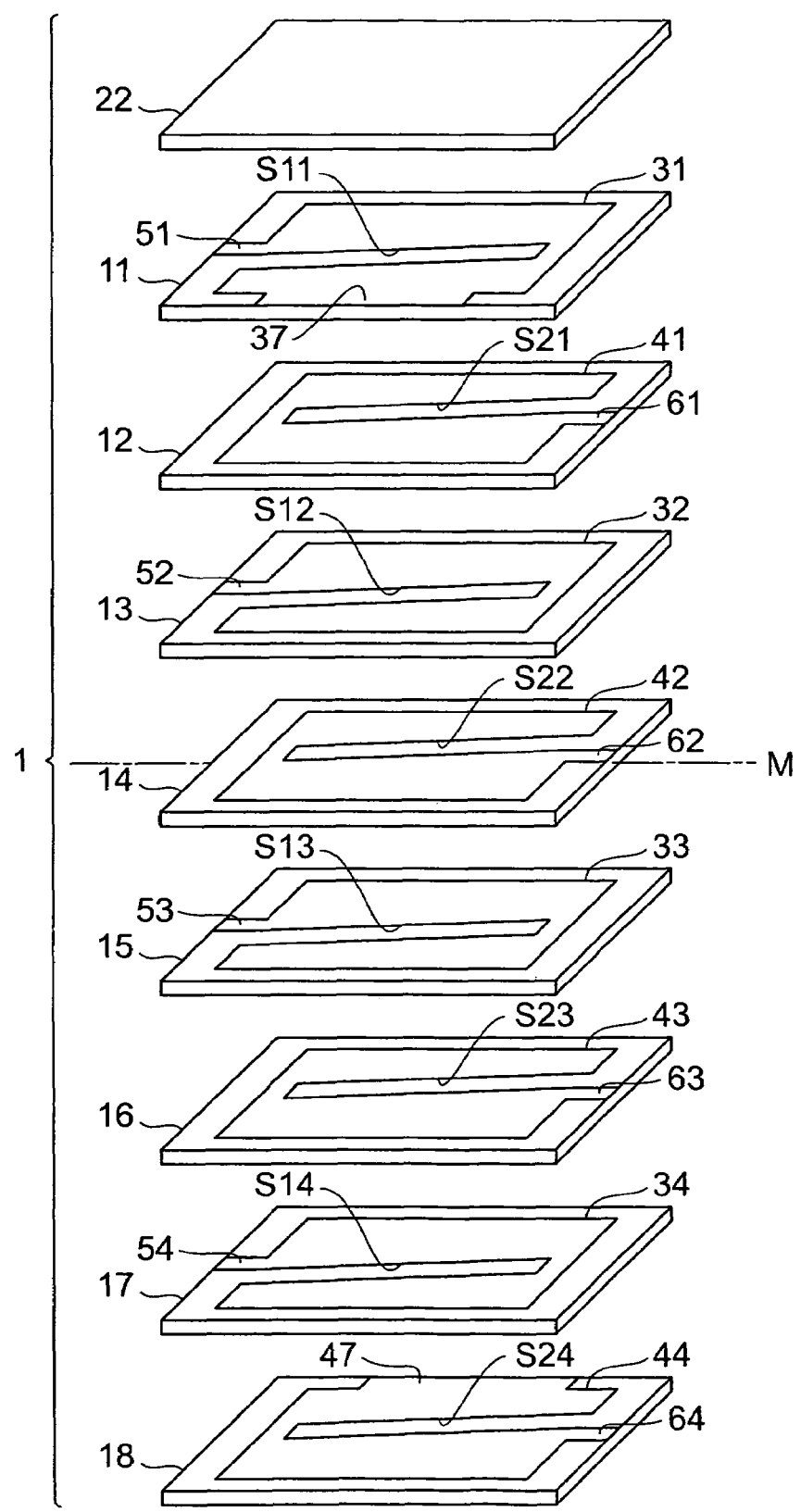
FIG. 8 is an exploded perspective view of the multilayer body included in a modified example of the multilayer capacitor in accordance with the fourth embodiment.

The inner electrodes formed with slits are not limited to the first and second inner electrodes 32 to 34, 41 to 43. Namely, inner electrodes other than the first and second inner electrodes 32 to 34, 41 to 43 may be formed with slits. For example, the first and second inner electrodes 31, 44 electrically connected to the first and second terminal electrodes 3, 5 through the lead conductors 37, 47 may be formed with slits. FIG. 8 is an exploded perspective view showing, as an example of this case, a multilayer capacitor in which the first and second inner electrodes 31 to 36, 41 to 45 are formed with slits S11 to S14, S21 to S24. When the first and second inner electrodes 31, 44 electrically connected to the first and second terminal electrodes 3, 5 through the lead conductors 37, 47 are formed with slits S11, S24, magnetic fields caused by currents cancel each other out in these inner electrodes 31, 44 as well. Therefore, the equivalent series inductance can further be lowered in the multilayer capacitor.

Fifth Embodiment

Figure 9:
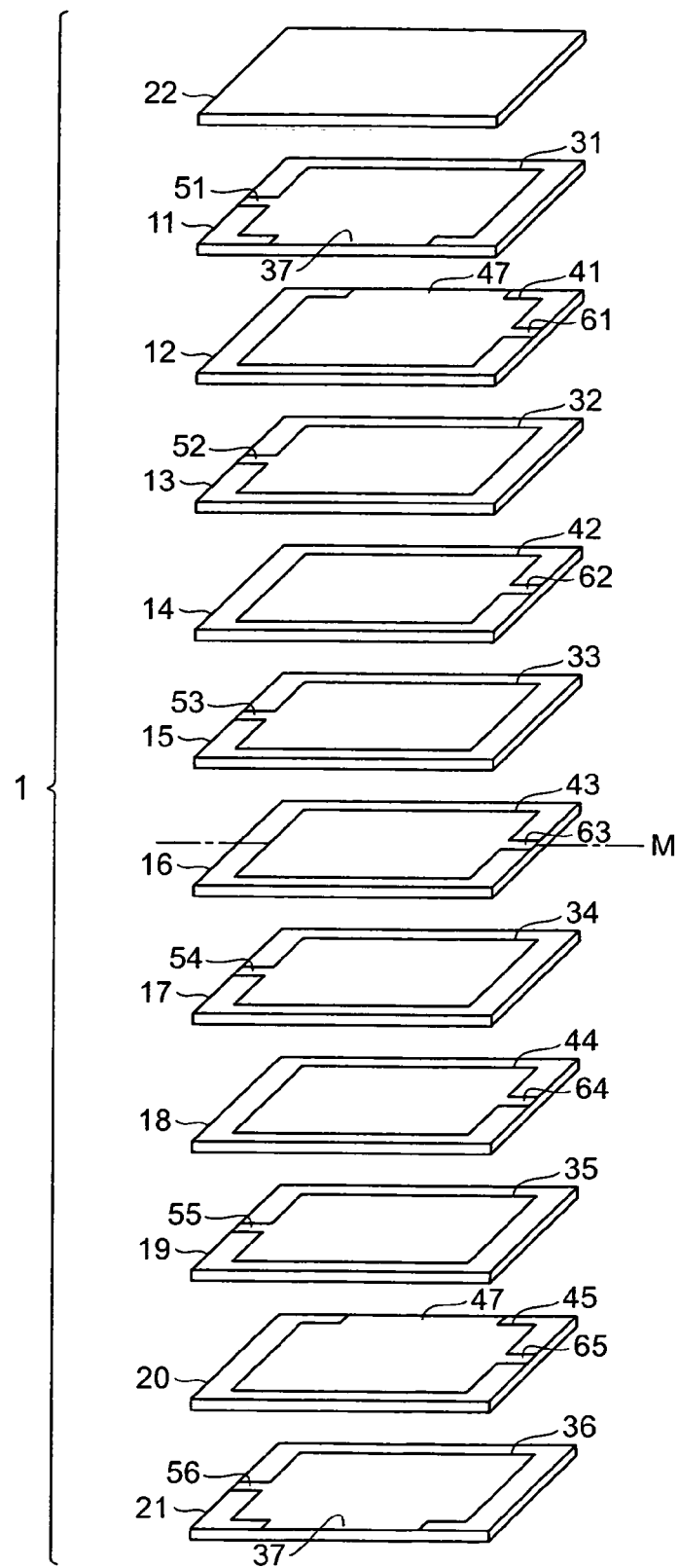
FIG. 9 is an exploded perspective view of the multilayer body included in the multilayer capacitor in accordance with a fifth embodiment.

With reference to FIG. 9, the structure of the multilayer capacitor in accordance with a fifth embodiment will be explained. The multilayer capacitor in accordance with the fifth embodiment differs from the multilayer capacitor C1 in accordance with the first embodiment in that the inner electrode arranged at a position symmetrical to a first inner electrode connected to a first terminal electrode about the center position of the multilayer body in the laminating direction is a first inner electrode and that the inner electrode arranged at a position symmetrical to a second inner electrode connected to a second terminal electrode about the center position of the multilayer body in the laminating direction is a second inner electrode. FIG. 9 is an exploded perspective view of the multilayer body included in the multilayer capacitor in accordance with the fifth embodiment.

As with the multilayer capacitor C1 in accordance with the first embodiment, the multilayer capacitor in accordance with the fifth embodiment comprises a multilayer body 1, a first terminal electrode 3 formed on the multilayer body 1, a second terminal electrode 5 similarly formed on the multilayer body 1, and first and second connecting conductors 7, 9, which are not depicted.

As is also shown in FIG. 9, the multilayer body 1 is constructed by alternately laminating a plurality of (12 in this embodiment) dielectric layers 11 to 22 and a plurality of (respectively 6 and 7 in this embodiment) first and second inner electrodes 31 to 36, 41 to 45. In the actual multilayer capacitor, the dielectric layers 11 to 22 are integrated to such an extent that no boundaries are discernible therebetween.

Each of the first inner electrodes 31 to 36 has a substantially rectangular form. The first inner electrodes 31 to 36 are formed at respective positions separated by a predetermined distance from a side face parallel to the laminating direction of the dielectric layers 11 to 22 in the multilayer body 1 (hereinafter simply referred to as "laminating direction"). The first inner electrodes 31 to 36 are formed with respective lead conductors 51 to 56 extending so as to reach a side face 1c of the multilayer body 1.

The lead conductor 51 is integrally formed with the first inner electrode 31, and extends therefrom so as to reach the side face 1c of the multilayer body 1. The lead conductor 52 is integrally formed with the first inner electrode 32, and extends therefrom so as to reach the side face 1c of the multilayer body 1. The lead conductor 53 is integrally formed with the first inner electrode 33, and extends therefrom so as to reach the side face 1c of the multilayer body 1. The lead conductor 54 is integrally formed with the first inner electrode 34, and extends therefrom so as to reach the side face 1c of the multilayer body 1. The lead conductor 55 is integrally formed with the first inner electrode 35, and extends therefrom so as to reach the side face 1c of the multilayer body 1. The lead conductor 56 is integrally formed with the first inner electrode 36, and extends therefrom so as to reach the side face 1c of the multilayer body 1.

The first inner electrodes 31 to 36 are electrically connected to the first connecting conductor 7 through the lead conductors 51 to 56, respectively. Consequently, the first inner electrodes 31 to 36 are electrically connected to each other through the first connecting conductor 7.

A lead conductor 37 is integrally formed with the first inner electrode 31, and extends therefrom so as to reach a side face 1a of the multilayer body 1. The first inner electrode 31 is electrically connected to the first terminal electrode 3 through the lead conductor 37. A lead conductor 37 is integrally formed with the first inner electrode 36, and extends therefrom so as to reach the side face 1a of the multilayer body 1. The first inner electrode 36 is electrically connected to the first terminal electrode 3 through the lead conductor 37. Since the first inner electrodes 31 to 36 are electrically connected to each other through the first connecting conductor 7, the first inner electrodes 32 to 35 are also electrically connected to the first terminal electrode 3 through the first connecting conductor 7, whereby the first inner electrodes 31 to 36 are connected in parallel. The first inner electrode 31 is adjacent to a side face 1e of the multilayer body 1 with the dielectric layer 22 interposed therebetween in the laminating direction. The first inner electrode 36 is adjacent to a side face 1f of the multilayer body 1 with the dielectric layer 21 interposed therebetween in the laminating direction.

Each of the second inner electrodes 41 to 45 has a substantially rectangular form. The second inner electrodes 41 to 45 are formed at respective positions separated by a predetermined distance from a side face parallel to the laminating direction in the multilayer body 1. The second inner electrodes 41 to 45 are formed with respective lead conductors 61 to 65 extending so as to reach a side face 1d of the multilayer body 1.

The lead conductor 61 is integrally formed with the second inner electrode 41, and extends therefrom so as to reach the side face 1d of the multilayer body 1. The lead conductor 62 is integrally formed with the second inner electrode 42, and extends therefrom so as to reach the side face 1d of the multilayer body 1. The lead conductor 63 is integrally formed with the second inner electrode 43, and extends therefrom so as to reach the side face 1d of the multilayer body 1. The lead conductor 64 is integrally formed with the second inner electrode 44, and extends therefrom so as to reach the side face 1d of the multilayer body 1. The lead conductor 65 is integrally formed with the second inner electrode 45, and extends therefrom so as to reach the side face 1d of the multilayer body 1.

The second inner electrodes 41 to 45 are electrically connected to the second connecting conductor 9 through the lead conductors 61 to 65, respectively. Consequently, the second inner electrodes 41 to 45 are electrically connected to each other through the second connecting conductor 9.

A lead conductor 47 is integrally formed with the second inner electrode 41, and extends therefrom so as to reach a side face 1b of the multilayer body 1. The second inner electrode 41 is electrically connected to the second terminal electrode 5 through the lead conductor 47. A lead conductor 47 is integrally formed with the second inner electrode 45, and extends therefrom so as to reach the side face 1b of the multilayer body 1. The second inner electrode 45 is electrically connected to the second terminal electrode 5 through the lead conductor 47. Since the second inner electrodes 41 to 45 are electrically connected to each other through the second connecting conductor 9, the second inner electrodes 42 to 44 are also electrically connected to the second terminal electrode 5 through the second connecting conductor 9, whereby the second inner electrodes 41 to 45 are connected in parallel.

Thus, in the multilayer body 1, the first inner electrode 36 electrically connected to the first terminal electrode 3 through the lead conductor 37 is arranged at a position symmetrical to the first inner electrode 31 electrically connected to the first terminal electrode 3 through the lead conductor 37 about the center position M in the laminating direction. In the multilayer body 1, the first inner electrode 31 electrically connected to the first terminal electrode 3 through the lead conductor 37 is arranged at a position symmetrical to the first inner electrode 36 electrically connected to the first terminal electrode 3 through the lead conductor 37 about the center position M in the laminating direction.

On the other hand, in the multilayer body 1, the second inner electrode 45 electrically connected to the second terminal electrode 5 through the lead conductor 47 is arranged at a position symmetrical to the second inner electrode 41 electrically connected to the second terminal electrode 5 through the lead conductor 47 about the center position M in the laminating direction. In the multilayer body 1, the second inner electrode 41 electrically connected to the second terminal electrode 5 through the lead conductor 47 is arranged at a position symmetrical to the second inner electrode 45 electrically connected to the second terminal electrode 5 through the lead conductor 47 about the center position M in the laminating direction.

In the multilayer capacitor in accordance with the fifth embodiment, the number of first inner electrodes 31, 36 connected to the first terminal electrode 3 through the lead conductors 37 is 2, which is smaller than the total number (6 in this embodiment) of first inner electrodes 31 to 36. Also, the number of second inner electrodes 41, 45 connected to the second terminal electrode 5 through the lead conductors 47 is 2, which is smaller than the total number (5 in this embodiment) of second inner electrodes 41 to 45. These make the multilayer capacitor in accordance with the fifth embodiment yield an equivalent series resistance greater than that of a conventional multilayer capacitor in which all the inner electrodes are connected to their corresponding terminal electrodes through lead conductors. A greater equivalent series resistance prevents impedance from dropping drastically at a resonance frequency, and thus enables a wider band.

By adjusting the number of first inner electrodes 31, 36 electrically connected to the first terminal electrode 3 through the lead conductors 37 and the number of second inner electrodes 41, 45 electrically connected to the second terminal electrode 5 through the lead conductors 47 in such a fashion, the fifth embodiment sets the equivalent series resistance of the multilayer capacitor to a desirable value, and thus can regulate equivalent series resistance easily with a high precision.

In this embodiment, the first inner electrodes 31 to 36 are connected in parallel, and the second inner electrodes 41 to 45 are connected in parallel. As a consequence, even when the resistance value fluctuates among the first inner electrodes 31 to 36 and second inner electrodes 41 to 45, the equivalent series resistance of the multilayer capacitor in accordance with the fifth embodiment as a whole is less likely to be influenced thereby, so that the equivalent series resistance control can be restrained from lowering its precision.

Figure 10:
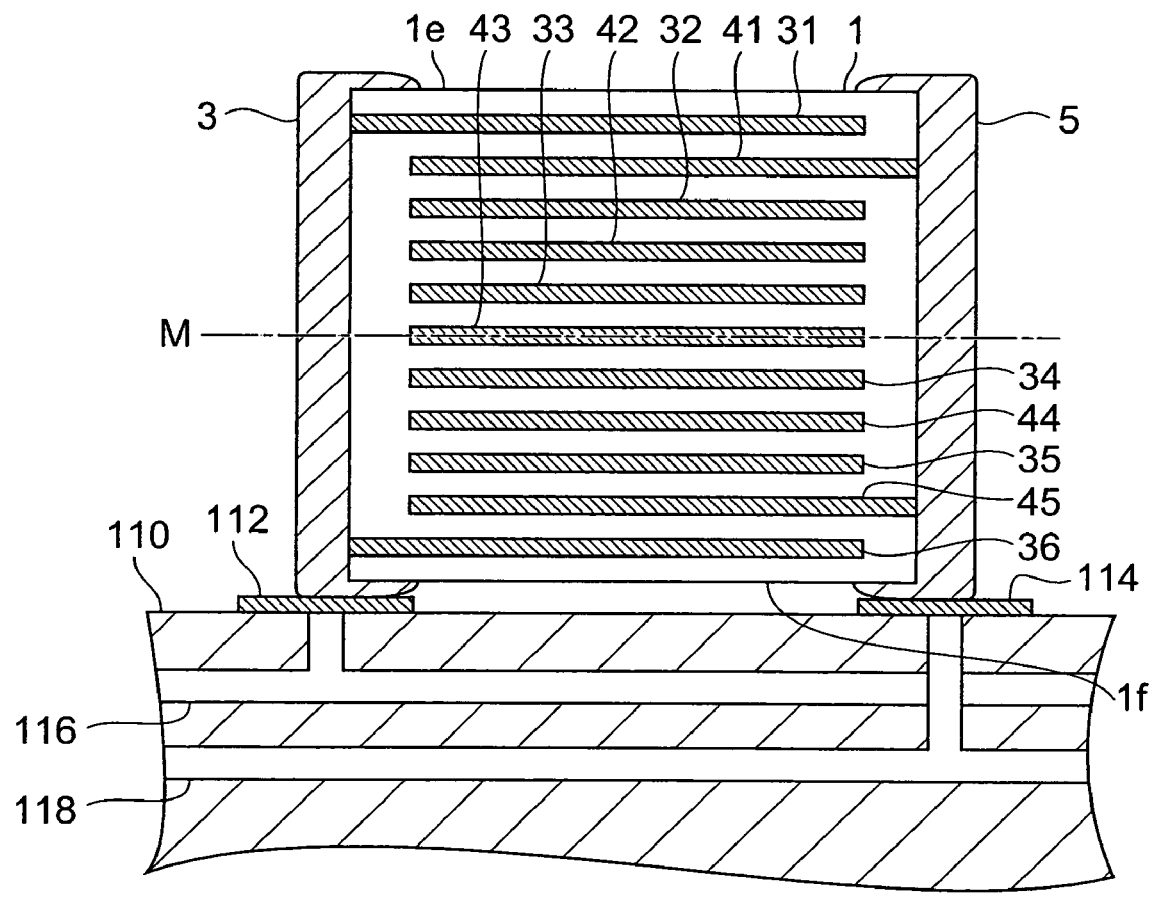
FIG. 10 is a view schematically showing a cross-sectional structure of the multilayer capacitor in accordance with the fifth embodiment mounted on the substrate.

FIG. 10 is a view schematically showing a cross-sectional structure of the multilayer capacitor in accordance with the fifth embodiment mounted on a substrate 110. FIG. 10 shows a state where the multilayer capacitor in accordance with the fifth embodiment is mounted such that the side face 1f of the multilayer body 1 opposes the substrate 110. FIG. 10 also shows a state where a cathode land pattern 112 and an anode land pattern 114 are respectively connected to leads 116, 118 within the substrate 110. As can be seen from FIG. 10, a current path extending from the cathode land pattern 112 to the anode land pattern 114 through the first terminal electrode 3, the first inner electrodes 31, 36 connected to the first terminal electrode 3, the second inner electrode 44, 45 connected to the second terminal electrode 5, and the second terminal electrode 5 is formed in the multilayer capacitor in accordance with the fifth embodiment mounted on the substrate 110. In FIG. 10, areas corresponding to the dielectric layers 11 to 22 and leads 116, 118 are not hatched.

When a current flows through the current path thus formed between the land patterns, an inductance occurs. The magnitude of this inductance varies depending on the length of the current path. In the multilayer capacitor in accordance with the fifth embodiment, the inner electrodes 36, 31, 45, 41 are arranged at respective positions symmetrical to the inner electrodes 31, 36, 41, 45 connected to the terminal electrodes 3, 5 about the center position M in the laminating direction of the multilayer body 1. Consequently, even when the multilayer capacitor in accordance with the fifth embodiment is mounted such that not the side face if but the side face 1e of the multilayer body 1 opposes the substrate 110, the distances from the inner electrodes 31, 36, 41, 45 connected to the terminal electrodes 3, 5 to their corresponding land patterns 112, 114 in the laminating direction are hard to vary. Namely, the multilayer capacitor in accordance with the fifth embodiment restrains the current path formed between the land patterns from varying its length depending on the mounting direction. As a result, in the multilayer capacitor in accordance with the fifth embodiment, the value of equivalent series inductance is independent of the mounting direction, and the equivalent series inductance is restrained from fluctuating depending on the mounting direction.

The first terminal electrode 3 is formed on the side face 1a extending longitudinally in the side faces parallel to the laminating direction of the rectangular parallelepiped multilayer body 1, whereas the second terminal electrode 5 is formed on the side face 1b extending longitudinally and opposing the side face 1a formed with the first terminal electrode 3 in the side faces parallel to the laminating direction of the multilayer body 1. Consequently, the length by which the first and second inner electrodes 31 to 36, 41 to 45 overlap along the direction from the first terminal electrode 3 to the second terminal electrode 5 becomes shorter. As a result, magnetic fields caused by currents flowing through the first and second inner electrodes 31 to 36, 41 to 45 can be made smaller, whereby the multilayer capacitor in accordance with the fifth embodiment can lower the equivalent series inductance.

Sixth Embodiment

Figure 11:
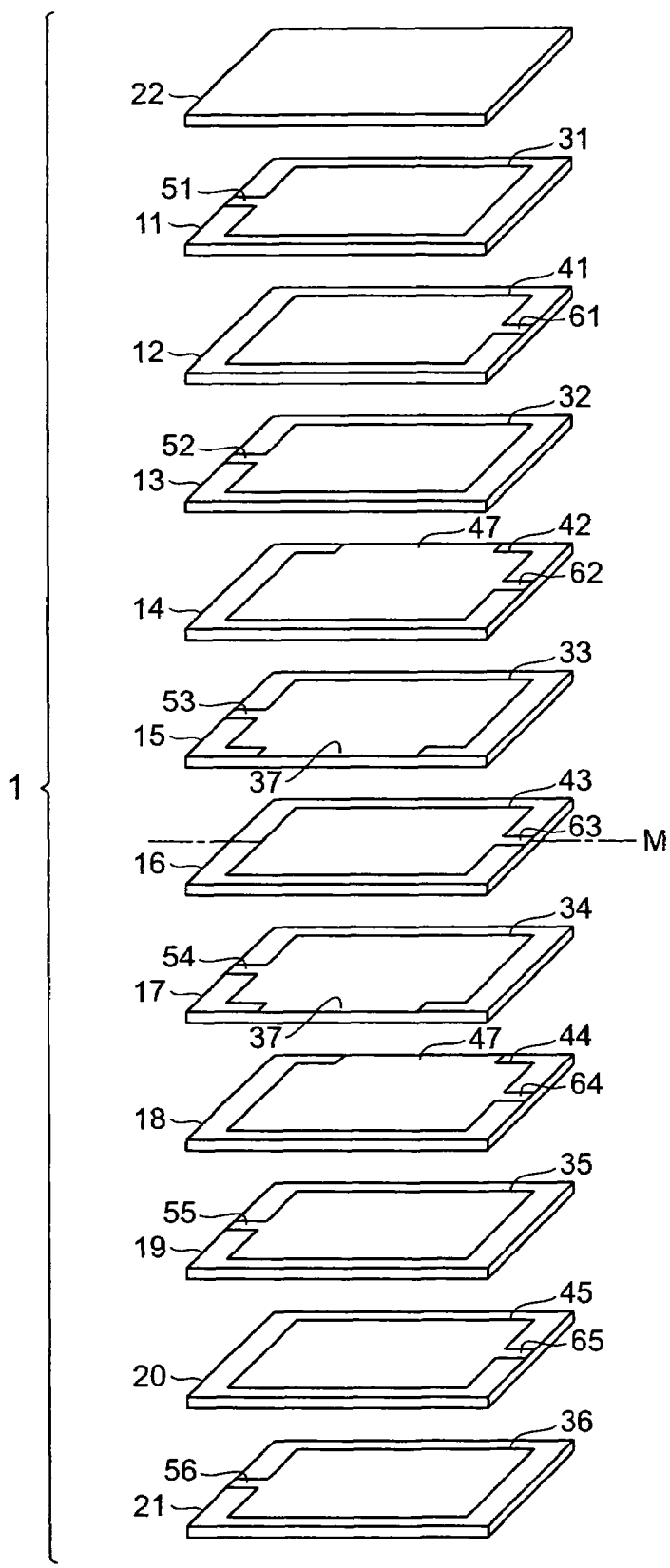
FIG. 11 is an exploded perspective view of the multilayer body included in the multilayer capacitor in accordance with a sixth embodiment.

With reference to FIG. 11, the structure of the multilayer capacitor in accordance with a sixth embodiment will be explained. The multilayer capacitor in accordance with the sixth embodiment differs from the multilayer capacitor in accordance with the fifth embodiment in terms of positions of first inner electrodes 33, 34 connected to a first terminal electrode 3 through lead conductors 37 and second inner electrodes 42, 44 connected to a second terminal electrode 5 through lead conductors 47. FIG. 11 is an exploded perspective view of the multilayer body included in the multilayer capacitor in accordance with the sixth embodiment.

As with the multilayer capacitor C1 in accordance with the first embodiment, the multilayer capacitor in accordance with the sixth embodiment comprises a multilayer body 1, the first terminal electrode 3 formed on the multilayer body 1, the second terminal electrode 5 similarly formed on the multilayer body 1, and first and second connecting conductors 7, 9, which are not depicted.

In the multilayer capacitor in accordance with the sixth embodiment, as shown in FIG. 11, the third-highest first inner electrode 33 and fourth-highest first inner electrode 34 in six first inner electrodes 31 to 36 are electrically connected to the first terminal electrode 3 through the lead conductors 37. Consequently, the first inner electrodes 31, 32, 35, 36 are electrically connected to the first terminal electrode 3, whereby the first inner electrodes 31 to 36 are connected in parallel. The lead conductors 37 are integrally formed with the first inner electrodes 33, 34, and extend therefrom so as to reach a side face 1a extending longitudinally in side faces parallel to the laminating direction of the multilayer body 1.

In the multilayer capacitor in accordance with the sixth embodiment, as shown in FIG. 11, the second-highest second inner electrode 42 and fourth-highest second inner electrode 44 in five second inner electrodes 41 to 45 are electrically connected to the second terminal electrode 5 through the lead conductors 47. Consequently, the second inner electrodes 41, 43, 45 are electrically connected to the second terminal electrode 5, whereby the second inner electrodes 41 to 45 are connected in parallel. The lead conductors 47 are integrally formed with the second inner electrodes 42, 44, and extend therefrom so as to reach a side face 1b extending longitudinally and opposing the side face 1a in the side faces parallel to the laminating direction of the multilayer body 1.

In the multilayer capacitor in accordance with the sixth embodiment, the number of first inner electrodes 33, 34 connected to the first terminal electrode 3 through the lead conductors 37 is 2, which is smaller than the total number (6 in this embodiment) of the first inner electrodes 31 to 36. Also, the number of second inner electrodes 42, 44 connected to the second terminal electrode 5 through the lead conductors 47 is 2, which is smaller than the total number (5 in this embodiment) of the second inner electrodes 41 to 45. These make the multilayer capacitor in accordance with the sixth embodiment attain an equivalent series resistance greater than that in a conventional multilayer capacitor in which all the inner electrodes are connected to their corresponding terminal electrodes through lead conductors.

When the first terminal electrode 3 is concerned, the multilayer capacitor in accordance with the sixth embodiment differs from the multilayer capacitor in accordance with the fifth embodiment in how the resistance component of the first connecting conductor 7 is connected to the first terminal electrode 3. Namely, the resistance component of the first connecting conductor 7 is connected in series to each of the first inner electrodes 31, 36 in the multilayer capacitor in accordance with the fifth embodiment. In the multilayer capacitor in accordance with the sixth embodiment, on the other hand, the resistance component of the first connecting conductor 7 is divided at the first inner electrodes 33, 34 as boundaries, and thus divided resistance components are connected in parallel to the first terminal electrode 3. Also, when the second terminal electrode 5 is concerned, the multilayer capacitor in accordance with the sixth embodiment differs from the multilayer capacitor in accordance with the fifth embodiment in how the resistance component of the second connecting conductor 9 is connected to the second terminal electrode 5. Namely, the resistance component of the second connecting conductor 9 is connected in series to each of the second inner electrodes 41, 45 in the multilayer capacitor in accordance with the fifth embodiment. In the multilayer capacitor in accordance with the sixth embodiment, on the other hand, the resistance component of the second connecting conductor 9 is divided at the second inner electrodes 42, 44 as boundaries, and thus divided resistance components are connected in parallel to the second terminal electrode 5.

Therefore, because of the difference in resistance components of the first and second connecting conductors 7, 9, the multilayer capacitor in accordance with the sixth embodiment yields an equivalent series resistance smaller than that of the multilayer capacitor in accordance with the fifth embodiment. (See technical details of paragraphs 0098 and 0099.)

By adjusting the positions of the first inner electrodes 33, 34 electrically connected to the first terminal electrode 3 through the lead conductors 37 and the second inner electrodes 42, 44 electrically connected to the second terminal electrode 5 through the lead conductors 47 in the laminating direction as in the foregoing, this embodiment sets the equivalent series resistance of the multilayer capacitor to a desirable value and thus can regulate the equivalent series resistance easily with a high precision.

In the multilayer body 1 of the multilayer capacitor in accordance with the sixth embodiment, the first inner electrode 34 electrically connected to the first terminal electrode 3 through the lead conductor 37 is arranged at a position symmetrical to the first inner electrode 33 electrically connected to the first terminal electrode 3 through the lead conductor 37 about the center position M in the laminating direction. In the multilayer body 1, the first inner electrode 33 electrically connected to the first terminal electrode 3 through the lead conductor 37 is arranged at a position symmetrical to the first inner electrode 34 electrically connected to the first terminal electrode 3 through the lead conductor 37 about the center position M in the laminating direction. On the other hand, in the multilayer body 1 of the multilayer capacitor in accordance with the sixth embodiment, the second inner electrode 44 electrically connected to the second terminal electrode 5 through the lead conductor 47 is arranged at a position symmetrical to the second inner electrode 42 electrically connected to the second terminal electrode 5 through the lead conductor 47 about the center position M in the laminating direction. In the multilayer body 1, the second inner electrode 42 electrically connected to the second terminal electrode 5 through the lead conductor 47 is arranged at a position symmetrical to the second inner electrode 44 electrically connected to the second terminal electrode 5 through the lead conductor 47 about the center position M in the laminating direction. Therefore, when any of two side faces 1e, 1f opposing each other in the laminating direction of the multilayer body 1 opposes a substrate or the like at the time of mounting, the length of a current path formed between land patterns or the like on the substrate through an inner electrode is hard to change. Consequently, the multilayer capacitor in accordance with the sixth embodiment restrains the equivalent series inductance from fluctuating depending on the mounting direction.

The first terminal electrode 3 is formed on the side face 1a extending longitudinally in the side faces parallel to the laminating direction of the substantially rectangular parallelepiped multilayer body 1, whereas the second terminal electrode 5 is formed on the side face 1b extending longitudinally and opposing the side face 1a formed with the first terminal electrode 3 in the side faces parallel to the laminating direction of the multilayer body 1. Consequently, magnetic fields caused by currents flowing through the first and second inner electrodes 31 to 36, 41 to 45 can be made smaller, whereby the multilayer capacitor in accordance with the sixth embodiment can lower the equivalent series inductance.

Seventh Embodiment

Figure 12:
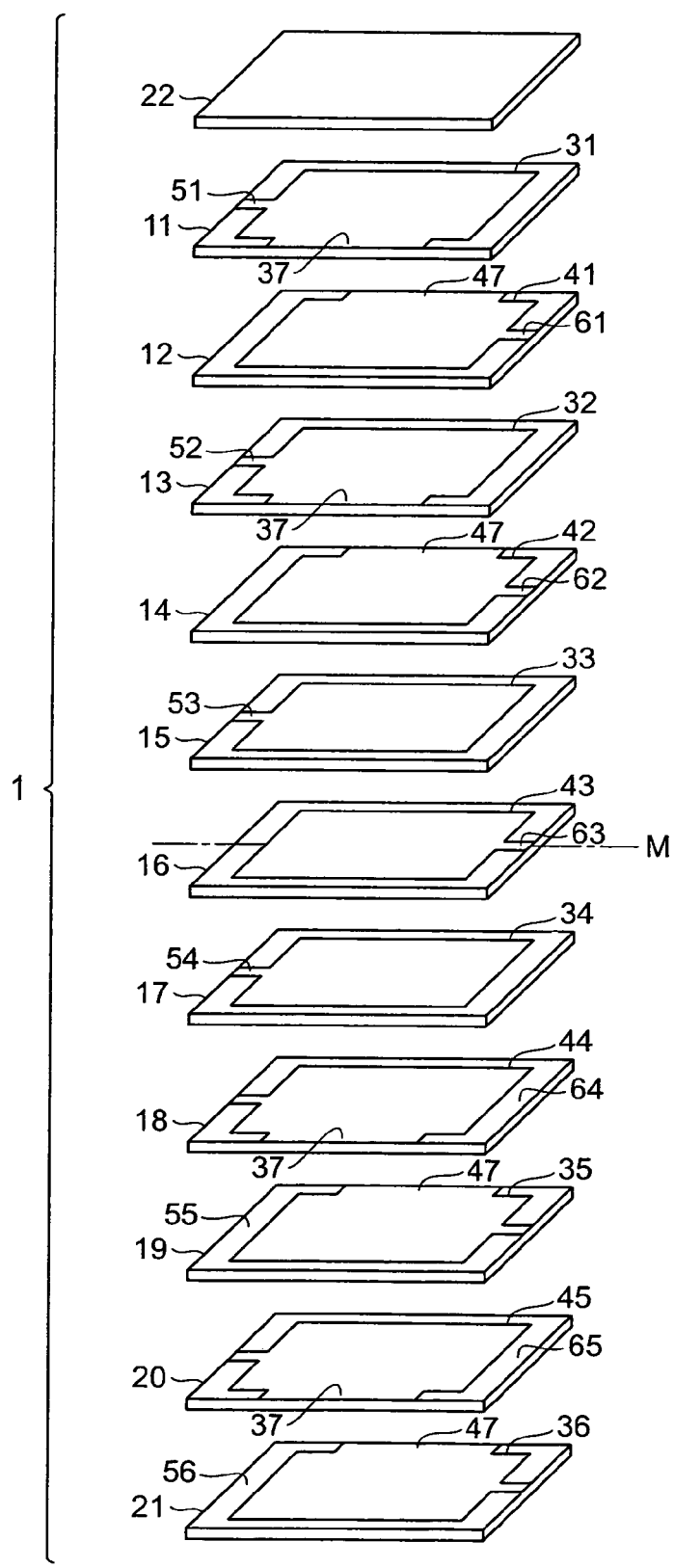
FIG. 12 is an exploded perspective view of the multilayer body included in the multilayer capacitor in accordance with a seventh embodiment.

With reference to FIG. 12, the structure of the multilayer capacitor in accordance with a seventh embodiment will be explained. The multilayer capacitor in accordance with the seventh embodiment differs from the multilayer capacitor in accordance with the fifth embodiment in terms of the number of first and second inner electrodes 31, 32, 35, 36, 41, 42, 44, 45 connected to terminal electrodes 3, 5 through lead conductors 37, 47. FIG. 12 is an exploded perspective view of the multilayer body included in the multilayer capacitor in accordance with the seventh embodiment.

As with the multilayer capacitor C1 in accordance with the first embodiment, the multilayer capacitor in accordance with the seventh embodiment comprises a multilayer body 1, the first terminal electrode 3 formed on the multilayer body 1, the second terminal electrode 5 similarly formed on the multilayer body 1, and first and second connecting conductors 7, 9, which are not depicted.

In the multilayer capacitor in accordance with the seventh embodiment, as shown in FIG. 12, four first inner electrodes 31, 32, 35, 36 among six first inner electrodes 31 to 36 are electrically connected to the first terminal electrode 3 through the lead conductors 37. Since the first inner electrodes 31 to 36 are electrically connected to each other through the first connecting conductor 7, the first inner electrodes 33, 34 are also electrically connected to the first terminal electrode 3 through the first connecting conductor 7, whereby the first inner electrodes 31 to 36 are connected in parallel. The lead conductors 37 are integrally formed with their corresponding first inner electrodes 31, 32, 35, 36, and extend therefrom so as to reach a side face 1a extending longitudinally in side faces parallel to the laminating direction of the multilayer body 1.

Four second inner electrodes 41, 42, 44, 45 among five second inner electrodes 41 to 45 are electrically connected to the second terminal electrode 5 through the lead conductors 47. Since the second inner electrodes 41 to 45 are electrically connected to each other through the second connecting conductor 9, the second inner electrode 43 is also electrically connected to the second terminal electrode 5 through the second connecting conductor 9, whereby the second inner electrodes 41 to 45 are connected in parallel. The lead conductors 47 are integrally formed with their corresponding second inner electrodes 41, 42, 44, 45, and extend therefrom so as to reach a side face 1b extending longitudinally and opposing the side face 1a in the side faces parallel to the laminating direction of the multilayer body 1.

In the multilayer capacitor in accordance with the seventh embodiment, the number of first inner electrodes 31, 32, 35, 36 connected to the first terminal electrode 3 through the lead conductors 37 is 4, which is smaller than the total number of first inner electrodes 31 to 36. Also, the number of second inner electrodes 41, 42, 44, 45 connected to the second terminal electrode 5 through the lead conductors 47 is 4, which is smaller than the total number of second inner electrodes 41 to 45. These make the multilayer capacitor in accordance with the seventh embodiment yield an equivalent series resistance greater than that of a conventional multilayer capacitor in which all the inner electrodes are connected to their corresponding terminal electrodes through lead conductors.

In the multilayer body in accordance with the seventh embodiment, the number of first inner electrodes 31, 32, 35, 36 connected to the first terminal electrode 3 through the lead conductors 37 is greater than that in the multilayer capacitor in accordance with the fifth embodiment, whereas the lead conductors 37 are connected in parallel to the first terminal electrode 3. Also, the number of second inner electrodes 41, 42, 44, 45 connected to the second terminal electrode 5 through the lead conductors 47 is greater, whereas the lead conductors 47 are connected in parallel to the second terminal electrode 5. These make the multilayer capacitor in accordance with the seventh embodiment yield an equivalent series resistance smaller than that of the multilayer capacitor in accordance with the fifth embodiment.

By adjusting the number of first inner electrodes 31, 32, 35, 36 electrically connected to the first terminal electrode 3 through the lead conductors 37 and the number of second inner electrodes 41, 42, 44, 45 electrically connected to the second terminal electrode 5 through the lead conductors 47 as in the foregoing, the seventh embodiment sets the equivalent series resistance of the multilayer capacitor to a desirable value and thus can regulate the equivalent series resistance easily with a high precision.

In the multilayer body 1 of the multilayer capacitor in accordance with the seventh embodiment, the first inner electrode 36 electrically connected to the first terminal electrode 3 through the lead conductor 37 is arranged at a position symmetrical to the first inner electrode 31 electrically connected to the first terminal electrode 3 through the lead conductor 37 about the center position M in the laminating direction. In the multilayer body 1, the first inner electrode 35 electrically connected to the first terminal electrode 3 through the lead conductor 37 is arranged at a position symmetrical to the first inner electrode 32 electrically connected to the first terminal electrode 3 through the lead conductor 37 about the center position M in the laminating direction. In the multilayer body 1, the first inner electrode 32 electrically connected to the first terminal electrode 3 through the lead conductor 37 is arranged at a position symmetrical to the first inner electrode 35 electrically connected to the first terminal electrode 3 through the lead conductor 37 about the center position M in the laminating direction. In the multilayer body 1, the first inner electrode 31 electrically connected to the first terminal electrode 3 through the lead conductor 37 is arranged at a position symmetrical to the first inner electrode 36 electrically connected to the first terminal electrode 3 through the lead conductor 37 about the center position M in the laminating direction.

On the other hand, in the multilayer body 1 of the multilayer capacitor in accordance with the seventh embodiment, the second inner electrode 45 electrically connected to the second terminal electrode 5 through the lead conductor 47 is arranged at a position symmetrical to the second inner electrode 41 electrically connected to the second terminal electrode 5 through the lead conductor 47 about the center position M in the laminating direction. In the multilayer body 1, the second inner electrode 44 electrically connected to the second terminal electrode 5 through the lead conductor 47 is arranged at a position symmetrical to the second inner electrode 42 electrically connected to the second terminal electrode 5 through the lead conductor 47 about the center position M in the laminating direction. In the multilayer body 1, the second inner electrode 42 electrically connected to the second terminal electrode 5 through the lead conductor 47 is arranged at a position symmetrical to the second inner electrode 44 electrically connected to the second terminal electrode 5 through the lead conductor 47 about the center position M in the laminating direction. In the multilayer body 1, the second inner electrode 41 electrically connected to the second terminal electrode 5 through the lead conductor 47 is arranged at a position symmetrical to the second inner electrode 45 electrically connected to the second terminal electrode 5 through the lead conductor 47 about the center position M in the laminating direction.

Therefore, when any of two side faces 1e, 1f opposing each other in the laminating direction of the multilayer body 1 opposes a substrate or the like at the time of mounting, the length of a current path formed between land patterns or the like on the substrate through an inner electrode is hard to change. Consequently, the multilayer capacitor in accordance with the seventh embodiment restrains the equivalent series inductance from fluctuating depending on the mounting direction.

The first terminal electrode 3 is formed on the side face 1a extending longitudinally in the side faces parallel to the laminating direction of the substantially rectangular parallelepiped multilayer body 1, whereas the second terminal electrode 5 is formed on the side face 1b extending longitudinally and opposing the side face 1a formed with the first terminal electrode 3 in the side faces parallel to the laminating direction of the multilayer body 1. Consequently, magnetic fields caused by currents flowing through the first and second inner electrodes 31 to 36, 41 to 45 can be made smaller, whereby the multilayer capacitor in accordance with the seventh embodiment can lower the equivalent series inductance.

Eighth Embodiment

Figure 13:
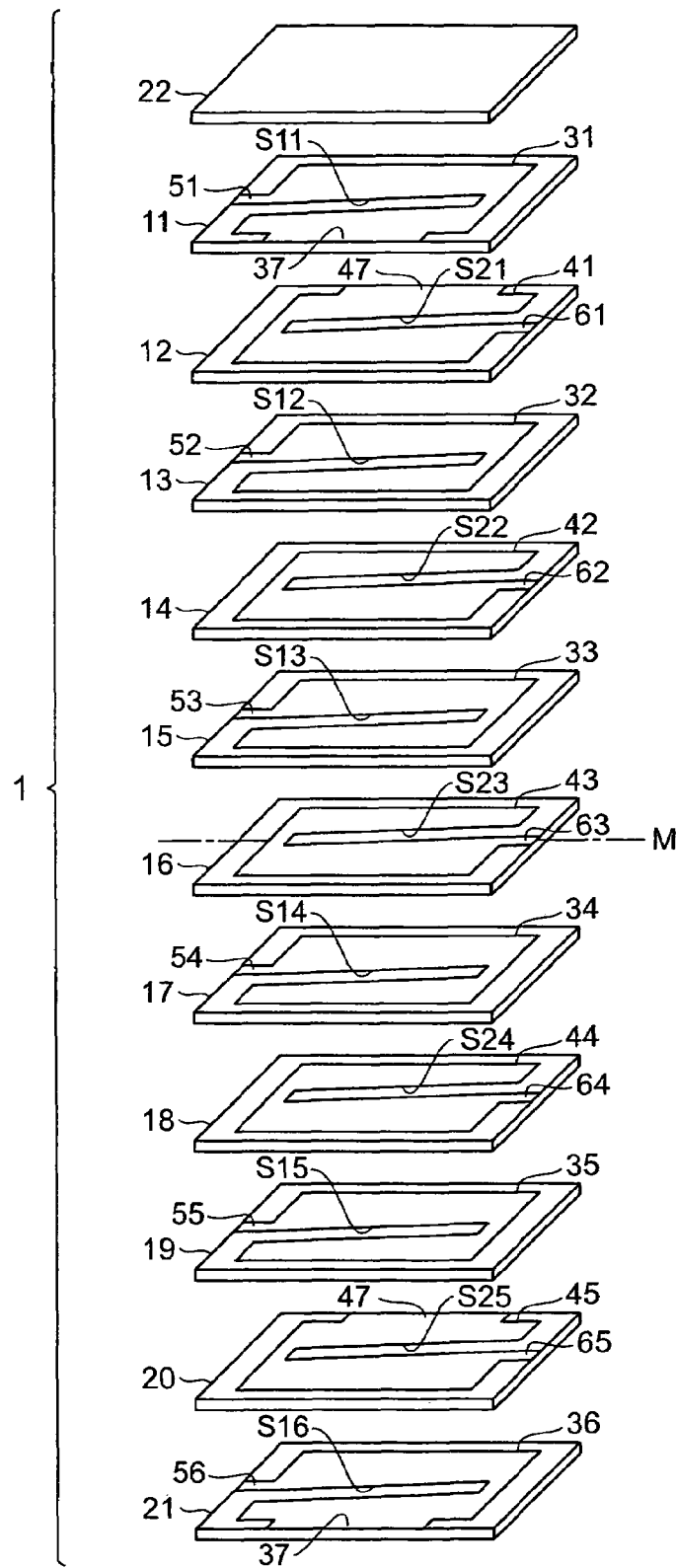
FIG. 13 is an exploded perspective view of the multilayer body included in the multilayer capacitor in accordance with an eighth embodiment.

With reference to FIG. 13, the structure of the multilayer capacitor in accordance with an eighth embodiment will be explained. The multilayer capacitor in accordance with the eighth embodiment differs from the multilayer capacitor in accordance with the fifth embodiment in that first and second inner electrodes 31 to 36, 41 to 45 are formed with slits. FIG. 13 is an exploded perspective view of the multilayer body included in the multilayer capacitor in accordance with the eighth embodiment.

As with the multilayer capacitor C1 in accordance with the first embodiment, the multilayer capacitor in accordance with the eighth embodiment comprises a multilayer body 1, a first terminal electrode 3 formed on the multilayer body 1, a second terminal electrode 5 similarly formed on the multilayer body 1, and first and second connecting conductors 7, 9, which are not depicted.

The first inner electrodes 31 to 36 are formed with slits S11 to S16 extending in the longitudinal direction of the first inner electrodes 31 to 36 from sides of connecting parts between lead conductors 51 to 56 and the first inner electrodes 31 to 36, respectively. Therefore, the slits S11 to S16 are formed in their corresponding first inner electrodes 31 to 36 such that currents flow in directions opposite from each other in areas opposing each other across the slits S111 to S116.

The second inner electrodes 41 to 45 are formed with slits S21 to S25 extending in the longitudinal direction of the second inner electrodes 41 to 45 from sides of connecting parts between lead conductors 61 to 65 and the second inner electrodes 41 to 45, respectively. Therefore, the slits S21 to S25 are formed in their corresponding second inner electrodes 41 to 45 such that currents flow in directions opposite from each other in areas opposing each other across the slits S21 to S25.

In the first and second inner electrodes 31 to 36, 41 to 45 formed with the slits S11 to S16, S21 to S25, currents flow in directions opposite from each other in areas opposing each other across the slits S11 to S16, S21 to S25, whereby magnetic fields caused by the currents cancel each other out. Also, in the laminating direction, currents flow in respective directions opposite from each other in the first inner electrodes 31 to 36 and second inner electrodes 41 to 45 formed with the slits. Therefore, magnetic fields caused by currents flowing through the first inner electrodes 31 to 36 and magnetic fields caused by currents flowing through the second inner electrodes 41 to 45 cancel each other out. Consequently, the multilayer capacitor in accordance with the eight embodiment can reduce its equivalent series inductance.

In the multilayer capacitor in accordance with the eighth embodiment, the number of first inner electrodes 31, 36 connected to the first terminal electrode 3 through lead conductors 37 is 2, which is smaller than the total number (6 in this embodiment) of first inner electrodes 31 to 36. The number of second inner electrodes 41, 45 connected to the second terminal electrode 5 through lead conductors 47 is 2, which is smaller than the total number (5 in this embodiment) of second inner electrodes 41 to 45. These make the multilayer capacitor in accordance with the eighth embodiment attain an equivalent series resistance greater than that of a conventional multilayer capacitor in which all the inner electrodes are connected to their corresponding terminal electrodes through lead conductors.

By adjusting the number of first inner electrodes 31, 36 electrically connected to the first terminal electrode 3 through the lead conductors 37 and the number of second inner electrodes 41, 45 electrically connected to the second terminal electrode 5 through the lead conductors 47 as in the foregoing, the eighth embodiment sets the equivalent series resistance of the multilayer capacitor to a desirable value and thus can regulate the equivalent series resistance easily with a high precision.

In the multilayer body 1 of the multilayer capacitor in accordance with the eighth embodiment, the first inner electrodes 36, 31 electrically connected to the first terminal electrode 3 through the lead conductors 37 are arranged at respective positions symmetrical to the first inner electrodes 31, 36 electrically connected to the first terminal electrode 3 through the lead conductors 37 about the center position M in the laminating direction. On the other hand, in the multilayer body 1 of the multilayer capacitor in accordance with the eighth embodiment, the second inner electrodes 45, 41 electrically connected to the second terminal electrode 5 through the lead conductors 47 are arranged at respective positions symmetrical to the second inner electrodes 41, 45 electrically connected to the second terminal electrode 5 through the lead conductors 47 about the center position M in the laminating direction. Therefore, when any of two side faces 1e, 1f opposing each other in the laminating direction of the multilayer body 1 opposes a substrate or the like at the time of mounting, the length of a current path formed between land patterns or the like on the substrate through an inner electrode is hard to change. Consequently, the multilayer capacitor in accordance with the eighth embodiment restrains the equivalent series inductance from fluctuating depending on the mounting direction.

The first terminal electrode 3 is formed on a side face 1a extending longitudinally in the side faces parallel to the laminating direction of the rectangular parallelepiped multilayer body 1, whereas the second terminal electrode 5 is formed on a side face 1b extending longitudinally and opposing the side face 1a formed with the first terminal electrode 3 in side faces parallel to the laminating direction of the multilayer body 1. Consequently, magnetic fields caused by currents flowing through the first and second inner electrodes 31 to 36, 41 to 45 can be made smaller, whereby the multilayer capacitor in accordance with the eighth embodiment can lower the equivalent series inductance.

It is not necessary for all the inner electrodes to be formed with slits. For example, the first and second inner electrodes 31, 36, 41, 45 electrically connected to the terminal electrodes 3, 5 through the lead conductors 37, 47 may be free of slits. When the first and second inner electrodes 31, 36, 41, 45 are formed with slits, however, magnetic fields caused by currents cancel each other out in these inner electrodes 31, 36, 41, 45. Therefore, the equivalent series inductance can further be lowered in the multilayer capacitor.

Ninth Embodiment

Figure 14:
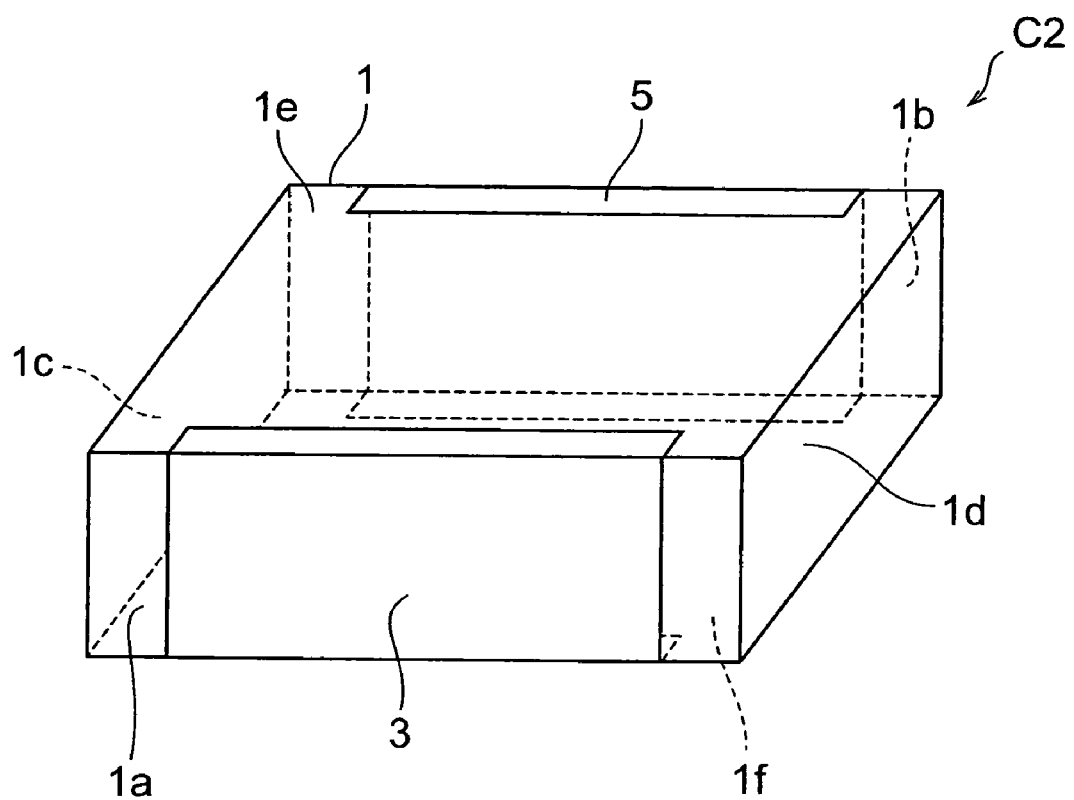
FIG. 14 is a perspective view of the multilayer capacitor in accordance with a ninth embodiment.
Figure 15:
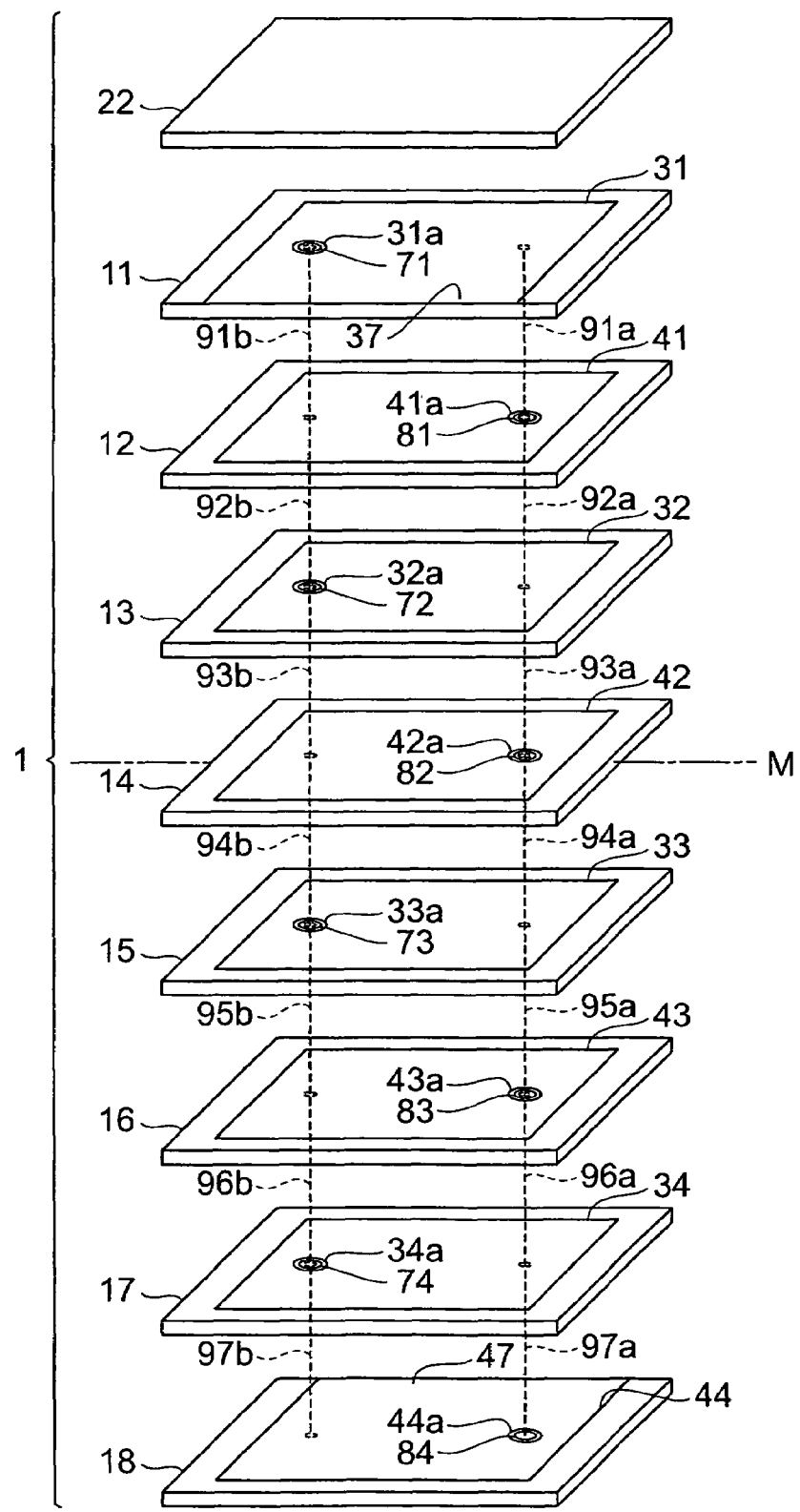
FIG. 15 is an exploded perspective view of the multilayer body included in the multilayer capacitor in accordance with the ninth embodiment.

With reference to FIGS. 14 and 15, the structure of the multilayer capacitor C2 in accordance with a ninth embodiment will be explained. FIG. 14 is a perspective view of the multilayer capacitor in accordance with the ninth embodiment. FIG. 15 is an exploded perspective view of the multilayer body included in the multilayer capacitor in accordance with the ninth embodiment.

As shown in FIG. 14, the multilayer capacitor C2 comprises a multilayer body 1, and first and second terminal electrodes 3, 5 formed on the multilayer body 1.

The first terminal electrode 3 is formed on a side face 1a extending longitudinally in side faces parallel to a laminating direction which will be explained later in the multilayer body 1. The second terminal electrode 5 is formed on a side face 1b extending longitudinally and opposing the side face 1a formed with the first terminal electrode 3 in the side faces parallel to the laminating direction to be explained later in the multilayer body 1. The first terminal electrode 3 and second terminal electrode 5 are electrically insulated from each other.

As is also shown in FIG. 15, the multilayer body 1 is constructed by alternately laminating a plurality of (9 in this embodiment) dielectric layers 11 to 18, 22 and a plurality of (4 each in this embodiment) first and second inner electrodes 31 to 34, 41 to 44. The multilayer body 1 also has side faces 1e, 1f opposing each other in the laminating direction to be explained later, and side faces 1c, 1d extending transversely in side faces parallel to the laminating direction. In the actual multilayer capacitor C2, the dielectric layers 11 to 18, 22 are integrated to such an extent that no boundaries are discernible therebetween.

Each of the first inner electrodes 31 to 34 has a substantially rectangular form. The first inner electrodes 31 to 34 are formed at respective positions separated by a predetermined distance from a side face parallel to the laminating direction of the dielectric layers 11 to 18, 22 in the multilayer body 1 (hereinafter simply referred to as "laminating direction"). The first inner electrodes 31 to 34 are formed with openings 31a to 34a so as to expose the dielectric layers 11, 13, 15, 17, respectively. On the dielectric layers 11, 13, 15, 17, land-like inner conductors 71 to 74 are placed in areas corresponding to the openings 31a to 34a formed in the first inner electrodes 31 to 34, respectively. The first inner electrode 31 is adjacent to the side face 1e of the multilayer body 1 with the dielectric layer 22 interposed therebetween in the laminating direction.

Each of the second inner electrodes 41 to 44 has a substantially rectangular form. The second inner electrodes 41 to 44 are formed at respective positions separated by a predetermined distance from a side face parallel to the laminating direction of the multilayer body 1. The second inner electrodes 41 to 44 are formed with openings 41a to 44a so as to expose the dielectric layers 12, 14, 16, 18, respectively. On the dielectric layers 12, 14, 16, 18, land-like inner conductors 81 to 84 are placed in areas corresponding to the openings 41a to 44a formed in the second inner electrodes 41 to 44, respectively. The second inner electrode 44 is adjacent to the side face 1f of the multilayer body 1 with the dielectric layer 18 interposed therebetween in the laminating direction.

Through hole conductors 91a, 91b penetrating through the dielectric layer 11 in its thickness direction are formed at respective positions corresponding to the inner conductors 81 and 71 in the dielectric layer 11. The through hole conductor 91a is electrically connected to the first inner electrode 31. The through hole conductor 91b is electrically connected to the inner conductor 71. The through hole conductor 91a is electrically connected to the inner conductor 81 in the state where the dielectric layers 11, 12 are laminated. The through hole conductor 91b is electrically connected to the second inner electrode 41 in the state where the dielectric layers 11, 12 are laminated.

Through hole conductors 92a, 92b penetrating through the dielectric layer 12 in its thickness direction are formed at respective positions corresponding to the inner conductors 81 and 72 in the dielectric layer 12. The through hole conductor 92a is electrically connected to the inner conductor 81. The through hole conductor 92b is electrically connected to the second inner electrode 41. The through hole conductor 92a is electrically connected to the first inner electrode 32 in the state where the dielectric layers 12, 13 are laminated. The through hole conductor 92b is electrically connected to the inner conductor 72 in the state where the dielectric layers 12, 13 are laminated.

Through hole conductors 93a, 93b penetrating through the dielectric layer 13 in its thickness direction are formed at respective positions corresponding to the inner conductors 82 and 72 in the dielectric layer 13. The through hole conductor 93a is electrically connected to the first inner electrode 32. The through hole conductor 93b is electrically connected to the inner conductor 72. The through hole conductor 93a is electrically connected to the inner conductor 82 in the state where the dielectric layers 13, 14 are laminated. The through hole conductor 93b is electrically connected to the second inner electrode 42 in the state where the dielectric layers 13, 14 are laminated.

Through hole conductors 94a, 94b penetrating through the dielectric layer 14 in its thickness direction are formed at respective positions corresponding to the inner conductors 82 and 73 in the dielectric layer 14. The through hole conductor 94a is electrically connected to the inner conductor 82. The through hole conductor 94b is electrically connected to the second inner electrode 42. The through hole conductor 94a is electrically connected to the first inner electrode 33 in the state where the dielectric layers 14, 15 are laminated. The through hole conductor 94b is electrically connected to the inner conductor 73 in the state where the dielectric layers 14, 15 are laminated.

Through hole conductors 95a, 95b penetrating through the dielectric layer 15 in its thickness direction are formed at respective positions corresponding to the inner conductors 83 and 73 in the dielectric layer 15. The through hole conductor 95a is electrically connected to the first inner electrode 33. The through hole conductor 95b is electrically connected to the inner conductor 73. The through hole conductor 95a is electrically connected to the inner conductor 83 in the state where the dielectric layers 15, 16 are laminated. The through hole conductor 95b is electrically connected to the second inner electrode 43 in the state where the dielectric layers 15, 16 are laminated.

Through hole conductors 96a, 96b penetrating through the dielectric layer 16 in its thickness direction are formed at respective positions corresponding to the inner conductors 83 and 74 in the dielectric layer 16. The through hole conductor 96a is electrically connected to the inner conductor 83. The through hole conductor 96b is electrically connected to the second inner electrode 43. The through hole conductor 96a is electrically connected to the second inner electrode 34 in the state where the dielectric layers 16, 17 are laminated. The through hole conductor 96b is electrically connected to the inner conductor 74 in the state where the dielectric layers 16, 17 are laminated.

Through hole conductors 97a, 97b penetrating through the dielectric layer 17 in its thickness direction are formed at respective positions corresponding to the inner conductors 84 and 74 in the dielectric layer 17. The through hole conductor 97a is electrically connected to the first inner electrode 34. The through hole conductor 97b is electrically connected to the inner conductor 74. The through hole conductor 97a is electrically connected to the inner conductor 84 in the state where the dielectric layers 17, 18 are laminated. The through hole conductor 97b is electrically connected to the second inner electrode 44 in the state where the dielectric layers 17, 18 are laminated.

When the dielectric layers 11 to 17 are laminated, the through hole conductors 91a to 97a are arranged substantially linearly in parallel with each other in the laminating direction, and are electrically connected to each other, so as to construct a conductive path. The first inner electrodes 31 to 34 are electrically connected to each other through the through hole conductors 91a to 97a and inner conductors 81 to 84.

The first inner electrode 31 is electrically connected to the first terminal electrode 3 through a lead conductor 37. Consequently, the first inner electrodes 32 to 34 are also electrically connected to the first terminal electrode 3, whereby the first inner electrodes 31 to 34 are connected in parallel. The lead conductor 37 is integrally formed with the first inner electrode 31, and extends therefrom so as to reach the side face 1a extending longitudinally in the side faces parallel to the laminating direction of the multilayer body 1.

When the dielectric layers 11 to 17 are laminated, as with the through hole conductors 91a to 97a, the through hole conductors 91b to 97b are arranged substantially linearly in parallel with the laminating direction, and are electrically connected to each other, so as to construct a conductive path. The second inner electrodes 41 to 44 are electrically connected to each other through the through hole conductors 91b to 97b and inner conductors 71 to 74.

The second inner electrode 44 is electrically connected to the second terminal electrode 5 through a lead conductor 47. Consequently, the second inner electrodes 41 to 43 are also electrically connected to the second terminal electrode 5, whereby the second inner electrodes 41 to 44 are connected in parallel. The lead conductor 47 is integrally formed with the second inner electrode 44, and extends therefrom so as to reach the side face 1b extending longitudinally and opposing the side face 1a formed with the first terminal electrode 3 in the side faces parallel to the laminating direction of the multilayer body 1.

In the multilayer capacitor C2, the number of first inner electrode 31 connected to the first terminal electrode 3 through the lead conductor 37 is 1, which is smaller than the total number (4 in this embodiment) of the first inner electrodes 31 to 34. Also, the number of second inner electrode 44 connected to the second terminal electrode through the lead conductor 47 is 1, which is smaller than the total number (4 in this embodiment) of the second inner electrodes 41 to 44. The through hole conductors 91a to 97a are connected in series to the first terminal electrode 3, and thus yield a relatively large composite resistance component. Also, the through hole conductors 91b to 97b are connected in series to the second terminal electrode 5, and thus yield a relatively large composite resistance component. These make the multilayer capacitor C2 attain an equivalent series resistance greater than that in a conventional multilayer capacitor in which all the inner electrodes are connected to their corresponding terminal electrodes through lead conductors.

By adjusting the number of first inner electrode 31 electrically connected to the first terminal electrode 3 through the lead conductor 37 and the number of second inner electrode 44 electrically connected to the second terminal electrode 5 through the lead conductor 47 as in the foregoing, this embodiment sets the equivalent series resistance of the multilayer capacitor C2 to a desirable value, and thus can regulate equivalent series resistance easily with a high precision.

In this embodiment, the first inner electrodes 31 to 34 are connected in parallel, and the second inner electrodes 41 to 44 are connected in parallel. As a consequence, even when the resistance value fluctuates among the first inner electrodes 31 to 34 and second inner electrodes 41 to 44, the equivalent series resistance of the multilayer capacitor C2 as a whole is less likely to be influenced thereby, so that the equivalent series resistance control can be restrained from lowering its precision.

In the multilayer body 1 of the multilayer capacitor C2, the second inner electrode 44 electrically connected to the second terminal electrode 5 through the lead conductor 47 is arranged at a position symmetrical to the first inner electrode 31 electrically connected to the first terminal electrode 3 through the lead conductor 37 about the center position M in the laminating direction. On the other hand, in the multilayer body 1 of the multilayer capacitor C2, the first inner electrode 31 electrically connected to the first terminal electrode 3 through the lead conductor 37 is arranged at a position symmetrical to the second inner electrode 44 electrically connected to the second terminal electrode 5 through the lead conductor 47 about the center position M in the laminating direction. Therefore, when any of two side faces 1e, 1f opposing each other in the laminating direction of the multilayer body 1 opposes a substrate or the like at the time of mounting, the length of a current path formed between land patterns or the like on the substrate through an inner electrode is hard to change. Consequently, the multilayer capacitor C2 in accordance with the ninth embodiment restrains the equivalent series inductance from fluctuating depending on the mounting direction.

The first terminal electrode 3 is formed on the side face 1a extending longitudinally in the side faces parallel to the laminating direction of the substantially rectangular parallelepiped multilayer body 1, whereas the second terminal electrode 5 is formed on the side face 1b extending longitudinally and opposing the side face 1a formed with the first terminal electrode 3 in the side faces parallel to the laminating direction of the multilayer body 1. Consequently, magnetic fields caused by currents flowing through the first and second inner electrodes 31 to 34, 41 to 44 can be made smaller, whereby the multilayer capacitor C2 can lower the equivalent series inductance.

Tenth Embodiment

Figure 16:
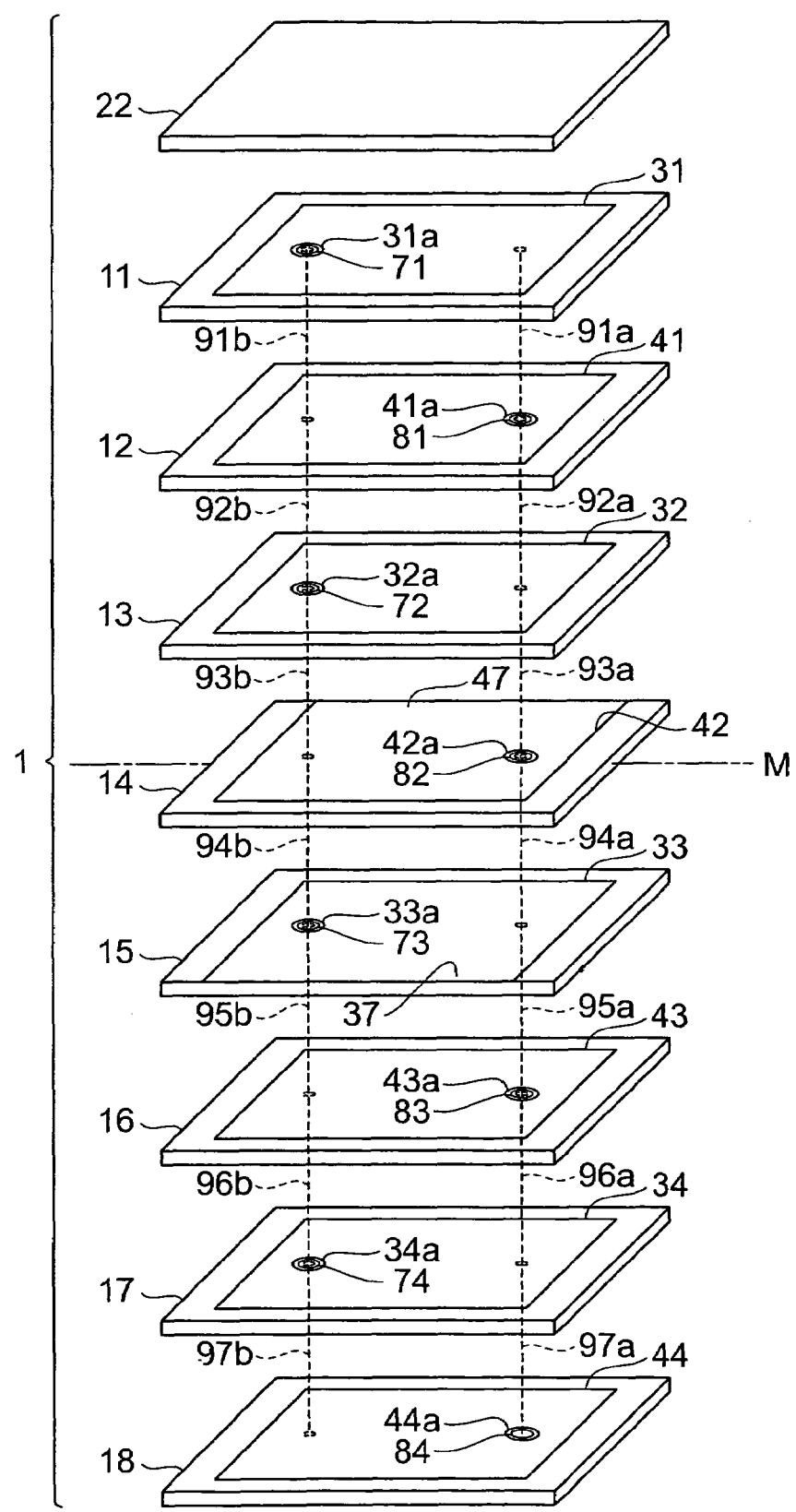
FIG. 16 is an exploded perspective view of the multilayer body included in the multilayer capacitor in accordance with a tenth embodiment.

With reference to FIG. 16, the structure of the multilayer capacitor in accordance with a tenth embodiment will be explained. The multilayer capacitor in accordance with the tenth embodiment differs from the multilayer capacitor C2 in accordance with the ninth embodiment in terms of positions of first and second inner electrodes 33, 42 connected to terminal electrodes 3, 5 through lead conductors 37, 47 in the laminating direction. FIG. 16 is an exploded perspective view of the multilayer body included in the multilayer capacitor in accordance with the tenth embodiment.

As with the multilayer capacitor C2 in accordance with the ninth embodiment, the multilayer capacitor in accordance with the tenth embodiment comprises a multilayer body 1, the first terminal electrode 3 formed on the multilayer body 1, and the second terminal electrode 5 similarly formed on the multilayer body 1, which are not depicted.

In the multilayer capacitor in accordance with the tenth embodiment, as shown in FIG. 16, a first inner electrode 33 which is the third one counted downward from a first inner electrode 31 among four inner electrodes 31 to 34 is electrically connected to the first terminal electrode 3 through the lead conductor 37. Consequently, the first inner electrodes 31, 32, 34 are also electrically connected to the first terminal electrode 3, whereby the first inner electrodes 31 to 34 are connected in parallel. The lead conductor 37 is integrally formed with the first inner electrode 33, and extends therefrom so as to reach a side face 1a extending longitudinally in side faces parallel to the laminating direction of the multilayer body 1.

A second inner electrode 42 which is the second one counted downward from a second inner electrode 41 among four inner electrodes 41 to 44 is electrically connected to the second terminal electrode 5 through the lead conductor 47. Consequently, the second inner electrodes 41, 43, 44 are also electrically connected to the second terminal electrode 3, whereby the second inner electrodes 41 to 44 are connected in parallel. The lead conductor 47 is integrally formed with the second inner electrode 42, and extends therefrom so as to reach a side face 1b extending longitudinally and opposing the side face 1a formed with the first terminal electrode 3 in side faces parallel to the laminating direction of the multilayer body 1.

In the multilayer capacitor in accordance with the tenth embodiment, the number of first inner electrode 33 connected to the first terminal electrode 3 through the lead conductor 37 is 1, which is smaller than the total number (4 in this embodiment) of the first inner electrodes 31 to 34. Also, the number of second inner electrode 42 connected to the second terminal electrode 5 through the lead conductor 47 is 1, which is smaller than the total number (4 in this embodiment) of the second inner electrodes 41 to 44. These make the multilayer capacitor in accordance with the tenth embodiment attain an equivalent series resistance greater than that in a conventional multilayer capacitor in which all the inner electrodes are connected to their corresponding terminal electrodes through lead conductors.

At the first inner electrode 33 as a boundary, the resistance component of the through hole conductors 91a to 97a is divided into the composite resistance component of the through hole conductors 91a to 94a positioned on one side of the first inner electrode 33 in the laminating direction and the composite resistance component of the through hole conductors 95a to 97a positioned on the other side of the first inner electrode 33 in the laminating direction. The composite resistance component of the through hole conductors 91a to 94a and the composite resistance component of the through hole conductors 95a to 97a are connected in parallel to the first terminal electrode 3. At the second inner electrode 42 as a boundary, the resistance component of the through hole conductors 91b to 97b is divided into the composite resistance component of the through hole conductors 91b to 93b positioned on one side of the second inner electrode 42 in the laminating direction and the composite resistance component of the through hole conductors 94b to 97b positioned on the other side of the second inner electrode 42 in the laminating direction. The composite resistance component of the through hole conductors 91b to 93b and the composite resistance component of the through hole conductors 94b to 97b are connected in parallel to the second terminal electrode 5. Therefore, the multilayer capacitor in accordance with the tenth embodiment yields an equivalent series resistance smaller than that of the multilayer capacitor C2 in accordance with the ninth embodiment in which each set of the through hole conductors 91a to 97a, 91b to 97b are connected in series.

By adjusting the position of the first inner electrode 33 electrically connected to the first terminal electrode 3 through the lead conductor 37 in the laminating direction and the position of the second inner electrode 42 electrically connected to the second terminal electrode 5 through the lead conductor 47 in the laminating direction as in the foregoing, the tenth embodiment sets the equivalent series resistance of the multilayer capacitor to a desirable value and thus can regulate the equivalent series resistance easily with a high precision.

In the multilayer body 1 of the multilayer capacitor in accordance with the tenth embodiment, the second inner electrode 42 electrically connected to the second terminal electrode 5 through the lead conductor 47 is arranged at a position symmetrical to the first inner electrode 33 electrically connected to the first terminal electrode 3 through the lead conductor 37 about the center position M in the laminating direction. On the other hand, in the multilayer body 1 of the multilayer capacitor in accordance with the tenth embodiment, the first inner electrode 33 electrically connected to the first terminal electrode 3 through the lead conductor 37 is arranged at a position symmetrical to the second inner electrode 42 electrically connected to the second terminal electrode 5 through the lead conductor 47 about the center position M in the laminating direction. Therefore, when any of two side faces 1e, 1f opposing each other in the laminating direction of the multilayer body 1 opposes a substrate or the like at the time of mounting, the length of a current path formed between land patterns or the like on the substrate through an inner electrode is hard to change. Consequently, the multilayer capacitor in accordance with the tenth embodiment restrains the equivalent series inductance from fluctuating depending on the mounting direction.

The first terminal electrode 3 is formed on the side face 1a extending longitudinally in the side faces parallel to the laminating direction of the substantially rectangular parallelepiped multilayer body 1, whereas the second terminal electrode 5 is formed on the side face 1b extending longitudinally and opposing the side face 1a formed with the first terminal electrode 3 in the side faces parallel to the laminating direction of the multilayer body 1. Consequently, magnetic fields caused by currents flowing through the first and second inner electrodes 31 to 34, 41 to 44 can be made smaller, whereby the multilayer capacitor in accordance with the second embodiment can lower the equivalent series inductance.

Eleventh Embodiment

Figure 17:
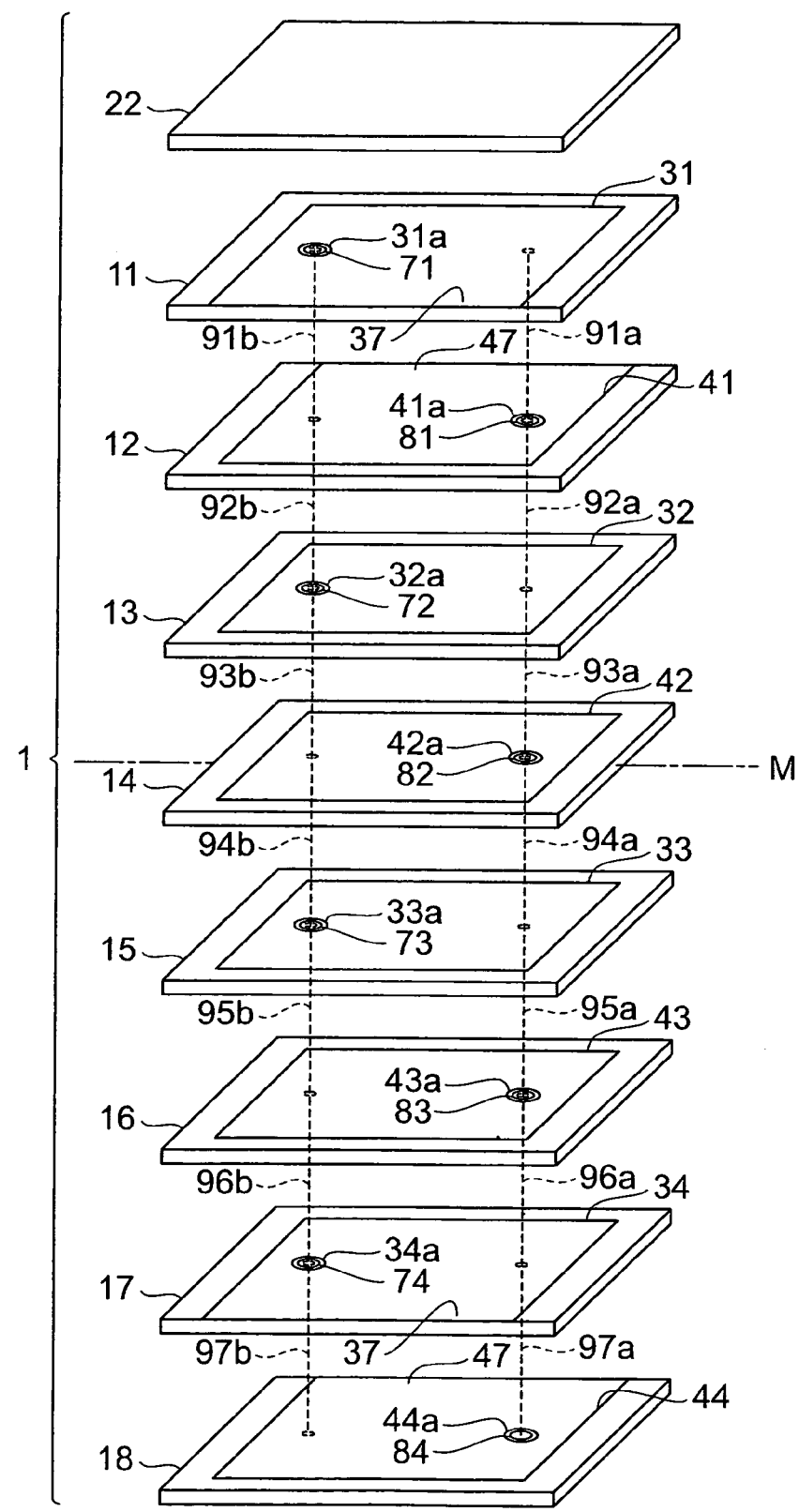
FIG. 17 is an exploded perspective view of the multilayer body included in the multilayer capacitor in accordance with an eleventh embodiment.

With reference to FIG. 17, the structure of the multilayer capacitor in accordance with an eleventh embodiment will be explained. The multilayer capacitor in accordance with the eleventh embodiment differs from the multilayer capacitor C2 in accordance with the ninth embodiment in terms of the number of first and second inner electrodes 31, 34, 41, 44 connected to terminal electrodes 3, 5 through lead conductors 37, 47. FIG. 17 is an exploded perspective view of the multilayer body included in the multilayer capacitor in accordance with the eleventh embodiment.

As with the multilayer capacitor C2 in accordance with the ninth embodiment, the multilayer capacitor in accordance with the eleventh embodiment comprises a multilayer body 1, the first terminal electrode 3 formed on the multilayer body 1, and the second terminal electrode 5 similarly formed on the multilayer body 1, which are not depicted.

In the multilayer capacitor in accordance with the eleventh embodiment, as shown in FIG. 17, two first inner electrodes 31, 34 among four first inner electrodes 31 to 34 are electrically connected to the first terminal electrode 3 through the lead conductors 37. Consequently, the first inner electrodes 32, 33 are also electrically connected to the first terminal electrode 3, whereby the first inner electrodes 31 to 34 are connected in parallel. The lead conductors 37 are integrally formed with their corresponding first inner electrodes 31, 34, and extend therefrom so as to reach a side face 1a extending longitudinally in side faces parallel to the laminating direction of the multilayer body 1.

Two second inner electrodes 41, 44 among four second inner electrodes 41 to 44 are electrically connected to the second terminal electrode 5 through the lead conductors 47. Consequently, the second inner electrodes 41 to 44 are also electrically connected to the second terminal electrode 5, whereby the second inner electrodes 41 to 44 are connected in parallel. The lead conductors 47 are integrally formed with their corresponding second inner electrodes 41, 44, and extend therefrom so as to reach a side face 1b extending longitudinally and opposing the side face 1a in the side faces parallel to the laminating direction of the multilayer body 1.

In the multilayer capacitor in accordance with the eleventh embodiment, the number of first inner electrodes 31, 34 connected to the first terminal electrode 3 through the lead conductors 37 is 2, which is smaller than the total number of first inner electrodes 31 to 34. Also, the number of second inner electrodes 41, 44 connected to the second terminal electrode 5 through the lead conductors 47 is 2, which is smaller than the total number of second inner electrodes 41 to 44. These make the multilayer capacitor in accordance with the eleventh embodiment yield an equivalent series resistance greater than that of a conventional multilayer capacitor in which all the inner electrodes are connected to their corresponding terminal electrodes through lead conductors.

The number of first inner electrodes 31, 34 connected to the first terminal electrode 3 through the lead conductors 37 is greater in the multilayer capacitor in accordance with the eleventh embodiment than in the multilayer capacitor C2 in accordance with the ninth embodiment, whereas the lead conductors 37 are connected in parallel to the first terminal electrode 3. Also, the number of second inner electrodes 41, 44 connected to the second terminal electrode 5 through the lead conductors 47 is greater, whereas the lead conductors 47 are connected in parallel to the second terminal electrode 5. These make the multilayer capacitor in accordance with the eleventh embodiment attain an equivalent series resistance smaller than that in the multilayer capacitor C2 in accordance with the ninth embodiment.

By adjusting the number of first inner electrodes 31, 34 electrically connected to the first terminal electrode 3 through the lead conductors 37 and the number of second inner electrodes 41, 44 electrically connected to the second terminal electrode 5 through the lead conductors 47 as in the foregoing, the eleventh embodiment sets the equivalent series resistance of the multilayer capacitor to a desirable value and thus can regulate the equivalent series resistance easily with a high precision.

In the multilayer body 1 of the multilayer capacitor in accordance with the eleventh embodiment, the second inner electrode 44 electrically connected to the second terminal electrode 5 through the lead conductor 47 is arranged at a position symmetrical to the first inner electrode 31 electrically connected to the first terminal electrode 3 through the lead conductor 37 about the center position M in the laminating direction. In the multilayer body 1, the second inner electrode 41 electrically connected to the second terminal electrode 5 through the lead conductor 47 is arranged at a position symmetrical to the first inner electrode 34 electrically connected to the first terminal electrode 3 through the lead conductor 37 about the center position M in the laminating direction. On the other hand, in the multilayer body 1 of the multilayer capacitor in accordance with the eleventh embodiment, the first inner electrode 34 electrically connected to the first terminal electrode 3 through the lead conductor 37 is arranged at a position symmetrical to the second inner electrode 41 electrically connected to the second terminal electrode 5 through the lead conductor 47 about the center position M in the laminating direction. In the multilayer body 1, the first inner electrode 31 electrically connected to the first terminal electrode 3 through the lead conductor 37 is arranged at a position symmetrical to the second inner electrode 44 electrically connected to the second terminal electrode 5 through the lead conductor 47 about the center position M in the laminating direction. Therefore, when any of two side faces $1e$, $1f$ opposing each other in the laminating direction of the multilayer body 1 opposes a substrate or the like at the time of mounting, the length of a current path formed between land patterns or the like on the substrate through an inner electrode is hard to change. Consequently, the multilayer capacitor in accordance with the eleventh embodiment restrains the equivalent series inductance from fluctuating depending on the mounting direction.

The first terminal electrode 3 is formed on the side face $1a$ extending longitudinally in the side faces parallel to the laminating direction of the rectangular parallelepiped multilayer body 1, whereas the second terminal electrode 5 is formed on the side face $1b$ extending longitudinally and opposing the side face $1a$ formed with the first terminal electrode 3 in the side faces parallel to the laminating direction of the multilayer body 1. Consequently, magnetic fields caused by currents flowing through the first and second inner electrodes 31 to 34, 41 to 44 can be made smaller, whereby the multilayer capacitor in accordance with the eleventh embodiment can lower the equivalent series inductance.

Twelfth Embodiment

Figure 18:
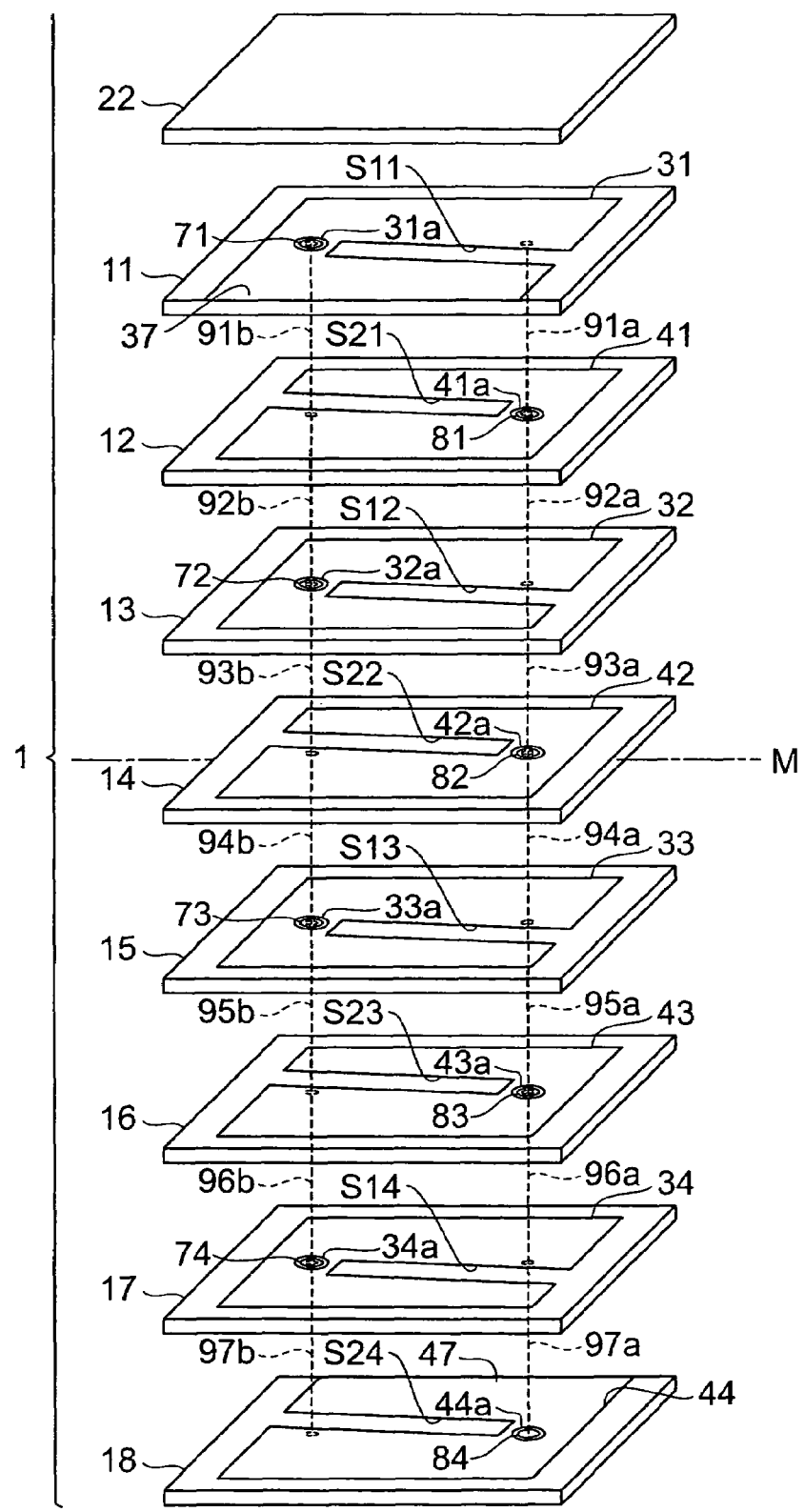
FIG. 18 is an exploded perspective view of the multilayer body included in the multilayer capacitor in accordance with a twelfth embodiment.

With reference to FIG. 18, the structure of the multilayer capacitor in accordance with a twelfth embodiment will be explained. The multilayer capacitor in accordance with the twelfth embodiment differs from the multilayer capacitor C1 in accordance with the first embodiment in that first and second inner electrodes 31 to 34, 41 to 44 are formed with slits. FIG. 18 is an exploded perspective view of the multilayer body included in the multilayer capacitor in accordance with the twelfth embodiment.

As with the multilayer capacitor C2 in accordance with the ninth embodiment, the multilayer capacitor in accordance with the eleventh embodiment comprises a multilayer body 1, a first terminal electrode 3 formed on the multilayer body 1, and a second terminal electrode 5 similarly formed on the multilayer body 1, which are not depicted.

The first inner electrodes 31 to 34 are formed with slits S11 to S14 extending from ends of the first inner electrodes 31 to 34 opposing a side face $1d$ of the multilayer body 1 to sides of parts where through hole conductors $91a$ to $97a$ and the first inner electrodes 31 to 34 are connected to each other. Therefore, the slits S11 to S14 are formed in their corresponding first inner electrodes 32 to 34 such that currents flow in directions opposite from each other in areas opposing each other across the slits S11 to S14.

The second inner electrodes 41 to 44 are formed with slits S21 to S24 extending from ends of the second inner electrodes 41 to 44 opposing a side face $1c$ of the multilayer body 1 to sides of parts where through hole conductors $91b$ to $97b$ and the second inner electrodes 41 to 44 are connected to each other. Therefore, the slits S21 to S24 are formed in their corresponding second inner electrodes 41 to 44 such that currents flow in directions opposite from each other in areas opposing each other across the slits S21 to S24.

In the first and second inner electrodes 31 to 34, 41 to 44 formed with the slits S11 to S14, S21 to S24, currents flow in directions opposite from each other in areas opposing each other across the slits S11 to S14, S21 to S24, whereby magnetic fields caused by the currents cancel each other out. Also, in the laminating direction, currents flow in respective directions opposite from each other in the first inner electrodes 31 to 34 and second inner electrodes 41 to 44 formed with the slits. Therefore, magnetic fields caused by currents flowing through the first inner electrodes 31 to 34 and magnetic fields caused by currents flowing through the second inner electrodes 41 to 44 cancel each other out. Consequently, the multilayer capacitor in accordance with the twelfth embodiment can reduce its equivalent series inductance.

In the multilayer capacitor in accordance with the twelfth embodiment, the number of first inner electrode 31 connected to the first terminal electrode 3 through a lead conductor 37 is 1, which is smaller than the total number (4 in this embodiment) of first inner electrodes 31 to 34. The number of second inner electrode 44 connected to the second terminal electrode 5 through a lead conductor 47 is 1, which is smaller than the total number (4 in this embodiment) of second inner electrodes 41 to 44. These make the multilayer capacitor in accordance with the twelfth embodiment attain an equivalent series resistance greater than that of a conventional multilayer capacitor in which all the inner electrodes are connected to their corresponding terminal electrodes through lead conductors.

By adjusting the number of first inner electrode 31 electrically connected to the first terminal electrode 3 through the lead conductor 37 and the number of second inner electrode 44 electrically connected to the second terminal electrode 5 through the lead conductor 47 as in the foregoing, the twelfth embodiment sets the equivalent series resistance of the multilayer capacitor to a desirable value and thus can regulate the equivalent series resistance easily with a high precision.

In the multilayer body 1 of the multilayer capacitor in accordance with the twelfth embodiment, the second inner electrode 44 electrically connected to the second terminal electrode 5 through the lead conductor 47 is arranged at a position symmetrical to the first inner electrode 31 electrically connected to the first terminal electrode 3 through the lead conductor 37 about the center position M in the laminating direction. On the other hand, in the multilayer body 1 of the multilayer capacitor in accordance with the twelfth embodiment, the first inner electrode 31 electrically connected to the first terminal electrode 3 through the lead conductor 37 is arranged at a position symmetrical to the second inner electrode 44 electrically connected to the second terminal electrode 5 through the lead conductor 47 about the center position M in the laminating direction. Therefore, when any of two side faces 1e, 1f opposing each other in the laminating direction of the multilayer body 1 opposes a substrate or the like at the time of mounting, the length of a current path formed between land patterns or the like on the substrate through an inner electrode is hard to change. Consequently, the multilayer capacitor in accordance with the twelfth embodiment restrains the equivalent series inductance from fluctuating depending on the mounting direction.

The first terminal electrode 3 is formed on a side face 1a extending longitudinally in side faces parallel to the laminating direction of the rectangular parallelepiped multilayer body 1, whereas the second terminal electrode 5 is formed on a side face 1b extending longitudinally and opposing the side face 1a formed with the first terminal electrode 3 in the side faces parallel to the laminating direction of the multilayer body 1. Consequently, magnetic fields caused by currents flowing through the first and second inner electrodes 31 to 34, 41 to 44 can be made smaller, whereby the multilayer capacitor in accordance with the twelfth embodiment can lower the equivalent series inductance.

It is not necessary for all the inner electrodes to be formed with slits. For example, the first and second inner electrodes 31, 44 electrically connected to the first and second terminal electrodes 3, 5 through the lead conductors 37, 47 may be free of slits. When the first and second inner electrodes 31, 44 are formed with slits, however, magnetic fields caused by currents cancel each other out in these inner electrodes 31, 44. Therefore, the equivalent series inductance can further be lowered in the multilayer capacitor.

Thirteenth Embodiment

Figure 19:
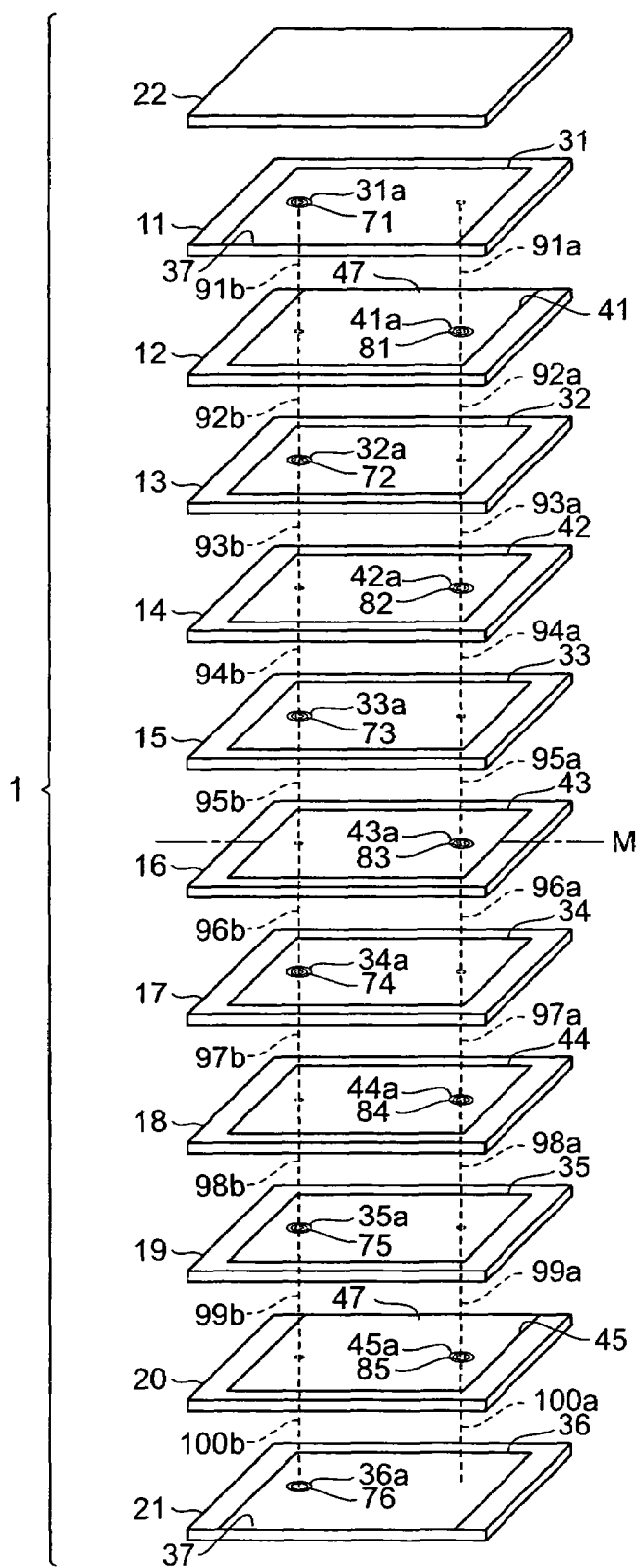
FIG. 19 is an exploded perspective view of the multilayer body included in the multilayer capacitor in accordance with a thirteenth embodiment.

With reference to FIG. 19, the structure of the multilayer capacitor in accordance with a thirteenth embodiment will be explained. The multilayer capacitor in accordance with the thirteenth embodiment differs from the multilayer capacitor C2 in accordance with the ninth embodiment in that the inner electrode arranged at a position symmetrical to a first inner electrode connected to a first terminal electrode about the center position of the multilayer body in the laminating direction is a first inner electrode and that the inner electrode arranged at a position symmetrical to a second inner electrode connected to a second terminal electrode about the center position of the multilayer body in the laminating direction is a second inner electrode. FIG. 19 is an exploded perspective view of the multilayer body included in the multilayer capacitor in accordance with the thirteenth embodiment.

As with the multilayer capacitor C2 in accordance with the ninth embodiment, the multilayer capacitor in accordance with the thirteenth embodiment comprises a multilayer body 1, a first terminal electrode 3 formed on the multilayer body 1, and a second terminal electrode 5 similarly formed on the multilayer body 1, which are not depicted.

As is also shown in FIG. 19, the multilayer body 1 is constructed by alternately laminating a plurality of (12 in this embodiment) dielectric layers 11 to 22 with a plurality of (6 in this embodiment) first inner electrodes 31 to 36 and a plurality of (5 in this embodiment) second inner electrodes 41 to 45. In the actual multilayer capacitor, the dielectric layers 11 to 22 are integrated to such an extent that no boundaries are discernible therebetween.

Each of the first inner electrodes 31 to 36 has a substantially rectangular form. The first inner electrodes 31 to 36 are formed at respective positions separated by a predetermined distance from a side face parallel to the laminating direction of the dielectric layers 11 to 22 in the multilayer body 1 (hereinafter simply referred to as "laminating direction"). The first inner electrodes 31 to 36 are formed with openings 31a to 36a so as to expose the dielectric layers 11, 13, 15, 17, 19, 21, respectively. On the dielectric layers 11, 13, 15, 17, 19, 21, land-like inner conductors 71 to 76 are placed in areas corresponding to the openings 31a to 36a formed in the first inner electrodes 31 to 36, respectively. The first inner electrode 31 is adjacent to a side face 1e of the multilayer body 1 with the dielectric layer 22 interposed therebetween in the laminating direction. The first inner electrode 36 is adjacent to a side face 1f of the multilayer body 1 with the dielectric layer 21 interposed therebetween in the laminating direction.

Each of the second inner electrodes 41 to 45 has a substantially rectangular form. The second inner electrodes 41 to 45 are formed at respective positions separated by a predetermined distance from a side face parallel to the laminating direction of the multilayer body 1. The second inner electrodes 41 to 45 are formed with openings 41a to 45a so as to expose the dielectric layers 12, 14, 16, 18, 20, respectively. On the dielectric layers 12, 14, 16, 18, 20, land-like inner conductors 81 to 85 are placed in areas corresponding to the openings 41a to 45a formed in the first inner electrodes 41 to 45, respectively.

When the dielectric layers 11 to 17 are laminated, as in the multilayer capacitor C2 in accordance with the ninth embodiment, through hole conductors 91a to 97a are arranged substantially linearly in parallel with the laminating direction, and are electrically connected to each other. When the dielectric layers 11 to 17 are laminated, through hole conductors 91b to 97b are also arranged substantially linearly in parallel with the laminating direction, and are electrically connected to each other.

Further, in the multilayer capacitor in accordance with the thirteenth embodiment, the dielectric layers 18 to 21 are laminated, and through hole conductors 98a to 100a, 98b to 100b are arranged substantially linearly in parallel.

Namely, the through hole conductors 98a, 98b penetrating through the dielectric layer 18 in its thickness direction are formed at respective positions corresponding to inner conductors 84 and 75 in the dielectric layer 18. The through hole conductor 98a is electrically connected to the inner conductor 84. The through hole conductor 98b is electrically connected to the second inner electrode 44. The through hole conductor 98a is electrically connected to the first inner electrode 35 in the state where the dielectric layers 18, 19 are laminated. The through hole conductor 98b is electrically connected to the inner conductor 75 in the state where the dielectric layers 18, 19 are laminated.

The through hole conductors 99a, 99b penetrating through the dielectric layer 18 in its thickness direction are formed at respective positions corresponding to inner conductors 85 and 75 in the dielectric layer 19. The through hole conductor 99a is electrically connected to the first inner electrode 35. The through hole conductor 99b is electrically connected to the inner conductor 75. The through hole conductor 99a is electrically connected to the inner conductor 85 in the state where the dielectric layers 19, 20 are laminated. The through hole conductor 99b is electrically connected to the second inner electrode 45 in the state where the dielectric layers 19, 20 are laminated.

The through hole conductors 100a, 100b penetrating through the dielectric layer 20 in its thickness direction are formed at respective positions corresponding to inner conductors 85 and 76 in the dielectric layer 20. The through hole conductor 100a is electrically connected to the inner conductor 85. The through hole conductor 100b is electrically connected to the second inner electrode 45. The through hole conductor 100a is electrically connected to the first inner electrode 36 in the state where the dielectric layers 20, 21 are laminated. The through hole conductor 100b is electrically connected to the inner conductor 76 in the state where the dielectric layers 20, 21 are laminated.

When the dielectric layers 11 to 20 are laminated, the through hole conductors 91a to 100a are arranged substantially linearly in parallel with the laminating direction, and are electrically connected to each other, so as to construct a conductive path. The first inner electrodes 31 to 36 are electrically connected to each other through the through hole conductors 91a to 100a and inner conductors 81 to 85.

The first inner electrodes 31, 36 are electrically connected to the first terminal electrode 3 through lead conductors 37. Consequently, the first inner electrodes 32 to 35 are also electrically connected to the first terminal electrode 3, whereby the first inner electrodes 31 to 36 are connected in parallel. The lead conductors 37 are integrally formed with their corresponding first inner electrodes 31, 36, and extend therefrom so as to reach a side face 1a extending longitudinally in side faces parallel to the laminating direction of the multilayer body 1.

When the dielectric layers 11 to 20 are laminated, as with the through hole conductors 91a to 100a, the through hole conductors 91b to 100b are arranged substantially linearly in parallel with the laminating direction, and are electrically connected to each other, so as to construct a conductive path. The second inner electrodes 41 to 45 are electrically connected to each other through the through hole conductors 91b to 100b and inner conductors 71 to 76.

The second inner electrodes 41, 45 are electrically connected to the second terminal electrode 5 through lead conductors 47. Consequently, the second inner electrodes 42 to 44 are also electrically connected to the second terminal electrode 5, whereby the second inner electrodes 41 to 45 are connected in parallel. The lead conductors 47 are integrally formed with their corresponding second inner electrodes 41, 45, and extend therefrom so as to reach a side face 1b extending longitudinally and opposing the side face 1a formed with the first terminal electrode 3 in the side faces parallel to the laminating direction of the multilayer body 1.

In the multilayer capacitor in accordance with the thirteenth embodiment, the number of first inner electrodes 31, 36 connected to the first terminal electrode 3 through the lead conductors 37 is 2, which is smaller than the total number (6 in this embodiment) of first inner electrodes 31 to 36. Also, the number of second inner electrodes 41, 45 connected to the second terminal electrode 5 through the lead conductors 47 is 2, which is smaller than the total number (5 in this embodiment) of second inner electrodes 41 to 45. These make the multilayer capacitor in accordance with the thirteenth embodiment yield an equivalent series resistance greater than that of a conventional multilayer capacitor in which all the inner electrodes are connected to their corresponding terminal electrodes through lead conductors.

By adjusting the number of first inner electrodes 31, 36 electrically connected to the first terminal electrode 3 through the lead conductors 37 and the number of second inner electrodes 41, 45 electrically connected to the second terminal electrode 5 through the lead conductors 47 in such a fashion, the thirteenth embodiment sets the equivalent series resistance of the multilayer capacitor to a desirable value, and thus can regulate equivalent series resistance easily with a high precision.

In this embodiment, the first inner electrodes 31 to 36 are connected in parallel, and the second inner electrodes 41 to 45 are connected in parallel. As a consequence, even when the resistance value fluctuates among the first inner electrodes 31 to 36 and second inner electrodes 41 to 45, the equivalent series resistance of the multilayer capacitor in accordance with the thirteenth embodiment as a whole is less likely to be influenced thereby, so that the equivalent series resistance control can be restrained from lowering its precision.

In the multilayer body 1 of the multilayer capacitor in accordance with the thirteenth embodiment, the first inner electrode 36 electrically connected to the first terminal electrode 3 through the lead conductor 37 is arranged at a position symmetrical to the first inner electrode 31 electrically connected to the first terminal electrode 3 through the lead conductor 37 about the center position M in the laminating direction. In the multilayer body 1, the first inner electrode 31 electrically connected to the first terminal electrode 3 through the lead conductor 37 is arranged at a position symmetrical to the first inner electrode 36 electrically connected to the first terminal electrode 3 through the lead conductor 37 about the center position M in the laminating direction. On the other hand, in the multilayer body 1 in the multilayer capacitor in accordance with the thirteenth embodiment, the second inner electrode 45 electrically connected to the second terminal electrode 5 through the lead conductor 47 is arranged at a position symmetrical to the second inner electrode 41 electrically connected to the second terminal electrode 5 through the lead conductor 47 about the center position M in the laminating direction. In the multilayer body 1, the second inner electrode 41 electrically connected to the second terminal electrode 5 through the lead conductor 47 is arranged at a position symmetrical to the second inner electrode 45 electrically connected to the second terminal electrode 5 through the lead conductor 47 about the center position M in the laminating direction. Therefore, when any of two side faces 1e, 1f opposing each other in the laminating direction of the multilayer body 1 opposes a substrate or the like at the time of mounting, the length of a current path formed between land patterns or the like on the substrate through an inner electrode is hard to change. Consequently, the multilayer capacitor in accordance with the thirteenth embodiment restrains the equivalent series inductance from fluctuating depending on the mounting direction.

The first terminal electrode 3 is formed on the side face 1*a* extending longitudinally in the side faces parallel to the laminating direction of the rectangular parallelepiped multilayer body 1, whereas the second terminal electrode 5 is formed on the side face 1*b* extending longitudinally and opposing the side face 1*a* formed with the first terminal electrode 3 in the side faces parallel to the laminating direction of the multilayer body 1. Consequently, magnetic fields caused by currents flowing through the first and second inner electrodes 31 to 36, 41 to 45 can be made smaller, whereby the multilayer capacitor in accordance with the thirteenth embodiment can lower the equivalent series inductance.

Fourteenth Embodiment

Figure 20:
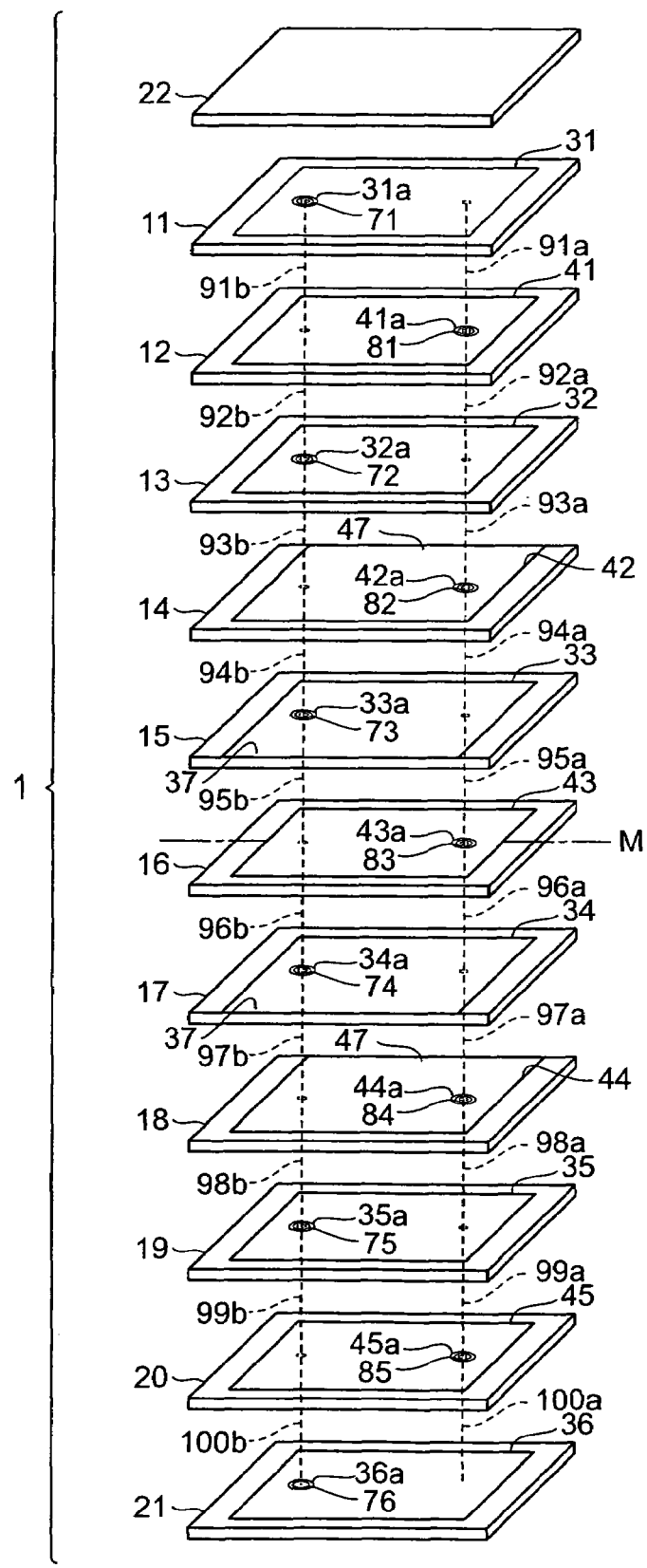
FIG. 20 is an exploded perspective view of the multilayer body included in the multilayer capacitor in accordance with a fourteenth embodiment.

With reference to FIG. 20, the structure of the multilayer capacitor in accordance with a fourteenth embodiment will be explained. The multilayer capacitor in accordance with the fourteenth embodiment differs from the multilayer capacitor in accordance with the thirteenth embodiment in terms of positions of first inner electrodes 33, 34 connected to a first terminal electrode 3 through lead conductors 37 and second inner electrodes 42, 44 connected to a second terminal electrode 5 through lead conductors 47. FIG. 20 is an exploded perspective view of the multilayer body included in the multilayer capacitor in accordance with the fourteenth embodiment.

As with the multilayer capacitor C2 in accordance with the ninth embodiment, the multilayer capacitor in accordance with the fourteenth embodiment comprises a multilayer body 1, the first terminal electrode 3 formed on the multilayer body 1, and the second terminal electrode 5 similarly formed on the multilayer body 1, which are not depicted.

In the multilayer capacitor in accordance with the fourteenth embodiment, as shown in FIG. 14, the third-highest first inner electrode 33 and fourth-highest first inner electrode 34 in six first inner electrodes 31 to 36 are electrically connected to the first terminal electrode 3 through the lead conductors 37. Consequently, the first inner electrodes 31, 32, 35, 36 are electrically connected to the first terminal electrode 3, whereby the first inner electrodes 31 to 36 are connected in parallel. The lead conductors 37 are integrally formed with the first inner electrodes 33, 34, and extend therefrom so as to reach a side face 1*a* extending longitudinally in side faces parallel to the laminating direction of the multilayer body 1.

In the multilayer capacitor in accordance with the fourteenth embodiment, as shown in FIG. 20, the second-highest second inner electrode 42 and fourth-highest second inner electrode 44 in five second inner electrodes 41 to 45 are electrically connected to the second terminal electrode 5 through the lead conductors 47. Consequently, the second inner electrodes 41, 43, 45 are electrically connected to the second terminal electrode 5, whereby the second inner electrodes 41 to 45 are connected in parallel. The lead conductors 47 are integrally formed with the second inner electrodes 42, 44, and extend therefrom so as to reach a side face 1*b* extending longitudinally and opposing the side face 1*a* in the side faces parallel to the laminating direction of the multilayer body 1.

In the multilayer capacitor in accordance with the fourteenth embodiment, the number of first inner electrodes 33, 34 connected to the first terminal electrode 3 through the lead conductors 37 is 2, which is smaller than the total number (6 in this embodiment) of the first inner electrodes 31 to 36. Also, the number of second inner electrodes 42, 44 connected to the second terminal electrode 5 through the lead conductors 47 is 2, which is smaller than the total number (5 in this embodiment) of the second inner electrodes 41 to 45. These make the multilayer capacitor in accordance with the fourteenth embodiment attain an equivalent series resistance greater than that in a conventional multilayer capacitor in which all the inner electrodes are connected to their corresponding terminal electrodes through lead conductors.

When the first terminal electrode 3 is concerned, the multilayer capacitor in accordance with the fourteenth embodiment differs from the multilayer capacitor in accordance with the thirteenth embodiment in how the resistance component of through hole conductors 91*a* to 100*a* is connected to the first terminal electrode 3. Namely, the resistance component of through hole conductors 91*a* to 100*a* is connected in series to each of the first inner electrodes 31, 36 in the multilayer capacitor in accordance with the thirteenth embodiment. In the multilayer capacitor in accordance with the fourteenth embodiment, on the other hand, the resistance component of through hole conductors 91*a* to 100*a* is divided at the first inner electrodes 33, 34 as boundaries, and thus divided resistance components are connected in parallel to the first terminal electrode 3. Also, when the second terminal electrode 5 is concerned, the multilayer capacitor in accordance with the fourteenth embodiment differs from the multilayer capacitor in accordance with the thirteenth embodiment in how the resistance component of through hole conductors 91*b* to 100*b* is connected to the second terminal electrode 5. Namely, the resistance component of through hole conductors 91*b* to 100*b* is connected in series to each of the second inner electrodes 41, 45 in the multilayer capacitor in accordance with the thirteenth embodiment. In the multilayer capacitor in accordance with the fourteenth embodiment, on the other hand, the resistance component of through hole conductors 91*b* to 100*b* is divided at the second inner electrodes 42, 44 as boundaries, and thus divided resistance components are connected in parallel to the second terminal electrode 5.

Therefore, because of the difference in resistance components of the through hole conductors 91*a* to 100*a*, 91*b* to 100*b*, the multilayer capacitor in accordance with the fourteenth embodiment yields an equivalent series resistance smaller than that of the multilayer capacitor in accordance with the thirteenth embodiment. (See technical details of paragraphs 0198 and 0199.)

By adjusting the positions of the first inner electrodes 33, 34 electrically connected to the first terminal electrode 3 through the lead conductors 37 and the second inner electrodes 42, 44 electrically connected to the second terminal electrode 5 through the lead conductors 47 in the laminating direction as in the foregoing, this embodiment sets the equivalent series resistance of the multilayer capacitor to a desirable value and thus can regulate the equivalent series resistance easily with a high precision.

In the multilayer body 1 of the multilayer capacitor in accordance with the fourteenth embodiment, the first inner electrode 34 electrically connected to the first terminal electrode 3 through the lead conductor 37 is arranged at a position symmetrical to the first inner electrode 33 electrically connected to the first terminal electrode 3 through the lead conductor 37 about the center position M in the laminating direction. In the multilayer body 1, the first inner electrode 33 electrically connected to the first terminal electrode 3 through the lead conductor 37 is arranged at a position symmetrical to the first inner electrode 34 electrically connected to the first terminal electrode 3 through the lead conductor 37 about the center position M in the laminating direction. On the other hand, in the multilayer body 1 of the multilayer capacitor in accordance with the fourteenth embodiment, the second inner electrode 44 electrically connected to the second terminal electrode 5 through the lead conductor 47 is arranged at a position symmetrical to the second inner electrode 42 electrically connected to the second terminal electrode 5 through the lead conductor 47 about the center position M in the laminating direction. In the multilayer body 1, the second inner electrode 42 electrically connected to the second terminal electrode 5 through the lead conductor 47 is arranged at a position symmetrical to the second inner electrode 44 electrically connected to the second terminal electrode 5 through the lead conductor 47 about the center position M in the laminating direction. Therefore, when any of two side faces 1e, 1f opposing each other in the laminating direction of the multilayer body 1 opposes a substrate or the like at the time of mounting, the length of a current path formed between land patterns or the like on the substrate through an inner electrode is hard to change. Consequently, the multilayer capacitor in accordance with the fourteenth embodiment restrains the equivalent series inductance from fluctuating depending on the mounting direction.

The first terminal electrode 3 is formed on the side face 1a extending longitudinally in the side faces parallel to the laminating direction of the rectangular parallelepiped multilayer body 1, whereas the second terminal electrode 5 is formed on the side face 1b extending longitudinally and opposing the side face 1a formed with the first terminal electrode 3 in the side faces parallel to the laminating direction of the multilayer body 1. Consequently, magnetic fields caused by currents flowing through the first and second inner electrodes 31 to 36, 41 to 45 can be made smaller, whereby the multilayer capacitor in accordance with the fourteenth embodiment can lower the equivalent series inductance.

Fifteenth Embodiment

Figure 21:
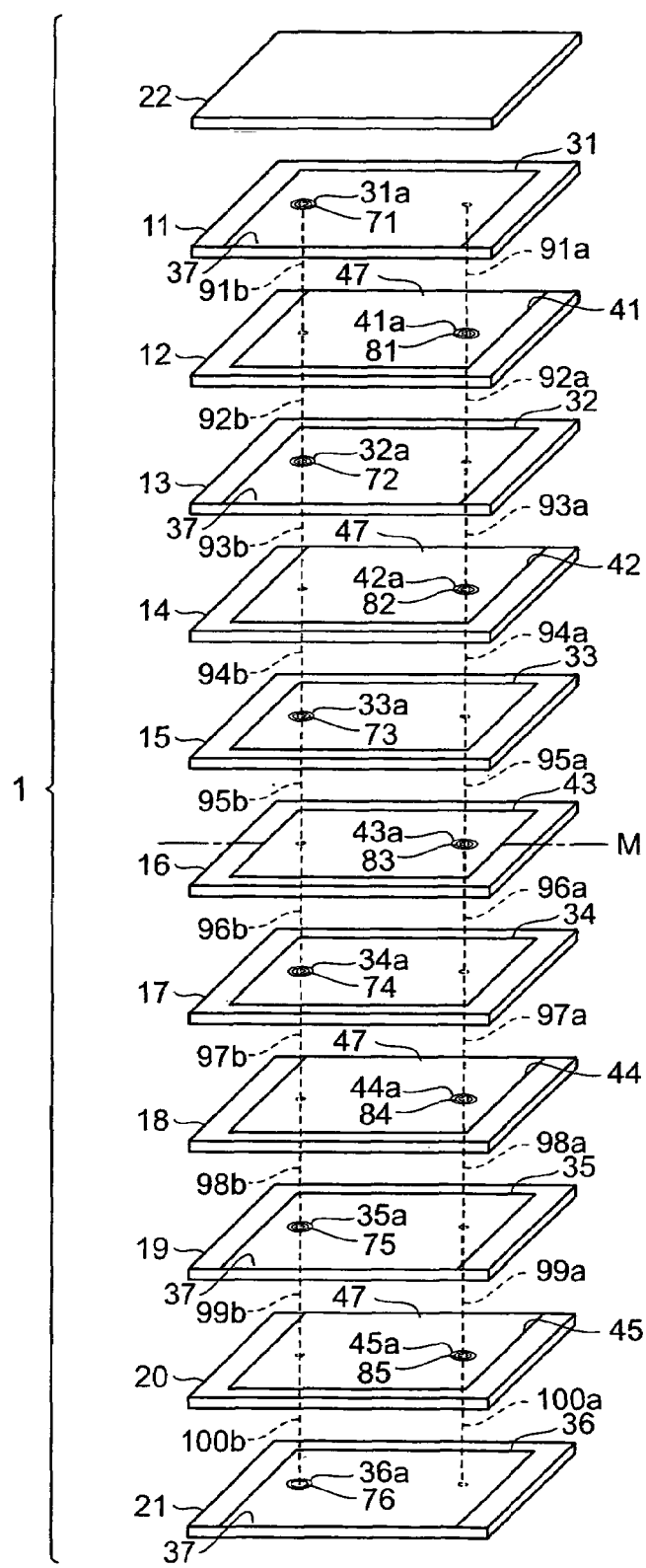
FIG. 21 is an exploded perspective view of the multilayer body included in the multilayer capacitor in accordance with a fifteenth embodiment.

With reference to FIG. 21, the structure of the multilayer capacitor in accordance with a fifteenth embodiment will be explained. The multilayer capacitor in accordance with the fifteenth embodiment differs from the multilayer capacitor in accordance with the thirteenth embodiment in terms of the number of first and second inner electrodes 31, 32, 35, 36, 41, 42, 44, 45 connected to terminal electrodes 3, 5 through lead conductors 37, 47. FIG. 21 is an exploded perspective view of the multilayer body included in the multilayer capacitor in accordance with the fifteenth embodiment.

As with the multilayer capacitor C2 in accordance with the ninth embodiment, the multilayer capacitor in accordance with the fifteenth embodiment comprises a multilayer body 1, the first terminal electrode 3 formed on the multilayer body 1, and the second terminal electrode 5 similarly formed on the multilayer body 1, which are not depicted.

In the multilayer capacitor in accordance with the fifteenth embodiment, as shown in FIG. 21, four first inner electrodes 31, 32, 35, 36 among six first inner electrodes 31 to 36 are electrically connected to the first terminal electrode 3 through the lead conductors 37. Since the first inner electrodes 31 to 36 are electrically connected to each other through the first connecting conductor 7, the first inner electrodes 33, 34 are also electrically connected to the first terminal electrode 3 through the first connecting conductor 7, whereby the first inner electrodes 31 to 36 are connected in parallel. The lead conductors 37 are integrally formed with their corresponding first inner electrodes 31, 32, 35, 36, and extend therefrom so as to reach a side face 1a extending longitudinally in side faces parallel to the laminating direction of the multilayer body 1.

Four second inner electrodes 41, 42, 44, 45 among five second inner electrodes 41 to 45 are electrically connected to the second terminal electrode 5 through the lead conductors 47. Since the second inner electrodes 41 to 45 are electrically connected to each other through the second connecting conductor 9, the second inner electrode 43 is also electrically connected to the second terminal electrode 5 through the second connecting conductor 9, whereby the second inner electrodes 41 to 45 are connected in parallel. The lead conductors 47 are integrally formed with their corresponding second inner electrodes 41, 42, 44, 45, and extend therefrom so as to reach a side face 1b extending longitudinally and opposing the side face 1a in the side faces parallel to the laminating direction of the multilayer body 1.

In the multilayer capacitor in accordance with the fifteenth embodiment, the number of first inner electrodes 31, 32, 35, 36 connected to the first terminal electrode 3 through the lead conductors 37 is 4, which is smaller than the total number of first inner electrodes 31 to 36. Also, the number of second inner electrodes 41, 42, 44, 45 connected to the second terminal electrode 5 through the lead conductors 47 is 4, which is smaller than the total number of second inner electrodes 41 to 45. These make the multilayer capacitor in accordance with the fifteenth embodiment yield an equivalent series resistance greater than that of a conventional multilayer capacitor in which all the inner electrodes are connected to their corresponding terminal electrodes through lead conductors.

In the multilayer body in accordance with the fifteenth embodiment, the number of first inner electrodes 31, 32, 35, 36 connected to the first terminal electrode 3 through the lead conductors 37 is greater than that in the multilayer capacitor in accordance with the thirteenth embodiment, whereas the lead conductors 37 are connected in parallel to the first terminal electrode 3. Also, in the multilayer body in accordance with the fifteenth embodiment, the number of second inner electrodes 41, 42, 44, 45 connected to the second terminal electrode 5 through the lead conductors 47 is greater than that in the multilayer capacitor in accordance with the thirteenth embodiment, whereas the lead conductors 47 are connected in parallel to the second terminal electrode 5. These make the multilayer capacitor in accordance with the fifteenth embodiment yield an equivalent series resistance smaller than that of the multilayer capacitor in accordance with the thirteenth embodiment.

By adjusting the number of first inner electrodes 31, 32, 35, 36 electrically connected to the first terminal electrode 3 through the lead conductors 37 and the number of second inner electrodes 41, 42, 44, 45 electrically connected to the second terminal electrode 5 through the lead conductors 47 as in the foregoing, the fifteenth embodiment sets the equivalent series resistance of the multilayer capacitor to a desirable value and thus can regulate the equivalent series resistance easily with a high precision.

In the multilayer body 1 of the multilayer capacitor in accordance with the fifteenth embodiment, the first inner electrode 36 electrically connected to the first terminal electrode 3 through the lead conductor 37 is arranged at a position symmetrical to the first inner electrode 31 electrically connected to the first terminal electrode 3 through the lead conductor 37 about the center position M in the laminating direction. In the multilayer body 1, the first inner electrode 35 electrically connected to the first terminal electrode 3 through the lead conductor 37 is arranged at a position symmetrical to the first inner electrode 32 electrically connected to the first terminal electrode 3 through the lead conductor 37 about the center position M in the laminating direction. In the multilayer body 1, the first inner electrode 32 electrically connected to the first terminal electrode 3 through the lead conductor 37 is arranged at a position symmetrical to the first inner electrode 35 electrically connected to the first terminal electrode 3 through the lead conductor 37 about the center position M in the laminating direction. In the multilayer body 1, the first inner electrode 31 electrically connected to the first terminal electrode 3 through the lead conductor 37 is arranged at a position symmetrical to the first inner electrode 36 electrically connected to the first terminal electrode 3 through the lead conductor 37 about the center position M in the laminating direction.

On the other hand, in the multilayer body 1 of the multilayer capacitor in accordance with the fifteenth embodiment, the second inner electrode 45 electrically connected to the second terminal electrode 5 through the lead conductor 47 is arranged at a position symmetrical to the second inner electrode 41 electrically connected to the second terminal electrode 5 through the lead conductor 47 about the center position M in the laminating direction. In the multilayer body 1, the second inner electrode 44 electrically connected to the second terminal electrode 5 through the lead conductor 47 is arranged at a position symmetrical to the second inner electrode 42 electrically connected to the second terminal electrode 5 through the lead conductor 47 about the center position M in the laminating direction. In the multilayer body 1, the second inner electrode 42 electrically connected to the second terminal electrode 5 through the lead conductor 47 is arranged at a position symmetrical to the second inner electrode 44 electrically connected to the second terminal electrode 5 through the lead conductor 47 about the center position M in the laminating direction. In the multilayer body 1, the second inner electrode 41 electrically connected to the second terminal electrode 5 through the lead conductor 47 is arranged at a position symmetrical to the second inner electrode 45 electrically connected to the second terminal electrode 5 through the lead conductor 47 about the center position M in the laminating direction.

Therefore, when any of two side faces 1e, 1f opposing each other in the laminating direction of the multilayer body 1 opposes a substrate or the like at the time of mounting, the length of a current path formed between land patterns or the like on the substrate through an inner electrode is hard to change. Consequently, the multilayer capacitor in accordance with the fifteenth embodiment restrains the equivalent series inductance from fluctuating depending on the mounting direction.

The first terminal electrode 3 is formed on the side face 1a extending longitudinally in the side faces parallel to the laminating direction of the substantially rectangular parallelepiped multilayer body 1, whereas the second terminal electrode 5 is formed on the side face 1b extending longitudinally and opposing the side face 1a formed with the first terminal electrode 3 in the side faces parallel to the laminating direction of the multilayer body 1. Consequently, magnetic fields caused by currents flowing through the first and second inner electrodes 31 to 36, 41 to 45 can be made smaller, whereby the multilayer capacitor in accordance with the fifteenth embodiment can lower the equivalent series inductance.

Sixteenth Embodiment

Figure 22:
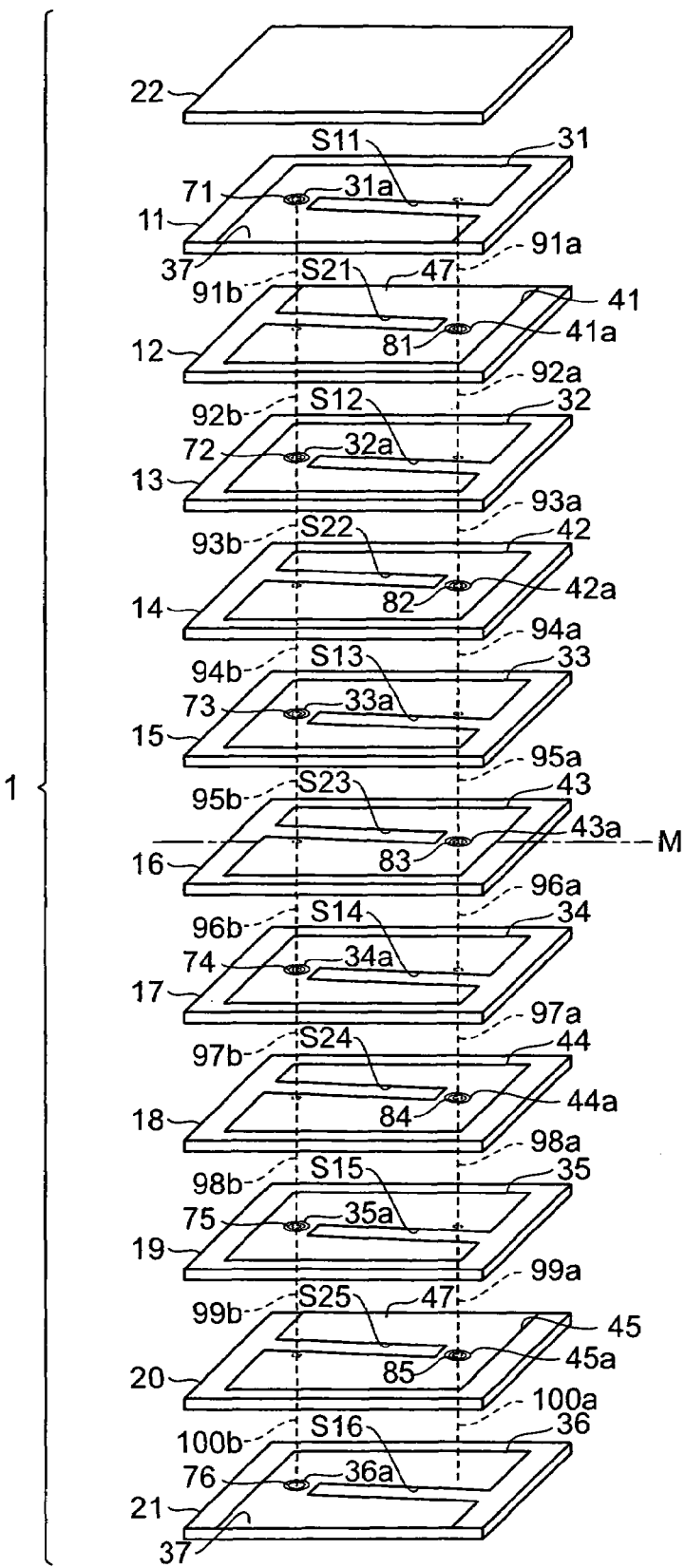
FIG. 22 is an exploded perspective view of the multilayer body included in the multilayer capacitor in accordance with a sixteenth embodiment.

With reference to FIG. 22, the structure of the multilayer capacitor in accordance with a sixteenth embodiment will be explained. The multilayer capacitor in accordance with the sixteenth embodiment differs from the multilayer capacitor in accordance with the thirteenth embodiment in that first and second inner electrodes 31 to 36, 41 to 45 are formed with slits. FIG. 22 is an exploded perspective view of the multilayer body included in the multilayer capacitor in accordance with the sixteenth embodiment.

As with the multilayer capacitor C2 in accordance with the ninth embodiment, the multilayer capacitor in accordance with the sixteenth embodiment comprises a multilayer body 1, a first terminal electrode 3 formed on the multilayer body 1, and a second terminal electrode 5 similarly formed on the multilayer body 1, which are not depicted.

The first inner electrodes 31 to 36 are formed with slits S11 to S16 extending from ends of the first inner electrodes 31 to 36 opposing a side face 1d of the multilayer body 1 to sides of parts where through hole conductors 91a to 100a and the first inner electrodes 31 to 36 are connected to each other. Therefore, the slits S11 to S16 are formed in their corresponding first inner electrodes 31 to 36 such that currents flow in directions opposite from each other in areas opposing each other across the slits S11 to S16.

The second inner electrodes 41 to 45 are formed with slits S21 to S25 extending from ends of the second inner electrodes 41 to 45 opposing a side face 1c of the multilayer body 1 to sides of parts where through hole conductors 91b to 100b and the second inner electrodes 41 to 45 are connected to each other. Therefore, the slits S21 to S25 are formed in their corresponding second inner electrodes 41 to 45 such that currents flow in directions opposite from each other in areas opposing each other across the slits S21 to S25.

In the first and second inner electrodes 31 to 36, 41 to 45 formed with the slits S11 to S16, S21 to S25, currents flow in directions opposite from each other in areas opposing each other across the slits S11 to S16, S21 to S25, whereby magnetic fields caused by the currents cancel each other out. Also, in the laminating direction, currents flow in respective directions opposite from each other in the first inner electrodes 31 to 36 and second inner electrodes 41 to 45 formed with the slits. Therefore, magnetic fields caused by currents flowing through the first inner electrodes 31 to 36 and magnetic fields caused by currents flowing through the second inner electrodes 41 to 45 cancel each other out. Consequently, the multilayer capacitor in accordance with the sixteenth embodiment can reduce its equivalent series inductance.

In the multilayer capacitor in accordance with the sixteenth embodiment, the number of first inner electrodes 31, 36 connected to the first terminal electrode 3 through lead conductors 37 is 2, which is smaller than the total number (6 in this embodiment) of first inner electrodes 31 to 36. The number of second inner electrodes 41, 45 connected to the second terminal electrode 5 through lead conductors 47 is 2, which is smaller than the total number (5 in this embodiment) of second inner electrodes 41 to 45. These make the multilayer capacitor in accordance with the sixteenth embodiment attain an equivalent series resistance greater than that of a conventional multilayer capacitor in which all the inner electrodes are connected to their corresponding terminal electrodes through lead conductors.

By adjusting the number of first inner electrodes 31, 36 electrically connected to the first terminal electrode 3 through the lead conductors 37 and the number of second inner electrodes 41, 45 electrically connected to the second terminal electrode 5 through the lead conductors 47 as in the foregoing, the sixteenth embodiment sets the equivalent series resistance of the multilayer capacitor to a desirable value and thus can regulate the equivalent series resistance easily with a high precision.

In the multilayer body 1 of the multilayer capacitor in accordance with the sixteenth embodiment, the first inner electrodes 36, 31 electrically connected to the first terminal electrode 3 through the lead conductors 37 are arranged at respective positions symmetrical to the first inner electrodes 31, 36 electrically connected to the first terminal electrode 3 through the lead conductors 37 about the center position M in the laminating direction. On the other hand, in the multilayer body 1 of the multilayer capacitor in accordance with the sixteenth embodiment, the second inner electrodes 45, 41 electrically connected to the second terminal electrode 5 through the lead conductors 47 are arranged at respective positions symmetrical to the second inner electrodes 41, 45 electrically connected to the second terminal electrode 5 through the lead conductors 47 about the center position M in the laminating direction. Therefore, when any of two side faces 1e, 1f opposing each other in the laminating direction of the multilayer body 1 opposes a substrate or the like at the time of mounting, the length of a current path formed between land patterns or the like on the substrate through an inner electrode is hard to change. Consequently, the multilayer capacitor in accordance with the sixteenth embodiment restrains the equivalent series inductance from fluctuating depending on the mounting direction.

The first terminal electrode 3 is formed on a side face 1a extending longitudinally in the side faces parallel to the laminating direction of the rectangular parallelepiped multilayer body 1, whereas the second terminal electrode 5 is formed on a side face 1b extending longitudinally and opposing the side face 1a formed with the first terminal electrode 3, in the side faces parallel to the laminating direction of the multilayer body 1. Consequently, magnetic fields caused by currents flowing through the first and second inner electrodes 31 to 36, 41 to 45 can be made smaller, whereby the multilayer capacitor in accordance with the sixteenth embodiment can lower the equivalent series inductance.

It is not necessary for all the inner electrodes to be formed with slits. For example, the first and second inner electrodes 31, 36, 41, 45 electrically connected to the terminal electrodes 3, 5 through the lead conductors 37, 47 may be free of slits. When the first and second inner electrodes 31, 36, 41, 45 are formed with slits, however, magnetic fields caused by currents cancel each other out in these inner electrodes 31, 36, 41, 45. Therefore, the equivalent series inductance can further be lowered in the multilayer capacitor.

The first to sixteenth embodiments set the equivalent series resistance of their multilayer capacitors to a desirable value by adjusting at least one of the number and position in the laminating direction of inner electrodes connected to the terminal electrodes 3, 5 through the lead conductors 37, 47.

As a result, the equivalent series resistance of each multilayer capacitor can be regulated easily with a high precision.

The number of the first inner electrodes 31 to 36 can be adjusted within the range from at least 1 to the number smaller than the total number of the first inner electrodes 31 to 36 by 1. The number of the second inner electrodes 41 to 45 can be adjusted within the range from at least 1 to the number smaller than the total number of the second inner electrodes 41 to 45 by 1. The number of first inner electrodes connected to the terminal electrode 3 through the lead conductors 37 and the number of second inner electrodes connected to the terminal electrode 5 through the lead conductors 47 may differ from each other.

Further, the number of connecting conductors 7, 9 or through hole conductors 91a to 100a, 91b to 100b may be adjusted, so as to set the equivalent series resistance of each multilayer capacitor to a desirable value. In this case, the equivalent series resistance of each multilayer capacitor can be regulated with a higher precision.

Figure 23:
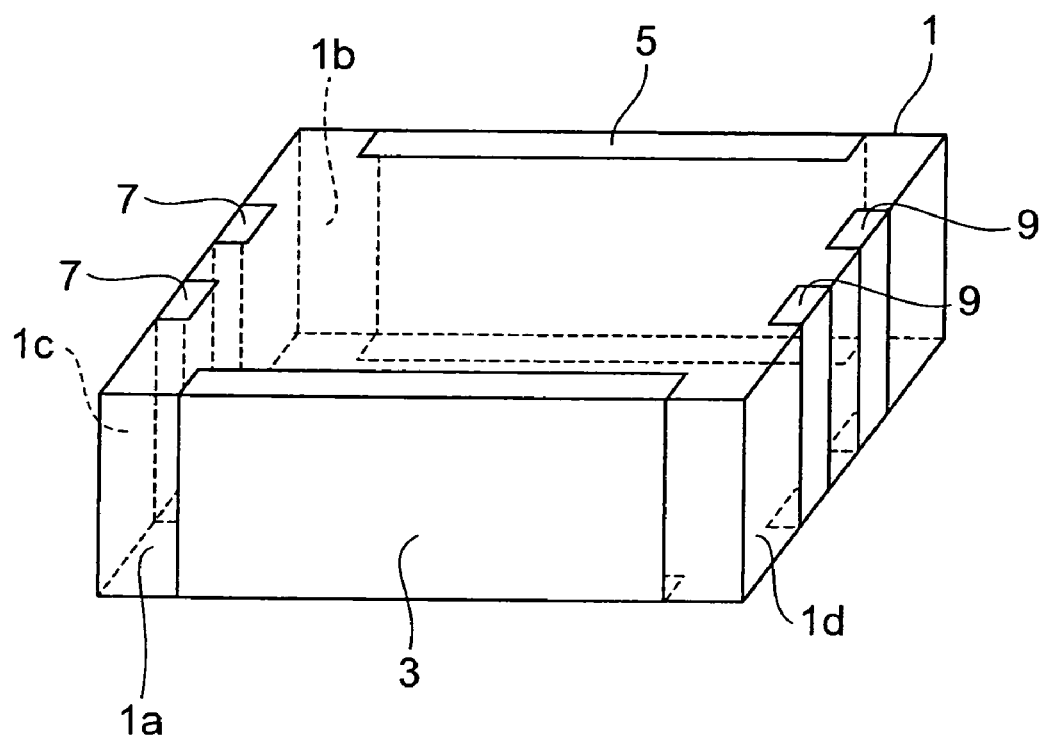
FIG. 23 is a perspective view of a modified example of the multilayer capacitor in accordance with the first embodiment.
Figure 24:
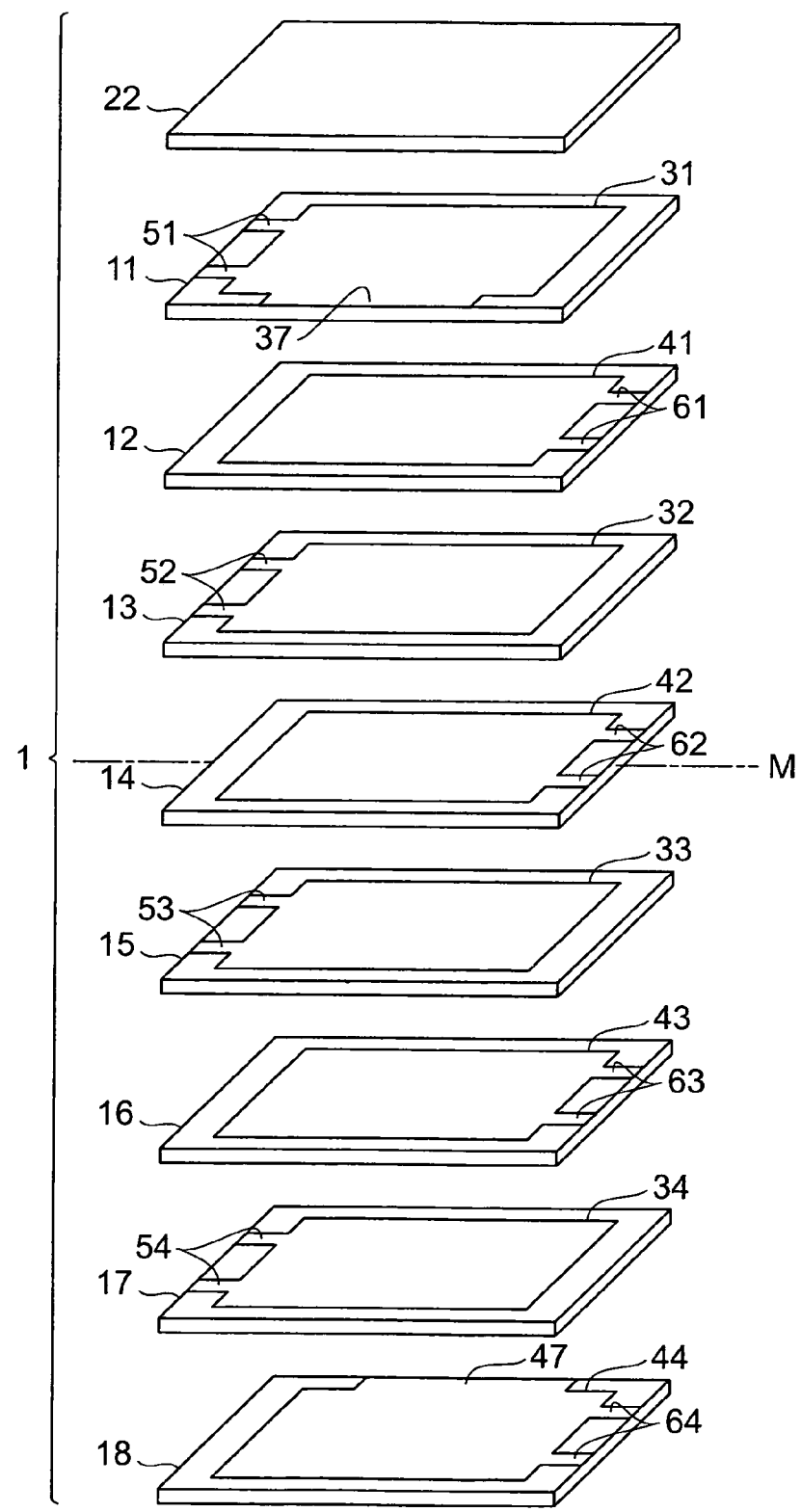
FIG. 24 is an exploded perspective view of the multilayer body included in the multilayer capacitor in the modified example of the multilayer capacitor in accordance with the first embodiment.

FIGS. 23 and 24 show an example of adjusting the number of connecting conductors 7, 9. The multilayer capacitor shown in FIGS. 23 and 24 sets the equivalent series resistance to a desirable value by employing two each of the first and second connecting conductors 7, 9 in the multilayer capacitor in accordance with the first embodiment. FIG. 23 is a perspective view of a modified example of the multilayer capacitor in accordance with the first embodiment. FIG. 24 is an exploded perspective view of the multilayer body included in the multilayer capacitor in the modified example of the multilayer capacitor in accordance with the first embodiment. As shown in FIG. 23, the modified example of the multilayer capacitor in accordance with the first embodiment comprises two each of the first and second connecting conductors 7, 9. As shown in FIG. 24, first inner electrodes 31 to 34 have two each of lead conductors 51 to 54 connected to the connecting conductors 7. Consequently, the first inner electrodes 31 to 34 are electrically connected to each other through two conductive paths, and the second inner electrodes 41 to 45 are electrically connected to each other through two conductive paths.

Figure 25:
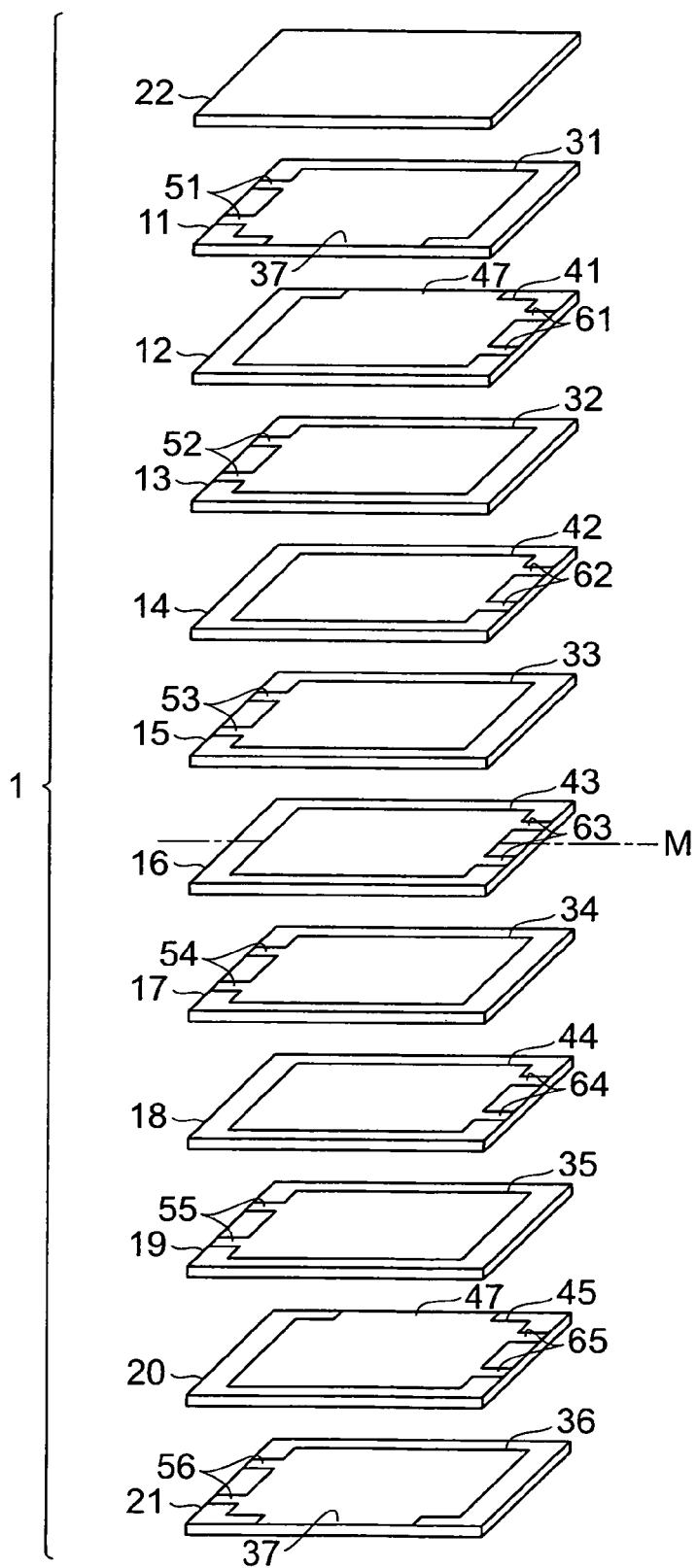
FIG. 25 is an exploded perspective view of the multilayer body included in the multilayer capacitor in the modified example of the multilayer capacitor in accordance with the fifth embodiment.

There may also be a plurality of each of the connecting conductors 7, 9 in any of the multilayer capacitors in accordance with the second to eighth embodiments other than the multilayer capacitor in accordance with the first embodiment. FIG. 25 is an exploded perspective view of a modified example of the multilayer capacitor in accordance with the fifth embodiment. The modified example of the multilayer capacitor in accordance with the fifth embodiment shown in FIG. 25 employs two each of the first and second connecting conductors 7, 9.

Though preferred embodiments of the present invention are explained in detail in the foregoing, the present invention is not limited to the above-mentioned embodiments and modified examples. For example, the number of laminations of dielectric layers 11 to 22 and the number of laminations of first and second inner electrodes 31 to 36, 41 to 45 are not limited to those stated in the above-mentioned embodiments. The number of laminations and positions in the laminating direction of inner electrodes connected to the terminal electrodes 3, 5 through the lead conductors 37, 47 are not limited to those stated in the above-mentioned embodiments. The first and second inner electrodes may directly be connected to the first and second connecting conductors without the aid of lead conductors.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multilayer capacitor comprising a multilayer body in which a plurality of dielectric layers and a plurality of inner electrodes are alternately laminated, and a plurality of terminal electrodes formed on the multilayer body,
wherein the plurality of terminal electrodes include first and second terminal electrodes electrically insulated from each other;
wherein the plurality of inner electrodes include a plurality of first and second inner electrodes alternately arranged;
wherein the plurality of first inner electrodes are electrically connected to each other through a connecting conductor;
wherein the plurality of second inner electrodes are electrically connected to each other through a connecting conductor;
wherein at least one first inner electrode includes a first lead conductor and is directly connected to the first terminal electrode through the first lead conductor and at least one first inner electrode is not directly connected to the first terminal electrode;
wherein at least one second inner electrode includes a second lead conductor and is directly connected to the second terminal electrode through the second lead conductor and at least one second inner electrode is not directly connected to the second terminal electrode;
wherein the second inner electrode directly connected to the second terminal electrode through the second lead conductor is arranged at a position symmetrical to the respective first inner electrode directly connected to the first terminal electrode through the first lead conductor about a center position in a laminating direction of the multilayer body; and
wherein the first inner electrode directly connected to the first terminal electrode through the first lead conductor is arranged at a position symmetrical to the respective second inner electrode directly connected to the second terminal electrode through the second lead conductor about the center position in the laminating direction of the multilayer body.

2. A multilayer capacitor according to claim 1, wherein the plurality of first inner electrodes are electrically connected to the connecting conductor each through a third lead conductor;
wherein the plurality of second inner electrodes are electrically connected to the connecting conductor each through a fourth lead conductor; and
wherein the connecting conductor is formed on a surface of the multilayer body.

3. A multilayer capacitor according to claim 1, wherein the connecting conductor is a through hole conductor provided within the multilayer body in the laminating direction of the multilayer body.

4. A multilayer capacitor according to claim 1, wherein at least a part of the plurality of first and second inner electrodes is formed with a slit; and
wherein the slit is formed such that a current flows in respective directions opposite from each other in areas opposing each other with the slit interposed therebetween in each of the first and second inner electrodes formed with the slit.

5. A multilayer capacitor according to claim 1, wherein the multilayer body has a substantially rectangular parallelepiped form;
wherein the first terminal electrode is formed on a side face extending longitudinally in side faces parallel to the laminating direction of the multilayer body; and
wherein the second terminal electrode is formed on a side face extending longitudinally and opposing the side face formed with the first terminal electrode in the side faces parallel to the laminating direction of the multilayer body.

6. A multilayer capacitor according to claim 1, wherein equivalent series resistance is set to a desirable value by adjusting the number of the at least one first inner electrode directly connected to the first terminal electrode through the first lead conductor and the number of the at least one second inner electrode directly connected to the second terminal electrode through the second lead conductor.

7. A multilayer capacitor according to claim 6, wherein equivalent series resistance is set to a desirable value by further adjusting the number of connecting conductor electrically connecting the plurality of first inner electrodes to each other and the number of connecting conductor electrically connecting the plurality of second inner electrodes to each other.

8. A multilayer capacitor according to claim 6, wherein the plurality of first inner electrodes are connected in parallel; and
wherein the plurality of second inner electrodes are connected in parallel.

9. A multilayer capacitor according to claim 1, wherein equivalent series resistance is set to a desirable value by adjusting the position of the at least one first inner electrode directly connected to the first terminal electrode through the first lead conductor in the laminating direction of the multilayer body and the position of the at least one second inner electrode directly connected to the second terminal electrode through the second lead conductor in the laminating direction of the multilayer body.

10. A multilayer capacitor according to claim 9, wherein equivalent series resistance is set to a desirable value by further adjusting the number of connecting conductor electrically connecting the plurality of first inner electrodes to each other and the number of connecting conductor electrically connecting the plurality of second inner electrodes to each other.

11. A multilayer capacitor according to claim 9, wherein the plurality of first inner electrodes are connected in parallel; and
wherein the plurality of second inner electrodes are connected in parallel.

12. A multilayer capacitor comprising a multilayer body in which a plurality of dielectric layers and a plurality of inner electrodes are alternately laminated, and a plurality of terminal electrodes formed on the multilayer body,
wherein the plurality of terminal electrodes include first and second terminal electrodes electrically insulated from each other;
wherein the plurality of inner electrodes include a plurality of first and second inner electrodes alternately arranged;
wherein the plurality of first inner electrodes are electrically connected to each other through a connecting conductor;
wherein the plurality of second inner electrodes are electrically connected to each other through a connecting conductor;

wherein at least one first inner electrode includes a first lead conductor and directly connected to the first terminal electrode through the first lead conductor and at least one first inner electrode is not directly connected to the first terminal electrode;

wherein at least one second inner electrode includes a second lead conductor and is directly connected to the second terminal electrode through the second lead conductor and at least one second inner electrode is not directly connected to the second terminal electrode;

wherein the first inner electrode directly connected to the first terminal electrode through the first lead conductor is arranged at a position symmetrical to the respective first inner electrode directly connected to the first terminal electrode through the first lead conductor about a center position in a laminating direction of the multilayer body; and wherein the second inner electrode directly connected to the second terminal electrode through the second lead conductor is arranged at a position symmetrical to the respective second inner electrode directly connected to the second terminal electrode through the second lead conductor about the center position in the laminating direction of the multilayer body.

13. A multilayer capacitor according to claim 12, wherein the plurality of first inner electrodes are electrically connected to the connecting conductor each through a third lead conductor;

wherein the plurality of second inner electrodes are electrically connected to the connecting conductor each through a fourth lead conductor; and wherein the connecting conductor is formed on a surface of the multilayer body.

14. A multilayer capacitor according to claim 12, wherein the connecting conductor is a through hole conductor provided within the multilayer body in the laminating direction of the multilayer body.

15. A multilayer capacitor according to claim 12, wherein at least a part of the plurality of first and second inner electrodes is formed with a slit; and wherein the slit is formed such that a current flows in respective directions opposite from each other in areas opposing each other with the slit interposed therebetween in each of the first and second inner electrodes formed with the slit.

16. A multilayer capacitor according to claim 12, wherein the multilayer body has a substantially rectangular parallelepiped form;

wherein the first terminal electrode is formed on a side face extending longitudinally in side faces parallel to the laminating direction of the multilayer body; and wherein the second terminal electrode is formed on a side face extending longitudinally and opposing the side face formed with the first terminal electrode in the side faces parallel to the laminating direction of the multilayer body.

17. A multilayer capacitor according to claim 12, wherein equivalent series resistance is set to a desirable value by adjusting the number of the at least one first inner electrode directly connected to the first terminal electrode through the first lead conductor and the number of the at least one second inner electrode directly connected to the second terminal electrode through the second lead conductor.

18. A multilayer capacitor according to claim 17, wherein equivalent series resistance is set to a desirable value by further adjusting the number of connecting conductor electrically connecting the plurality of first inner electrodes to each other and the number of connecting conductor electrically connecting the plurality of second inner electrodes to each other.

19. A multilayer capacitor according to claim 17, wherein the plurality of first inner electrodes are connected in parallel; and wherein the plurality of second inner electrodes are connected in parallel.

20. A multilayer capacitor according to claim 12, wherein equivalent series resistance is set to a desirable value by adjusting the position of the at least one first inner electrode directly connected to the first terminal electrode through the first lead conductor in the laminating direction of the multilayer body and the position of the at least one second inner electrode directly connected to the second terminal electrode through the second lead conductor in the laminating direction of the multilayer body.

21. A multilayer capacitor according to claim 20, wherein equivalent series resistance is set to a desirable value by further adjusting the number of connecting conductor electrically connecting the plurality of first inner electrodes to each other and the number of connecting conductor electrically connecting the plurality of second inner electrodes to each other.

22. A multilayer capacitor according to claim 20, wherein the plurality of first inner electrodes are connected in parallel; and wherein the plurality of second inner electrodes are connected in parallel.

* * * * *